US012511904B1

(12) United States Patent
Affleck-Boldt

(10) Patent No.: US 12,511,904 B1
(45) Date of Patent: Dec. 30, 2025

(54) METHOD, SYSTEM, AND COMPUTER-READABLE MEDIUM FOR TRAINING A CAPTIONER MODEL TO GENERATE CAPTIONS FOR VIDEO CONTENT BY ANALYZING AND PREDICTING CINEMATIC ELEMENTS

(71) Applicant: InterPositive, LLC, Los Angeles, CA (US)

(72) Inventor: Benjamin Geza Affleck-Boldt, West Hollywood, CA (US)

(73) Assignee: InterPositive, LLC, Los Angeles, CA (US)

( * ) Notice: Subject to any disclaimer, the term of this patent is extended or adjusted under 35 U.S.C. 154(b) by 0 days.

(21) Appl. No.: 19/078,229

(22) Filed: Mar. 12, 2025

Related U.S. Application Data

(60) Provisional application No. 63/726,140, filed on Nov. 27, 2024.

(51) Int. Cl.
    G06V 20/40 (2022.01)
    G06V 10/82 (2022.01)
    G06V 20/70 (2022.01)

(52) U.S. Cl.
    CPC .............. *G06V 20/49* (2022.01); *G06V 10/82* (2022.01); *G06V 20/70* (2022.01)

(58) Field of Classification Search
    CPC ... H04N 5/2224; G06T 7/521; G06F 16/7837; G06V 20/70; G06V 10/82; G06V 20/41
    See application file for complete search history.

(56) References Cited

U.S. PATENT DOCUMENTS

| 12,067,878 B1 * | 8/2024 | Campbell | G06Q 40/08 |
| 12,238,390 B1 * | 2/2025 | Pundi Ananth | H04N 5/2628 |

(Continued)

FOREIGN PATENT DOCUMENTS

| CN | 108664722 A | 10/2018 |
| CN | 110602400 B | 3/2021 |

(Continued)

OTHER PUBLICATIONS

Chen, Shixing, et al. "Movies2scenes: Using movie metadata to learn scene representation." Proceedings of the IEEE/CVF Conference on Computer Vision and Pattern Recognition. 2023. (Year: 2023).*

(Continued)

*Primary Examiner* — Utpal D Shah
(74) *Attorney, Agent, or Firm* — MARSHALL, GERSTEIN & BORUN LLP

(57) ABSTRACT

A method trains a captioner model to generate captions for video content by organizing a dataset, extracting frames, associating metadata, segmenting video, applying labels, aggregating labels, training the model, refining it, deploying it for labeling, and post-processing labels. A computing system trains a captioner model by organizing datasets, extracting frames, associating metadata, segmenting videos, applying labels, aggregating labels, training the model, refining it, deploying it for labeling, and post-processing labels. A computer-readable medium has instructions for training a captioner model by organizing datasets, extracting frames, associating metadata, segmenting videos, applying labels, aggregating labels, training the model, refining it, deploying it for labeling, and post-processing labels.

30 Claims, 6 Drawing Sheets

(56) References Cited

U.S. PATENT DOCUMENTS

| | | | |
|---|---|---|---|
| 2007/0146360 A1* | 6/2007 | Clatworthy | G06T 15/20 |
| | | | 345/419 |
| 2009/0208106 A1* | 8/2009 | Dunlop | G06V 20/10 |
| | | | 382/173 |
| 2012/0102042 A1 | 4/2012 | Flick et al. | |
| 2013/0304683 A1 | 11/2013 | Lo | |
| 2016/0205379 A1* | 7/2016 | Kurihara | H04N 7/181 |
| | | | 348/47 |
| 2018/0124382 A1* | 5/2018 | Smith | G06T 7/55 |
| 2018/0316853 A1 | 11/2018 | Liang et al. | |
| 2021/0334547 A1* | 10/2021 | Cohen-Tidhar | G06V 10/82 |
| 2022/0004574 A1* | 1/2022 | Figov | G11B 27/28 |
| 2023/0342481 A1* | 10/2023 | Nikoghossian | G06F 21/62 |
| 2023/0368532 A1* | 11/2023 | Bishop | G06V 10/82 |
| 2024/0144489 A1 | 5/2024 | Nguyen et al. | |
| 2024/0193890 A1* | 6/2024 | Mann | G10L 25/57 |
| 2024/0296641 A1* | 9/2024 | Ramesh | G06T 15/10 |
| 2024/0362897 A1* | 10/2024 | Klinghoffer | G06T 7/55 |
| 2024/0394511 A1* | 11/2024 | Thevenin | G06N 3/088 |
| 2024/0419923 A1* | 12/2024 | Chollampatt Muhammed Ashraf | G06F 16/345 |
| 2025/0014606 A1* | 1/2025 | Wong | G11B 27/031 |
| 2025/0159276 A1* | 5/2025 | Doken | H04N 21/4725 |

FOREIGN PATENT DOCUMENTS

| | | |
|---|---|---|
| WO | WO-2021126004 A1 | 6/2021 |
| WO | WO-2021167910 A1 | 8/2021 |

OTHER PUBLICATIONS

Lin, Han, et al. "Videodirectorgpt: Consistent multi-scene video generation via llm-guided planning." arXiv preprint arXiv:2309.15091 (2023). (Year: 2023).*

Lin, Han, et al. "Videodirectorgpt: Consistent multi-scene video generation via llm-guided planning." arXiv preprint arXiv:2309.15091 (2023). (Year: 2023).

WO 2021126004 (Year: 2021).
WO 2021167910 (Year: 2021).
CN 108664722 (Year: 2018).
CN 110602400 (Year: 2021).

* cited by examiner

500

- A. accessing a trained captioner AI model capable of identifying and generating metadata for cinematic elements within video sequences, where the cinematic elements include focal length, camera movement, depth of field, occlusion, and parallax — 510

- B. compiling a dataset of video sequences that have not been previously analyzed by the captioner AI model, where each video sequence includes a variety of cinematic elements — 520

- C. processing the compiled dataset through the trained captioner AI model to generate metadata for each video sequence, where the metadata describes the cinematic elements present in the sequence — 530

- D. designing a new model architecture capable of analyzing video content and generating video sequences based on input cinematic parameters — 540

- E. training the new model using the metadata generated by the captioner AI model as training data, where the training process conditions the new model to recognize and replicate the identified cinematic elements in video content — 550

- F. validating the accuracy of the new model in recognizing and generating cinematic elements within video sequences using a separate validation dataset processed through the captioner AI model — 560

- G. iteratively refining the new model based on performance feedback obtained during validation to enhance its ability to accurately analyze and generate video content based on cinematic elements — 570

- H. deploying the trained new model to analyze incoming video content and generate new video sequences that adhere to specified cinematic parameters, thereby demonstrating the model's understanding and application of cinematic elements — 580

- I. continuously updating the training dataset for the new model with additional metadata generated by the captioner AI model from newly compiled video sequences to ensure the new model remains current with cinematic trends and techniques — 590

FIG. 5

METHOD, SYSTEM, AND COMPUTER-READABLE MEDIUM FOR TRAINING A CAPTIONER MODEL TO GENERATE CAPTIONS FOR VIDEO CONTENT BY ANALYZING AND PREDICTING CINEMATIC ELEMENTS

CROSS-REFERENCE TO RELATED APPLICATION

This application claims the benefit of U.S. Provisional Application No. 63/726,140; filed on Nov. 27, 2024; and entitled "Systems And Methods For Enhancing Video Content Analysis And Generation Through Cinematic Element Recognition And Metadata Utilization", which is hereby incorporated by reference its entirety.

FIELD OF THE INVENTION

The present aspects relate to computing systems for enhancing video production processes, and more particularly, to systems designed for enhancing video content analysis and generation through cinematic element recognition and metadata utilization.

BACKGROUND

The continuous advancement and application of artificial intelligence (AI) in the realm of video creation have led to significant developments in generative AI technologies. These AI models have shown promise in generating video content that mimics certain aspects of professional filmmaking. However, despite these advancements, there remains a substantial gap between the capabilities of current AI video generation models and the nuanced requirements of professional filmmaking. This gap primarily stems from the AI's limited understanding of complex and interrelated cinematic principles which are fundamental to creating visually compelling and narratively coherent video content.

One of the persistent challenges in AI-generated video content is the AI's inability to accurately interpret and apply cinematic techniques that are second nature to human filmmakers. These techniques include, but are not limited to, the precise control of focal length, the nuanced application of camera movements such as dollies, pans, and tilts, and the creative use of shot types such as close-ups, wide shots, and over-the-shoulder shots. Furthermore, current AI struggles with replicating the dynamics of parallax, occlusion, and depth of field-elements that contribute significantly to the visual storytelling process.

Moreover, the existing AI video generation models often fail to maintain temporal consistency, resulting in video content that lacks smooth transitions and coherent movement, both of which are critical in professional video production. The outcome is often a disjointed and unrealistic representation of space and movement, undermining the potential of AI in filmmaking.

In particular, current AI video generation models struggle with controllability, due to the models' lacking the ability to emulate cinematic components, due to lacking real cinematic metadata due to training on datasets without information about technical cinematic parameters that filmmakers rely on (e.g., focal length, camera positioning, and detailed movement information). Further, current models are unable to reproduce filmmaking precision. For example, prompts that ask for specific visual effects-such as "approach the actor with a steady dolly-in movement using a 50 mm lens"—are difficult for current models to interpret or recreate. Without underlying training on how camera optics, motion, and framing impact video, current models cannot reliably generate images that align with these specific cinematic requirements.

Further, current AI-generated video models often struggle with producing consistent outputs. Current models may generate unpredictable or erratic camera movements, focal depth, and object positioning, making it impossible to achieve the controlled, repeatable results required in filmmaking. Moreover, current models fail to generalize complex cinematic concepts. Real-world filmmaking includes intricate variables like parallax, occlusion, and depth of field—all of which are intricately tied to camera placement and movement. Current models, cannot learn or generalize these variables effectively.

Current generative AI video generation models and technologies are plagued by uncanny and often grotesque outcomes/content: people disappear at random, sprout extra limbs, videos tend to appear bizarre and unrealistic and cannot be effectively improved or modulated. Part of this is explained by the linear hierarchy to text prompting in conventional visual AI. Specifically, the earlier a word is included in a prompt, the heavier that token will be weighted. For example, the prompt: "show me a lion who is resting in the jungle, with black hair and a top hat, surrounded by armed guards in New York city" may reliably produce a lion, but nothing that looks like New York City. Conventional visual AI functions based on "most relevant/important aspects defined first, less important second, etc." However, these conventional systems are engineered with an understanding of object meaning and none of photographic parameters, metaphorically prioritizing the contents of a jar before figuring out how much space it has to be filled. Ultimately, this results in prioritizing "fish" say, over "one pound" versus "one hundred tons" where the latter is more meaningful than the former.

A further illustration of the limitations and drawbacks of conventional systems is that, if one seeks to change an image post creation, photographic parameters, physical space and movement are far more difficult to alter than the object. A lion can be swapped for a dog more easily than the entire image can be altered to be seen from thirty feet in the sky. That involves an entirely different set of optical parameters, whereas the dog/lion swap changes one element. Because of these limitations, large video models currently cannot be used to generate video consistent with professional filmmaking standards, or even standards that consumers of film media would recognize as being distinguishable from a psychedelic fantasy; and as such, are often little more than an idle curiosity before one tires of them. Part of the reason for the disconnect may be that the creators of conventional LVMs are experienced engineers and computer scientists, rather than experienced film technology and cinema tool developers.

These limitations highlight the need for a more sophisticated approach to training AI models-one that goes beyond the surface level of object recognition and scene description. There are therefore opportunities for improved platforms and technologies for solving the identified conventional problems.

BRIEF SUMMARY OF THE INVENTION

In one aspect, a computer-implemented method for training a captioner model to generate captions for video content based on cinematic elements includes: (1) organizing a dataset comprising raw video clips and corresponding metadata, wherein each video clip represents a specific shot varying one cinematic parameter at a time selected from the group consisting of focal length, camera movement, and framing; (2) extracting frames from the video clips at a consistent frame rate and storing the frames in a structured format; (3) associating each frame with corresponding metadata detailing the cinematic elements present in the frame, wherein the metadata includes information on focal length, camera movement, object distance, and framing style; (4) segmenting the raw video clips into shots and frames, wherein a shot comprises a continuous sequence captured without cuts, and frames are extracted at regular intervals from each shot; (5) applying labels to each frame based on the associated metadata, wherein labels include focal length used during the shot, camera movement details, object distance from the camera, and framing style; (6) aggregating frame-level labels to generate shot-level labels, wherein the aggregation includes calculating average focal length, determining predominant framing style, and smoothing camera movement data across the shot; (7) training the captioner model using the labeled frames and aggregated shot-level labels to recognize and predict the cinematic elements in unseen video content; (8) iteratively refining the captioner model based on feedback from validation datasets to improve accuracy of cinematic element prediction; (9) deploying the trained captioner model to process and label a large video database, wherein the model generates metadata for new video content based on learned cinematic elements; and (10) post-processing the generated labels to ensure consistency and accuracy, including performing outlier detection, confidence scoring, and manual quality control.

In another aspect, a computing system for training a captioner model to generate captions for video content based on cinematic elements includes: one or more processors; and one or more memories, having stored thereon instructions that, when executed, cause the computing system to (1) organize a dataset comprising raw video clips and corresponding metadata, wherein each video clip represents a specific shot varying one cinematic parameter at a time selected from the group consisting of focal length, camera movement, and framing; (2) extract frames from the video clips at a consistent frame rate and store the frames in a structured format; (3) associate each frame with corresponding metadata detailing the cinematic elements present in the frame, wherein the metadata includes information on focal length, camera movement, object distance, and framing style; (4) segment the raw video clips into shots and frames, wherein a shot comprises a continuous sequence captured without cuts, and frames are extracted at regular intervals from each shot; (5) apply labels to each frame based on the associated metadata, wherein labels include focal length used during the shot, camera movement details, object distance from the camera, and framing style; (6) aggregate frame-level labels to generate shot-level labels, wherein the aggregation includes calculating average focal length, determining predominant framing style, and smoothing camera movement data across the shot; (7) train the captioner model using the labeled frames and aggregated shot-level labels to recognize and predict the cinematic elements in unseen video content; (8) iteratively refine the captioner model based on feedback from validation datasets to improve accuracy of cinematic element prediction; (9) deploy the trained captioner model to process and label a large video database, wherein the captioner model generates metadata for new video content based on learned cinematic elements; and (10) post-process the generated labels to ensure consistency and accuracy, including performing outlier detection, confidence scoring, and manual quality control.

In yet another aspect, a computer-readable medium having stored thereon a set of non-transitory instructions that, when executed, cause a computer to (1) organize a dataset comprising raw video clips and corresponding metadata, wherein each video clip represents a specific shot varying one cinematic parameter at a time selected from the group consisting of focal length, camera movement, and framing; (2) extract frames from the video clips at a consistent frame rate and store the frames in a structured format; (3) associate each frame with corresponding metadata detailing cinematic elements present in the frame, wherein the metadata includes information on focal length, camera movement, object distance, and framing style; (4) segment the raw video clips into shots and frames, wherein a shot comprises a continuous sequence captured without cuts, and frames are extracted at regular intervals from each shot; (5) apply labels to each frame based on the associated metadata, wherein labels include focal length used during the shot, camera movement details, object distance from the camera, and framing style; (6) aggregate frame-level labels to generate shot-level labels, wherein the aggregation includes calculating average focal length, determining predominant framing style, and smoothing camera movement data across the shot; (7) train a captioner model using the labeled frames and aggregated shot-level labels to recognize and predict the cinematic elements in unseen video content; (8) iteratively refine the captioner model based on feedback from validation datasets to improve accuracy of cinematic element prediction; (9) deploy the trained captioner model to process and label a large video database, wherein the captioner model generates metadata for new video content based on learned cinematic elements; and (10) post-process the generated labels to ensure consistency and accuracy, including performing outlier detection, confidence scoring, and manual quality control.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. There are shown in the drawings arrangements which are presently discussed, it being understood, however, that the present embodiments are not limited to the precise arrangements and instrumentalities shown, wherein:

FIG. 5 depicts a computer-implemented method for training a new model to analyze and generate video content based on cinematic elements using a captioner AI, according to some aspects.

DETAILED DESCRIPTION

Figure 1:
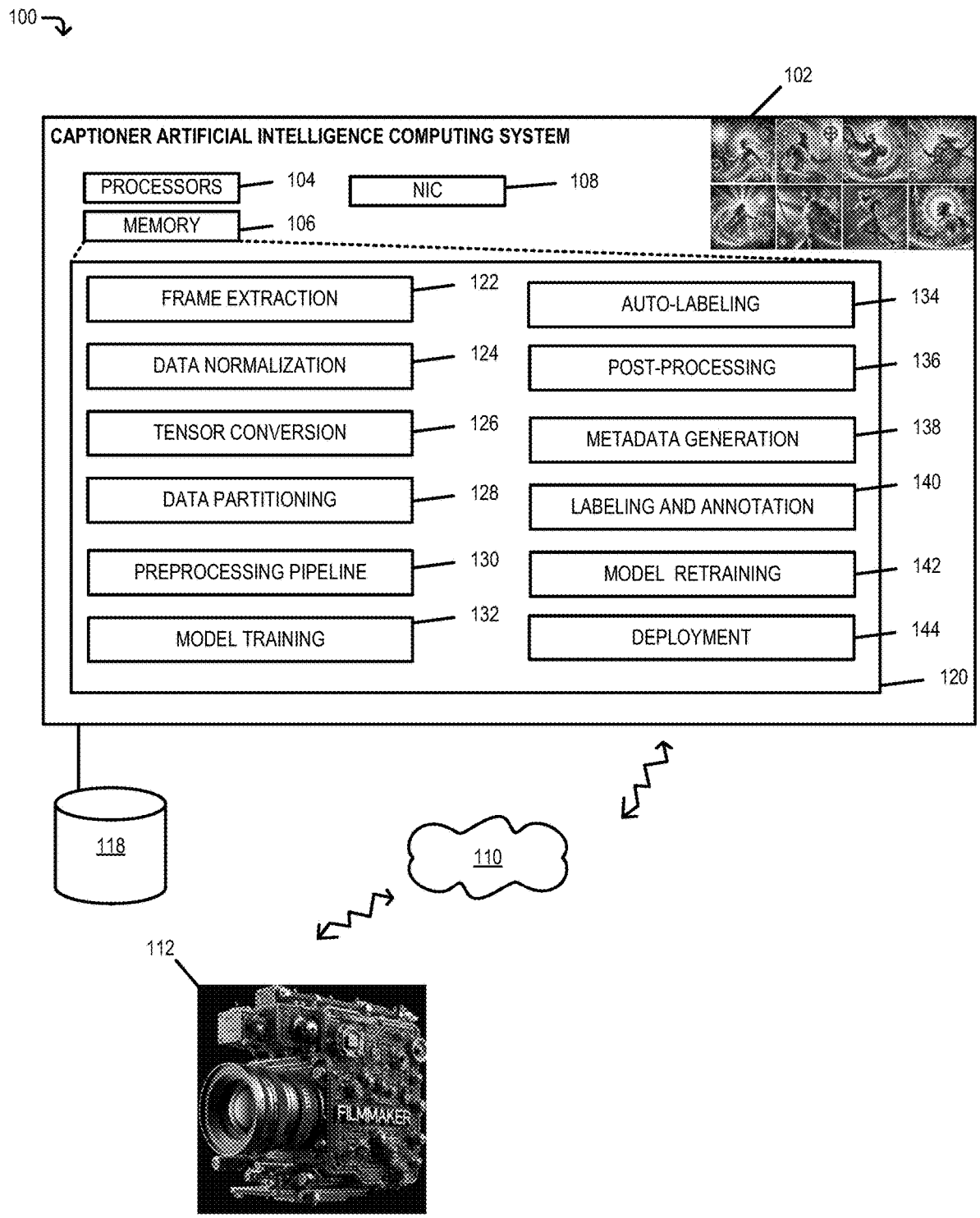
FIG. 1 depicts a captioner AI computing environment according to some aspects.
Figure 2:
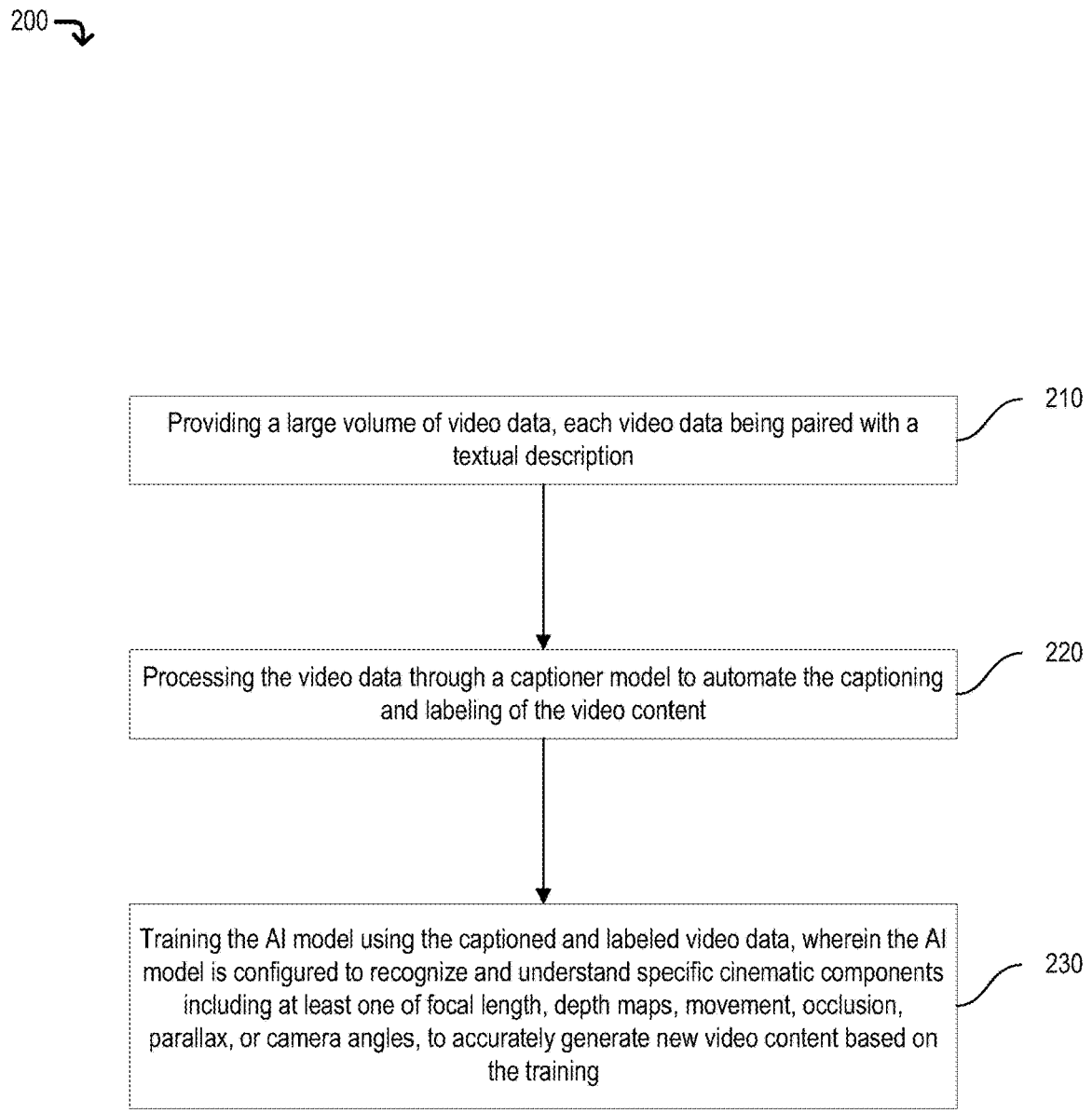
FIG. 2 depicts a computer-implemented method for generating metadata for video sequences, according to some aspects.
Figure 3:
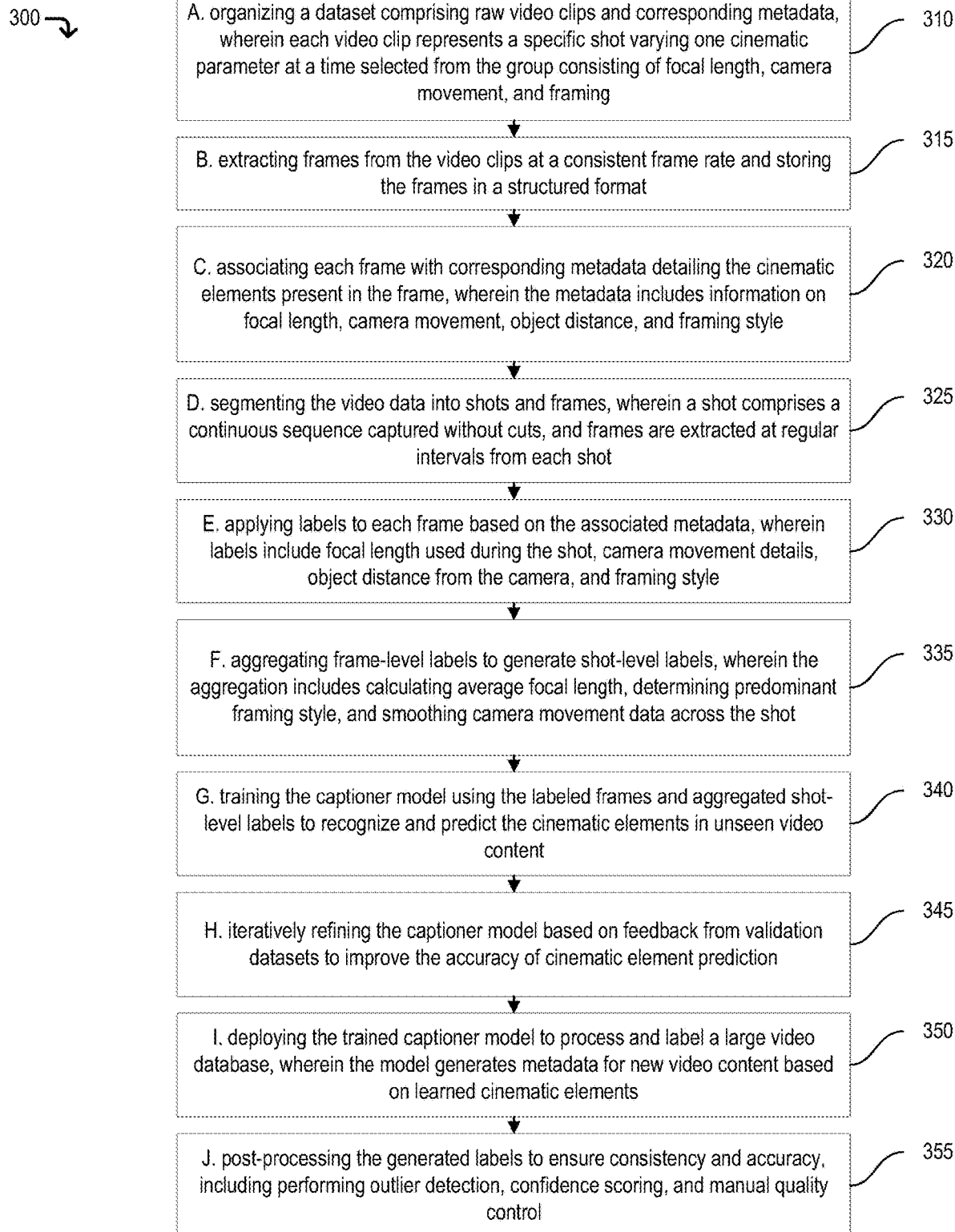
FIG. 3 depicts a computer-implemented method for training a captioner model to generate captions for video content based on cinematic elements, according to some aspects.
Figure 4:
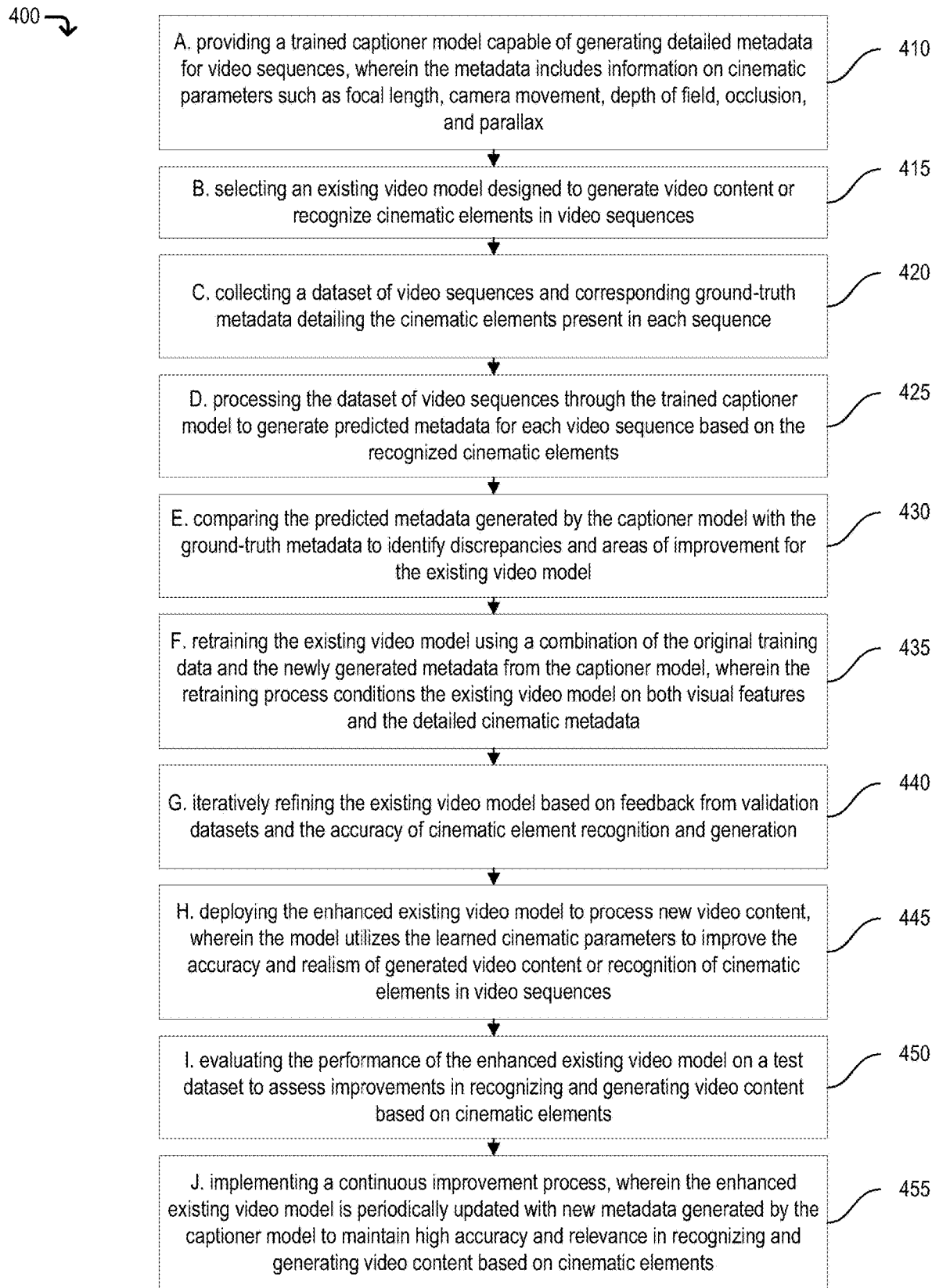
FIG. 4 depicts a computer-implemented method for enhancing an existing video model's ability to recognize and generate video content based on cinematic elements, according to some aspects.
Figure 6:
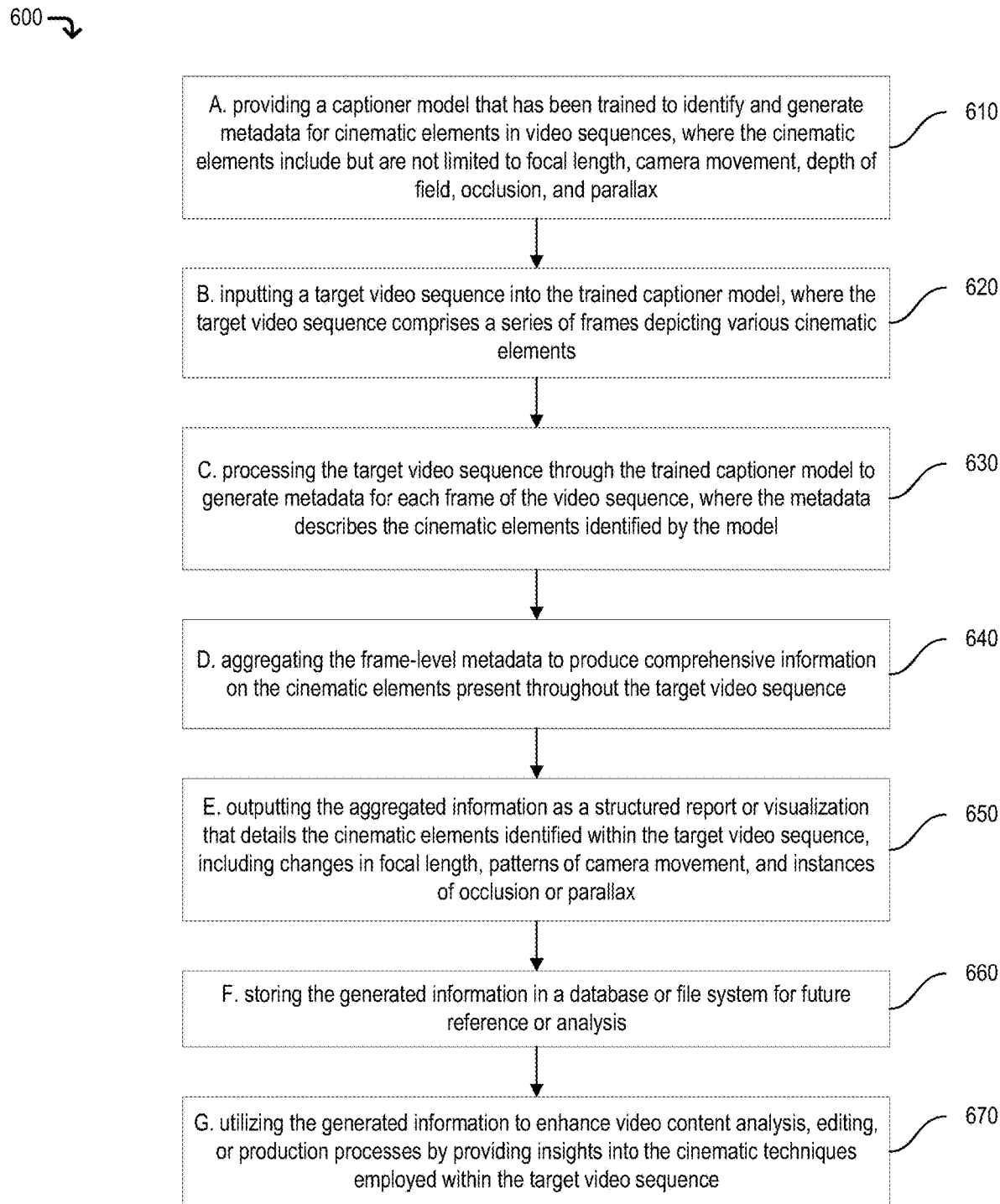
FIG. 6 depicts a computer-implemented method for generating information on cinematic elements within video content using a trained captioner model, according to some aspects.

The advent of generative artificial intelligence (AI) in the realm of video creation has opened up unprecedented avenues for content generation, yet it has simultaneously highlighted a significant gap in the technology's ability to understand and replicate the nuanced principles of professional filmmaking. This gap not only limits the potential applications of AI in the cinematic arts but also poses a risk to the integrity and future of human creativity in the field. Achieving photorealism and natural-looking video in AI generation requires understanding the physical constraints of the real world-such as how light interacts with objects, how lenses introduce distortion, and how camera movement affects the perception of depth. Without teaching the AI these physical and technical constraints through precise metadata, the generated video will always seem "off," lacking the natural coherence seen in real-world footage. Addressing this challenge, the present techniques are designed to bridge this gap by infusing AI with a deep understanding of cinematic principles, thereby revolutionizing the way AI interacts with and contributes to the art of filmmaking. The present modeling techniques, which may be referred to by the name SamildAnach, are engineered to comprehend and apply the complex, interrelated cinematic principles that have, until now, eluded the grasp of existing video AI technologies. By capturing, labeling, and training on highly specific cinematic metadata, the present techniques achieve true controllability in AI video generation, enabling the creation of footage that not only mimics the precision of professional filmmaking but also adheres to the creative vision of human filmmakers.

A challenge addressed by the present techniques lies in the current limitations of AI video generation models, which struggle with understanding and reproducing the technical cinematic components essential for realistic and controllable video output. Traditional models, while capable of recognizing objects or generating basic visual effects, fall short in accurately interpreting and recreating the intricate variables such as focal length, camera movement, shot type, and motion blur—elements that are fundamental to the language of film. The present approach, rooted in capturing and encoding these critical cinematic parameters, represents a paradigm shift in AI's capability to generate video content that meets professional standards.

The benefits of the present techniques extend beyond enhancing the realism and controllability of AI-generated video. By providing a tool that deeply understands cinematic techniques, the present techniques empower filmmakers, editors, and content creators with the ability to leverage AI in their creative processes without compromising on quality or artistic integrity. Furthermore, the present models open up new possibilities for efficiency and innovation in video production, offering a scalable solution that can adapt to the evolving demands of the industry.

The present techniques bring to AI video generation enhanced processing capabilities, including numerical tokenization for geographic metadata. In this regard, the present techniques enable processing of large datasets with high precision, reducing computational load and ambiguity. This method allows for faster convergence during training, enabling the model to accurately predict spatial relations and distances with minimal preprocessing. The precision of numerical data, coupled with the compact representation of 3D vectors, significantly reduces memory usage and computational complexity, making the present techniques highly efficient and effective in handling vast video libraries.

Further, a multi-task learning architecture included in the present techniques is designed to predict multiple cinematic parameters simultaneously. This approach not only ensures that the model optimizes for various tasks at once but also fosters a deeper understanding of how different cinematic elements interact within a shot. By training on temporal sequences of frames, the present techniques capture the dynamics of real-world camera movements, offering insights into how these movements affect visual output over time. This temporal component enables generating metadata that aligns with professional filmmaking standards, where smooth and natural transitions are paramount.

The deployment of the present techniques across large video databases showcases its scalability and efficiency. Through batch processing and distributed computing, the model labels extensive video libraries quickly, maintaining high-quality labeling standards. The focus on temporal sequence-based metadata generation ensures that predictions remain consistent and coherent, reflecting the continuous movement in professional filmmaking. Moreover, the integration of automated quality control mechanisms and continuous feedback loops allow for real-time error correction and model refinement, ensuring that the present techniques continually improves accuracy and reliability.

It should be understood that without first capturing and encoding critical cinematic elements, AI video generation will remain fundamentally flawed. Models will continue to produce unrealistic camera movements, inconsistent focal lengths, and poorly managed depth of field. They will fail to understand parallax or occlusion in ways that are crucial for realism, and filmmakers will not be able to rely on AI for precise, high-quality video generation. In short, if AI models do not learn the technical foundations of filmmaking—just as human filmmakers do—then their outputs will always lack the precise control and reliability that professional video production demands.

The structured approach of the present techniques—which includes capturing detailed cinematic metadata through controlled iterations and training the AI model on these precise parameters—is the only realistic path toward achieving true, reliable controllability in AI video generation. By teaching the model to understand the technical components of filmmaking, it can generate video that adheres to the same principles that guide human directors and cinematographers, bridging the gap between AI-generated content and real-world video production. Without this level of detailed training, AI-generated video will always remain a pale imitation of real footage, incapable of delivering the precise control required for professional filmmaking.

Exemplary Computing Environment

FIG. 1 depicts a computing environment 100 for generating metadata for video sequences. The computing environment 100 includes a captioner artificial intelligence (AI) computing system 102. The captioner AI computing system 102 includes one or more processors 104, one or more memories 106, and one or more network interface controllers (NICs) 108. The computing environment 100 may further include an electronic network 110, communicatively coupling the computing environment 100 to a Filmmaker computing environment 112. The Filmmaker computing environment 112 may correspond to the computing environment 100 of FIG. 1 of U.S. Patent Application No. 63/657,756 as incorporated herein.

The memory 104 includes a plurality of modules, each being a respective set of computer-executable instructions. These modules may include a Frame Extraction Module 122 including computer-executable instructions for extracting frames from video at specified intervals, a Data Normalization Module 124 including computer-executable instructions for normalizing camera and movement data, a Tensor Conversion Module 126 including computer-executable instructions for converting metadata into tensors suitable for neural network processing, a Dataset Partitioning Module 128 including computer-executable instructions for dividing the dataset into training, validation, and testing subsets, a Pre-processing Pipeline Module 130 including computer-executable instructions for preparing the dataset for training, a Model Training Module 132 including computer-executable instructions for defining and executing model training parameters and strategies, an Auto-Labeling Module 134 including computer-executable instructions for performing frame-level inference and shot-level aggregation based on the trained model, a Post-Processing Module 136 including computer-executable instructions for ensuring label consistency and conducting quality control, a Metadata Generation Module 138 including computer-executable instructions for creating detailed metadata files for each video, a Labeling and Annotation Module 140 including computer-executable instructions for establishing ground-truth standards and segmenting videos into shots and frames, a Model Retraining Module 142 including computer-executable instructions for retraining pre-trained video models with newly generated metadata, and a Deployment Module 144 including computer-executable instructions for deploying the model to label a large video database efficiently.

The computing environment 100 may include a captioner artificial intelligence (AI) computing system 102, which is designed to generate metadata for video sequences. This system may analyze video content and produce metadata that describes cinematic elements, thereby facilitating the enhancement of video content with detailed, technical metadata.

The captioner AI computing system 102 may include one or more processors 104, responsible for executing the operations necessary for analyzing video sequences and generating metadata. These processors perform the essential computations to identify and describe cinematic elements within video content, such as camera movements, shot types, and focal lengths. The processors 104 within the captioner AI computing system 102 may be technically implemented using a variety of hardware configurations to efficiently execute the complex computational tasks for video analysis and metadata generation. These hardware configurations can include: 1. Central Processing Units (CPUs): The CPUs are the primary processors that can handle a wide range of computational tasks. They are versatile and can execute the instructions of most software applications. In the context of the captioner AI computing system, CPUs can manage tasks such as coordinating data flow between other components, executing the control logic, and performing the less computationally intensive parts of the video analysis process. 2. Graphics Processing Units (GPUs): GPUs are specialized electronic circuits designed to accelerate the creation of images and videos for output to a display. They are highly efficient at processing large blocks of data in parallel, making them particularly well-suited for the intensive computations involved in video processing and deep learning tasks. In the captioner AI computing system, GPUs can be utilized to speed up the analysis of video frames and the generation of metadata by performing multiple operations simultaneously. 3. Tensor Processing Units (TPUs): TPUs are application-specific integrated circuits (ASICs) developed specifically for accelerating machine learning tasks. They are optimized for the high-volume, low-precision arithmetic operations commonly required in deep learning computations. TPUs can significantly enhance the performance and efficiency of the machine learning models used in the captioner AI computing system for analyzing video content and generating metadata. 4. Field-Programmable Gate Arrays (FPGAs): FPGAs are integrated circuits that can be configured by the customer or designer after manufacturing-hence "field-programmable". FPGAs can be tailored to execute specific computational tasks more efficiently than general-purpose processors like CPUs. In the captioner AI computing system, FPGAs can be programmed to optimize specific video processing or machine learning algorithms, thereby improving performance and power efficiency. These hardware components can be integrated into the captioner AI computing system either individually or in combination, depending on the specific computational requirements and performance goals of the system. By leveraging the strengths of each type of processor, the captioner AI computing system can efficiently handle the demanding tasks of video analysis and metadata generation, thereby supporting the generation of detailed, accurate metadata for video sequences.

The captioner AI computing system 102 may also include one or more memories 106, serving as storage for the computer-executable instructions needed to operate the system and the video data and metadata being processed. These memories are vital for the efficient handling and temporary storage of large volumes of video data and the resulting metadata generated during the analysis process.

The memories 106 within the captioner AI computing system 102 may be technically implemented using various types of memory hardware to efficiently store and manage the data and instructions required for video analysis and metadata generation. These memory types can include: 1. Random Access Memory (RAM): RAM is a type of volatile memory used to store working data and machine code currently in use. It provides fast read and write access to a storage medium that is directly accessible by the CPU. In the context of the captioner AI computing system, RAM can be used to temporarily hold the video data being processed, intermediate results of the analysis, and the computer-executable instructions for the system's operation. This allows for quick access and manipulation of data during the video analysis process. 2. Read-Only Memory (ROM): ROM is a type of non-volatile memory used to store firmware or permanent software that is rarely changed. In the captioner AI computing system, ROM can store the system's boot firmware and other critical software components that are essential for the system's startup and basic operation. 3. Solid-State Drives (SSDs): SSDs are a type of non-volatile storage media that use integrated circuit assemblies to store data persistently. SSDs offer fast read and write speeds and are more durable and reliable than traditional hard disk drives (HDDs). In the captioner AI computing system, SSDs can be used to store the large volumes of video data being analyzed, as well as the generated metadata, ensuring quick access and efficient processing. 4. Hard Disk Drives (HDDs): HDDs are a type of non-volatile storage that uses magnetic storage to store and retrieve digital data. While generally slower than SSDs, HDDs offer a cost-effective solution for storing large amounts of data. In the captioner AI computing system, HDDs can be used for long-term storage of video archives and the associated metadata. 5. Cache Memory: Cache memory is a small-sized type of volatile computer memory that provides high-speed data access to the processor and stores frequently used computer programs, applications, and data. Cache memory can significantly speed up the processing by reducing the average time to access data from the main memory. In the captioner AI computing system, cache memory can be used to store frequently accessed data and instructions, thereby speeding up the video analysis and metadata generation processes. These memory components can be configured in various combinations within the captioner AI computing system to meet the specific storage and data access requirements of the video analysis and metadata generation tasks. By optimizing the use of different types of memory, the captioner AI computing system can efficiently manage the large volumes of data involved in video processing, ensuring fast and reliable generation of metadata for video sequences.

Additionally, the captioner AI computing system 102 may include one or more network interface controllers (NICs) 108, enabling the system to communicate with other devices and networks. These NICs are crucial for facilitating the transfer of video data and metadata between the captioner AI computing system and external systems or databases, ensuring seamless integration and data exchange.

The network interface controllers (NICs) 108 within the captioner AI computing system 102 may be technically implemented using various types of network hardware to enable efficient communication between the captioner AI computing system and other devices or networks. These NICs facilitate the transfer of video data and metadata between the captioner AI computing system and external systems, databases, or the internet. The types of NICs can include: 1. Ethernet NICs: Ethernet NICs provide wired connectivity to local area networks (LANs) and the internet via Ethernet cables. They are commonly used for high-speed data transfers and can support various speeds, such as 1 Gbps, 10 Gbps, or even higher. In the captioner AI computing system, Ethernet NICs can be used for reliable, high-speed communication with other systems within the same network, facilitating the transfer of large video files and metadata. 2. Wireless NICs: Wireless NICs enable connectivity to wireless networks using Wi-Fi technology. They offer the flexibility of connecting to networks without the need for physical cables, although they may provide slower data transfer speeds compared to Ethernet NICs. In the captioner AI computing system, wireless NICs can be used for situations where wired connectivity is not feasible or for connecting to wireless devices and networks for data exchange. 3. Fiber Optic NICs: Fiber optic NICs use optical fibers to transmit data at very high speeds over longer distances than is possible with electrical cabling. They are ideal for high-performance computing environments and data centers requiring fast and reliable data transfers over wide area networks (WANs). In the captioner AI computing system, fiber optic NICs can be used for connecting to high-speed internet services and for transferring large volumes of video data and metadata between geographically dispersed systems. 4. Thunderbolt NICs: Thunderbolt NICs provide a high-speed interface that combines data, video, audio, and power in a single connection. They are particularly useful for connecting external devices that require high bandwidth, such as high-resolution video capture devices. In the captioner AI computing system, Thunderbolt NICs can be used for direct, high-speed connections to external video sources or storage devices. These NICs can be integrated into the captioner AI computing system either individually or in combination, depending on the specific communication requirements and performance goals of the system. By leveraging the strengths of each type of NIC, the captioner AI computing system can ensure efficient and reliable communication for the transfer of video data and metadata, thereby supporting the seamless integration of the system into video production and analysis workflows.

The electronic network 110 within the computing environment 100 may include various types of networking hardware and protocols to enable efficient communication and data exchange between the captioner AI computing system 102 and the Filmmaker computing environment 112, as well as other external systems or services. This network is crucial for facilitating the seamless transfer of video data, metadata, and other relevant information across different computing environments. The components and characteristics of the electronic network 110 can include: 1. Routers and Switches: Routers and switches are fundamental components of the electronic network 110, directing data traffic and ensuring that information is sent and received by the correct devices. Routers enable multiple networks to communicate with each other, while switches connect devices within the same network. In the computing environment 100, routers and switches manage the flow of video data and metadata between the captioner AI computing system and external networks or systems. 2. Network Protocols: The electronic network 110 utilizes various network protocols to govern the communication between devices. These protocols include Transmission Control Protocol/Internet Protocol (TCP/IP) for general data transmission, Hypertext Transfer Protocol (HTTP) and its secure version HTTPS for web-based data exchange, and File Transfer Protocol (FTP) for transferring large files. These protocols ensure reliable and standardized communication across the network. 3. Firewalls and Security Appliances: To protect the data being transferred across the electronic network 110, firewalls and security appliances are implemented to monitor and control incoming and outgoing network traffic based on predetermined security rules. These devices help safeguard sensitive video data and metadata from unauthorized access or cyber threats. 4. Virtual Private Networks (VPNs): VPNs may be used within the electronic network 110 to create secure connections over the internet, allowing for the encrypted transfer of data between the captioner AI computing system and remote systems or users. VPNs are particularly useful for ensuring the privacy and security of data exchanges involving proprietary video content or confidential metadata. 5. Cloud Services and Infrastructure: The electronic network 110 may also incorporate cloud-based services and infrastructure to facilitate scalable and flexible data storage, processing, and exchange. Cloud platforms can host video data and metadata, providing accessible and efficient resources for the captioner AI computing system to perform its tasks without the constraints of local hardware limitations. By integrating these components and leveraging advanced networking technologies, the electronic network 110 enables the computing environment 100 to efficiently handle the demands of video data and metadata generation, transfer, and analysis. This network infrastructure supports the collaborative and data-intensive workflows of the captioner AI computing system and the Filmmaker computing environment, ensuring that video content can be enhanced and utilized to its fullest potential.

The Filmmaker computing environment 112 may include specialized tools and systems designed for professional video production and filmmaking. Utilizing the metadata generated by the captioner AI computing system, the Filmmaker computing environment can achieve greater precision and control over the cinematic elements of video content, thereby elevating the quality and impact of video productions.

The AI computing system 102 may further include an electronic database 118. The electronic database 118 may include a structured storage system designed to efficiently organize, store, and manage the metadata generated by the captioner AI computing system 102. This database is crucial for maintaining a comprehensive repository of detailed metadata associated with video sequences, facilitating easy access, retrieval, and utilization of this information for various purposes. The electronic database 118 may be implemented using various database management systems (DBMS), such as relational databases (e.g., MySQL, PostgreSQL), NoSQL databases (e.g., MongoDB, Cassandra), or cloud-based database services (e.g., Amazon RDS, Google Cloud Firestore). The choice of DBMS can depend on the specific requirements for scalability, performance, and the nature of the metadata being stored.

In operation, the electronic database 118 may function as the central hub for all metadata-related transactions. It receives processed metadata from the Deployment Module 144, which includes information such as camera movements, shot types, focal lengths, and other cinematic elements identified during the video analysis process. Once stored, this metadata can be queried, updated, or deleted based on user requests or system needs. The electronic database 118 may also include indexing and search functionalities to enable efficient querying and retrieval of metadata. For example, it might allow filmmakers, editors, or content creators to search for video sequences based on specific metadata criteria, such as all clips shot with a particular focal length or featuring a certain type of camera movement. This capability significantly enhances the usability of the stored metadata, making it a valuable resource for enhancing video content, supporting filmmaking processes, and enabling advanced video analysis and content discovery.

Furthermore, the electronic database 118 may be designed to support integration with post-production tools, visual effects software, and video databases. This integration allows the seamless transfer and application of metadata within professional video production workflows, thereby streamlining operations and enhancing the creative process. By serving as the repository for meticulously generated and processed metadata, the electronic database 118 plays a pivotal role in maximizing the utility of the captioner AI computing system's outputs, supporting a wide range of applications from professional filmmaking to content management and beyond.

In operation, the Frame Extraction Module 122 functions by extracting frames from video at specified intervals, ensuring that each frame can be analyzed individually for metadata generation. This module is essential for breaking down video sequences into manageable units for further processing. The Data Normalization Module 124 operates by normalizing camera and movement data across all shots, ensuring consistency in the data being analyzed. This normalization process is crucial for accurate comparison and analysis of video content from different sources or with varying recording parameters. The Tensor Conversion Module 126 functions by converting metadata into tensors suitable for neural network processing. This conversion is vital for feeding structured data into machine learning models, allowing for efficient training and inference processes. The Dataset Partitioning Module 128 operates by dividing the dataset into training, validation, and testing subsets. This partitioning is essential for evaluating the performance of machine learning models and ensuring that they generalize well to unseen data. The Preprocessing Pipeline Module 130 functions by preparing the dataset for training according to specified steps, including frame extraction, data normalization, and tensor conversion. This module ensures that the data is in the correct format and condition for effective model training. The Model Training Module 132 operates by defining and executing model training parameters and strategies. This module is responsible for overseeing the learning process, adjusting parameters as needed to optimize model performance. The Auto-Labeling Module 134 functions by performing frame-level inference and shot-level aggregation based on the trained model. This module automates the process of generating metadata for video content, significantly reducing manual effort and increasing efficiency. The Post-Processing Module 136 operates by ensuring label consistency and conducting quality control. This module reviews the generated metadata for accuracy and coherence, making corrections as necessary to maintain high-quality outputs. The Metadata Generation Module 138 functions by creating detailed metadata files for each video, encapsulating information such as camera movements, shot types, and focal lengths. This module is key to producing structured metadata that can be used to enhance video content and support filmmaking processes. The Labeling and Annotation Module 140 operates by establishing ground-truth standards and segmenting videos into shots and frames. This module lays the foundation for accurate metadata generation by defining clear criteria and organizing video content into analyzable units. The Model Retraining Module 142 functions by retraining pre-trained video models with newly generated metadata. This module allows for the continuous improvement of models by incorporating fresh data and insights, ensuring that the models remain effective and up-to-date. The Deployment Module 144 operates by deploying the model to label a large video database efficiently. This module manages the scaling and integration of the captioner AI computing system into production environments, enabling the widespread application of generated metadata to enhance video content across various platforms and projects.

In operation, the modules within the captioner AI computing system work together in a cohesive and systematic manner to generate metadata for video sequences, enhancing the video content with detailed, technical metadata that describes cinematic elements. The process begins with the Frame Extraction Module 122, which extracts individual frames from video sequences at specified intervals. This initial step is crucial for breaking down the video into manageable units for further analysis. Once the frames are extracted, the Data Normalization Module 124 normalizes camera and movement data across all shots to ensure consistency in the data being analyzed. This step is vital for preparing the data for accurate comparison and analysis, regardless of the source or recording parameters of the video content. Following normalization, the Tensor Conversion Module 126 converts the metadata into tensors suitable for neural network processing. This conversion facilitates the efficient training and inference processes of machine learning models by structuring the data in a format that these models can easily process. To optimize the performance of machine learning models and ensure they generalize well to unseen data, the Dataset Partitioning Module 128 divides the dataset into training, validation, and testing subsets. This partitioning allows for the evaluation of model performance and adjustments to be made to improve accuracy and reliability. The Preprocessing Pipeline Module 130 further prepares the dataset for training by executing specified preprocessing steps, ensuring that the data is in the correct format and condition for model training. This comprehensive preparation is essential for the effective learning of the machine learning models. With the data properly prepared, the Model Training Module 132 defines and executes model training parameters and strategies, overseeing the learning process and optimizing model performance through adjustments to parameters as needed. Once the models are trained, the Auto-Labeling Module 134 automates the generation of metadata for video content by performing frame-level inference and shot-level aggregation. This automation significantly reduces manual effort and increases the efficiency of metadata generation. The Post-Processing Module 136 ensures the consistency and quality of the generated metadata by reviewing outputs for accuracy and coherence, making necessary corrections to maintain high-quality metadata outputs. Simultaneously, the Metadata Generation Module 138 creates detailed metadata files for each video, encapsulating essential information such as camera movements, shot types, and focal lengths. This structured metadata is key to enhancing video content and supporting filmmaking processes. The Labeling and Annotation Module 140 establishes ground-truth standards and organizes video content into analyzable units by segmenting videos into shots and frames. This foundational work lays the groundwork for accurate metadata generation. To keep the models effective and up-to-date, the Model Retraining Module 142 re-trains pre-trained video models with the newly generated metadata, incorporating fresh data and insights for continuous model improvement. Finally, the Deployment Module 144 manages the scaling and integration of the captioner AI computing system into production environments, enabling the application of generated metadata to enhance video content across various platforms and projects efficiently. This end-to-end operation of the modules ensures the systematic generation, validation, and application of metadata to video sequences, thereby elevating the quality and utility of video content in professional filmmaking and beyond.

It should be understood that the configuration of the modules 120, as outlined, represents one possible arrangement for generating and applying metadata to video sequences. Depending on the specific requirements, technological context, or desired efficiencies of a given project, the actual system implementation might vary, incorporating more or fewer modules than initially described. Additionally, the sequence in which these modules operate could also differ to better align with particular processing or analytical goals. For instance, in some implementations, it might be beneficial to introduce an Enhanced Quality Control Module that operates post-metadata generation but prior to deployment. This module could employ advanced algorithms to perform a deeper analysis of the metadata's accuracy and consistency, ensuring that any anomalies are detected and addressed before the metadata is applied to video content. This addition would be particularly useful in high-stakes environments where metadata precision is critical. Conversely, certain scenarios might allow for the merging of functionalities, such as combining the Auto-Labeling Module 134 and the Post-Processing Module 136 into a singular module. This consolidation could streamline the workflow, reducing processing time without sacrificing the quality of the metadata output.

Moreover, the order in which these modules operate might be adapted based on specific needs. For example, in a system prioritizing rapid metadata generation for live streaming content, the Deployment Module 144 might be activated earlier in the process. This adjustment would ensure that metadata is generated and applied in real-time, enhancing live video streams with valuable information for viewers or downstream processing systems. Alternatively, the Model Retraining Module 142 could be positioned to continuously receive feedback from the Deployment Module 144, allowing for immediate retraining and refinement of models based on the performance of deployed metadata. This cyclical approach ensures that the system remains dynamic and responsive to new data, potentially deviating from a more linear operational sequence. These examples underscore the system's adaptability, highlighting how modifications to the number and arrangement of modules can optimize the metadata generation and application process. By tailoring the system architecture to fit the unique demands of different projects or technological landscapes, it's possible to achieve enhanced performance, efficiency, and metadata quality, thereby maximizing the value of video content across various applications.

Exemplary Data Collection and Preparation

The present techniques may include data collection and preparation on a soundstage, in some aspects. The process of capturing and organizing the dataset on a soundstage for training one or more captioner models may include exposing the captioner models to a wide range of cinematic setups, focusing on both single-variable and multi-variable iterations. This process is designed to teach the captioner model relationships between various cinematic parameters such as focal length, camera movement, shot types, occlusion, parallax, and motion blur. By structuring the dataset around these core variables and capturing data in a controlled environment, the captioner model learns technical aspects of cinematography with high precision.

In some aspects, the dataset is organized to facilitate efficient model training, with video sequences meticulously labeled with metadata that includes focal length, camera movement vectors, and shot types. This organization allows for a stratified sampling approach in dataset splitting, ensuring that the training, validation, and testing sets each contain a balanced representation of the cinematic variables. This careful structuring allows the captioner models to generalize well across different cinematic setups and to learn the complex interdependencies between the parameters.

In some aspects, a preprocessing pipeline is used in preparing data for the captioner model. The preprocessing pipeline may include extracting frames from the video sequences and associating them with detailed metadata that describes the technical cinematic parameters. Special attention may be given to ensuring temporal consistency in the metadata, allowing the captioner models to learn dynamics of camera movement and its effects on the visual output. Additionally, the preprocessing pipeline may include sets of computer-executable instructions for encoding focal length, camera movement vectors, shot types, and motion blur parameters in a structured format that the model can efficiently process.

Exemplary Computer-Implemented Methods

The present techniques may include computer-implemented methods for captioning a video dataset (e.g., a library of videos, raw film footage, etc.) after training using a data set having significant variability across a number of interdependent parameters. For example, the training parameters may include focal length variation, camera movement variation, frame rate variation, shutter speed and shutter angle, lighting and exposure, depth of field (aperture), scene composition (framing), and combined variables. A discussion of these variables follows, along with respective examples of how the parameters may be individually configured, and their respective semantics.

Focal length influences the perspective, depth, and compression in the scene, so it's essential to train the model across a wide range of focal lengths. Range: The training dataset may cover focal lengths from wide-angle lenses (e.g., 16 mm, 24 mm) to telephoto lenses (e.g., 85 mm, 135 mm, 200 mm). Single-Variable Iteration: Shoot the same scene using several different focal lengths while keeping other parameters constant (movement, frame rate, etc.) to isolate the effect of focal length alone. Example: Include at least 5-7 different focal lengths (e.g., 16 mm, 24 mm, 35 mm, 50 mm, 85 mm, 135 mm) to teach the model how these variations impact visual elements like field of view and depth compression.

Camera movement adds complexity because it can affect how focal length, frame rate, and shutter rate are perceived. Types of Movements: Include various types of camera movement, such as static shots, dolly(forward/backward), pan (horizontal rotation), tilt (vertical rotation), tracking shots, and handheld movement. There are six basic axis to consider: when the camera doesn't move-pan, tilt, yaw. When it moves: x,y,z. Single-Variable Iteration: Vary camera movement while holding other parameters like focal length and frame rate constant. Start with static shots, then add controlled movements like slow pans and tilts, and increase to more complex movements like tracking and handheld shots. Example: Include at least 3-5 movement styles (e.g., static, dolly, pan, tilt, handheld) to teach the model how movement impacts the overall composition and how it interacts with other parameters like focal length. Include continuous motion controlled movement at pre-set lighting levels so further iterations under those specific parameters can be continued in the future.

Frame rate affects motion perception and how smooth or jittery movements appear. It's especially important for understanding fast or slow camera movements. Range: Use common cinematic frame rates such as 24 fps (standard for film), 30 fps (common for TV), and 60 fps (for slow motion or high-detail sequences). Single-Variable Iteration: Shoot the same scene with different frame rates to see how it impacts motion blur, shutter speed, and general smoothness. Focus on both slow and fast movements at different frame rates. Example: Use at least 3 frame rates (e.g., 24 fps, 30 fps, 60 fps). If the model needs to handle slow motion or fast motion sequences, higher frame rates like 120 fps or 240 fps will also be considered. Note: this correlates to the speed with which film will move through the camera when films were made on film and is different than shutter angle, refresh rate or the use of frame rate consistent with the frame rate intended for playback, such as "The Hobbit", or "Gemini Man", which were shot at 48 fps and 120 fps respectively but played back at those speeds for the purpose of 'sharpness' of image, not the appearance of a change of speed of the events taking place.

Shutter speed controls motion blur, and in video, it's often discussed in terms of shutter angle (which relates to frame rate). Varying this parameter may enable a captioner model to learn how motion blur changes the aesthetic of the footage. The wider the shutter, the more light is admitted into the sensor, eliminating "motion blur." It is also used to eliminate flickering, which is a significant problem for some existing video generation systems (e.g., OpenAI Sora, which has no language to address the issue). Range: Use different shutter angles, such as 180° (standard for most cinema), 90° (for less motion blur), and 360° (for more motion blur). Single-Variable Iteration: Keep focal length, frame rate, and movement constant while varying the shutter angle to see how motion blur is affected in both fast and slow-moving scenes. Example: Train the model on at least 3 different shutter angles (e.g., 90°, 180°, 360°) to account for different levels of motion blur.

Lighting conditions can dramatically change how focal length, shutter speed, and movement are perceived. The model may be trained to understand how different exposure settings interact with these parameters. Variation: Use a range of lighting setups, from low light to bright, high-key lighting. Vary the exposure settings (ISO, aperture) to teach the model how these affect image quality and motion blur. Single-Variable Iteration: Keep all other variables constant and shoot the same scene in different lighting setups and exposure settings. Example: Include at least 3 lighting setups (low light, normal light, bright light) with different exposure levels for each. Also include one example of a film "style" such as Film Noir, so that the model can exactly understand the lighting construction rather than having to infer from labeling which may not be accurate.

Depth of field (DoF) is influenced by both aperture and focal length. The model may be trained to learn understand how changing DoF affects the overall look of the shot, particularly in relation to focal length. Range: Use varying aperture sizes (e.g., f/2.8, f/5.6, f/11) to teach the model how aperture interacts with focal length and affects background blur (bokeh). Single-Variable Iteration: Keep focal length constant and vary aperture to isolate the effect on depth of field. For example, Use at least 3 aperture settings across different focal lengths (e.g., f/2.8 for shallow DoF, f/5.6 for moderate DoF, and f/11 for deep DoF).

The model may be exposed to different framing styles, such as close-up, medium shot, wide shot, over-the-shoulder, etc. Range: Include variations in framing (e.g., close-up, medium, wide) across different focal lengths and camera movements. This will help the model understand how these elements affect subject emphasis and spatial relationships. Single-Variable Iteration: Keep focal length and movement constant while varying the framing style for different subjects. For example, Use at least 3-4 framing styles (e.g., close-up, medium shot, wide shot) across multiple focal lengths and camera movements.

In some aspects, after training the model with single-variable iterations, multi-variable scenarios may be introduced, by changing several parameters simultaneously. This step teaches the captioner model how the interdependencies between these parameters affect the overall cinematic aesthetic. For example, such combinations may include (1) use wide-angle focal lengths with fast handheld movements; (2) combine slow panning movements with telephoto lenses and shallow depth of field; (3) change frame rate along with shutter angle and movement speed to simulate slow-motion effects; (4) use motion control camera to move while changing focal length to allow frame-by-frame captioning where those parameters shift within a clip. Multi-variable testing may be performed on wide variety of human models. The present techniques may also include gradual multi-variable testing. For example, start by combining two variables (e.g., changing both focal length and frame rate), then gradually increase the complexity by varying three or more parameters simultaneously. Gradual multi-variable testing helps to ensure that the model learns how these cinematic elements interact in real-world conditions.

Exemplary Generalization and Overfitting

The present techniques seek to avoid overfitting by ensuring the training footage is sufficiently diverse. If the model is exposed to only a limited range of focal lengths or camera movements, it may struggle to generalize to new footage. To improve generalization, the following practices may be employed: (1) while focusing on technical elements, use different types of subjects (e.g., people, objects,) and to ensure the model does not overfit as much as possible given the constraints of a controlled environment; (2) use various shooting conditions (e.g., different lighting set ups, different objects, human and non-human, dynamic vs. static subjects) to ensure the model generalizes across as many scenarios as possible; (3) use as large a variety of human models as possible: for several shot selections, including "inserts," captioner was trained with a thousand human models and hundreds of objects held in their hands for the inserts (hands are particularly difficult for generative AI to reproduce accurately); (4) remove obvious tagging devices such as laser locators or the model will overfit and generate people wearing those devices.

By covering a broad spectrum of focal lengths, camera movements, frame rates, shutter speeds, and other parameters, the captioner model learns how these variables interact and will be able to generalize effectively across a wide range of professional cinematic footage.

Exemplary Training Data, Data Partitioning, Preprocessing, Storage, and Consistency The present techniques may include a computer-implemented method for using one or more training datasets to train the captioner AI models. The training dataset structure may include a plurality of shots, wherein each shot includes Raw Video (video footage, which will contain the visual data) and Metadata (i.e., structured data for each shot), including at least one of the following: Focal Length: Captured with the lens used, measured in millimeters (e.g., 24 mm, 50 mm, 85 mm); Camera Movement: Translational (X, Y, Z axes) and rotational (pitch, yaw, roll) movement data (e.g., recorded at each frame or as keyframe points in metadata, using LiDAR or laser locator data for precision and encoded numerically); Object Distance: The distance from the camera to the object of focus; Cinematic Framing: Labeling shots as close-up, over-the-shoulder, wide, etc., based on shot composition and arrangement; and Hand labeled Scene Information: Static or moving subject, lighting conditions, background details, etc., if relevant.

The dataset may include labels at frame and/or shot labels. For example, Frame-Level Labels may be stored in the dataset for every frame in each shot, and may include at least one of Exact Focal Length: Mark the lens used for every frame; Camera Movement: Label each frame's camera position, velocity, and acceleration along the X, Y, Z axes (e.g., directly from the motion tracking metadata (LiDAR and laser locator data) and recorded numerically for use later in numerical tokenization for greater accuracy; and Object Distance and Position: Use the LiDAR and laser locator data to track the object's position relative to the camera. For each frame, labels may be stored according to the following schema:

```
{
  "frame": 1245,
  "timestamp": "00:02:03.45",
  "focal_length": 35,
  "camera_position": {"x": 2.45, "y": 1.25, "z": -3.45},
  "camera_rotation": {"pitch": 0.34, "yaw": 1.22, "roll": 0.11},
  "object_distance": 2.6,
  "framing": "over_the_shoulder"
}
```

The dataset may also include Shot-Level Labels: For entire shots, label the intended framing (close-up, medium, wide, etc.), and whether it's static or includes movement.

The method may include splitting the dataset (i.e., partitioning) into training, validation and testing subsets, to ensure the model generalizes well. For example, this splitting may be performed as follows: Training Set: This will include the majority of data (around 70-80%). It will cover the full range of variables—different focal lengths, types of movement, and framing techniques. Validation Set: Around 10-15% of the data. Use this for hyperparameter tuning and model selection. It covers rare combinations of focal lengths, movement, and framing. Test Set: 10-15%, used to assess the final performance. This includes some shots and movement types the model has not been provided during training, ensuring the model can generalize.

The method may include a preprocessing pipeline to prepare the dataset for training, according to the following steps: Frame Extraction: Extract frames from video at regular intervals (e.g., every 30 ms) or key points (e.g., when movement changes). Normalize Camera and Movement Data: Normalize the X, Y, Z axis data for camera movement across all shots so that movement scale differences (between close-ups and wide shots) don't cause biases in the model. Use min/max normalization. Convert to Tensor Format: The model will expect inputs in tensor format. Convert the metadata (focal length, camera movement, etc.) into tensors that can be passed into a neural network, with each feature (like focal length, movement) as part of a vector that gets fed into the model.

The method may include organizing this dataset by generating a folder structure to store video clips and metadata as follows:

Folder Structure:
  /dataset/
    /videos/: Stores all the raw video files.
    /metadata/: Stores the JSON or CSV files with metadata for each video.
    /frames/: Optionally, extracted frames from the videos, organized by shot.

Each video file may have a corresponding metadata file with the same base name:
  Video File: video_01.mov
  Metadata File: video_001.json By following this organization, the dataset remains clean and easily accessible for training the captioner model.

The method may use the preprocessing pipeline to the dataset for training, according to the following steps: Frame Extraction: Extract frames from video at regular intervals (e.g., every 30 ms) or key points (e.g., when movement changes). Normalize Camera and Movement Data: Normalize the X, Y, Z axis data for camera movement across all shots so that movement scale differences (between close-ups and wide shots) don't cause biases in the model. Use min/max normalization. Convert to Tensor Format: The model will expect inputs in tensor format. Convert the metadata (focal length, camera movement, etc.) into tensors that can be passed into a neural network, with each feature (like focal length, movement) as part of a vector that gets fed into the model.

To ensure the model can learn efficiently, the data will maintain consistency in the following ways: Uniformity of Object/Subject: When the present techniques use identical objects to isolate single variables (like camera movement or focal length), maintain strict consistency in object positioning, size, and lighting across all shots. Incremental Changes: Each change in focal length, movement, or framing may be incremental (e.g., small focal length steps like 24 mm, 35 mm, 50 mm) to help the model learn the effect of these gradual changes. Metadata Consistency: The way metadata is logged (e.g., camera movement, object distance) may follow a uniform format across the dataset to avoid inconsistencies that could confuse the captioner model.

Exemplary Model Architecture

The captioner model architecture may include one or more vision-based components (e.g., one or more convolutional neural networks (CNNs) and/or one or more visual transformers (ViTs)) and/or one or more sequence-based models (e.g., one or more recurrent neural networks (RNNs)) or Transformers. These method may include using these components to train the captioner model to learn temporal sequences of the training video, as each brings its own respective strengths depending on whether the video is more useful for patterns, focal length and composition, versus the kind of temporal changes that take place when there is more motion in a video clip and the goal is to plot geographic movement of the camera and the objects in frame simultaneously on the x,z and z axis.

In some aspects, the method may include constructing the captioner model such that the model can perform Visual Features Extraction (using an CNN/ViT): Use a convolutional neural network or a vision transformer to extract features from each video frame. The goal is to capture spatial patterns that can relate to focal length, object framing, and motion. The captioner model may include Temporal Sequence Modeling (using an RNN/Transformer): For camera movements and scene changes, the captioner model may use recurrent networks (LSTM/GRU) or a Transformer to model the temporal sequence between frames. The model may learn how the camera moves over time, capturing movement along the X, Y, Z axes.

Input to the model may include Video Frames: The actual frames passed into the vision-based portion of the model; Movement and Focal Length Metadata: These will be concatenated into a metadata vector (e.g., [focal_length, x_movement, y_movement, z_movement, object_distance]) and passed alongside the frame into the model. The captioner model may predict captions based on both the visual features (extracted from the video frames) and the metadata features (focal length, camera movement).

Model training parameters may include a Loss Function: Use a multi-task loss function for the model to predict multiple things (e.g., focal length, camera movement, framing). For example, one component of the loss can focus on predicting the focal length correctly, while another focuses on predicting movement. Model training parameters may include Batching: Due to the inclusion of metadata alongside video frames, the present techniques can batch by sequences of frames (i.e., batches of shots with several frames each) for more efficient GPU processing. Model training parameters may include Augmentation: the present techniques can augment the dataset by slightly altering variables like focal length (synthetically adding noise to simulate slight lens changes) and camera movement, increasing the dataset's diversity without additional filming.

Once trained, the method may auto-label a large video database using the captioner model(s). Auto-labeling may include Frame-Level Inference: For each new video in the database, the model takes a batch of frames and metadata as input, predicting the focal length, camera movement, and framing; and Shot-Level Aggregation: Once all frames in a shot are labeled, the present techniques can aggregate this information to create shot-level captions (e.g., "Close-up, 50 mm, moderate movement on X-axis").

After the model has auto-labeled the video database, the method may further include Post-Processing: Ensure that labels are consistent across shots (e.g., if most frames in a shot are classified as "50 mm lens, close-up," but a few frames are misclassified, apply majority voting to smooth out discrepancies); and Quality Control: Human review of a subset of labeled videos to ensure model accuracy and retrain with corrections as needed. This workflow enables the model to become highly specific in its identification and labeling of cinematic elements, ensuring precision for large-scale video databases.

Exemplary Raw Video

Rav video is the primary input for the captioner model. Format: Store the video in a high-resolution, lossless format (such as ProRes) to ensure no visual information is lost that may affect model learning. Frame Rate: Use a consistent frame rate (e.g., 24 fps) across all video footage to maintain uniform temporal information. Duration: Each video clip will represent a specific shot (from a few seconds to a minute) and will only vary one cinematic parameter, such as camera movement, focal length, or framing, at a time. The goal is to isolate individual elements in each clip.

Example: While capturing different focal lengths while holding all other variables constant, the dataset might contain several video clips of the same static object but shot at different focal lengths (e.g., 24 mm, 35 mm, 50 mm, 85 mm). Each shot is isolated and tagged accordingly, meaning:

Video_001.mov: Static shot, object at 10 ft, focal length 24 mm.

Video_002.mov: Static shot, object at 10 ft, focal length 35 mm.

Video_003.mov: Static shot, object at 10 ft, focal length 50 mm.

This results in individual videos where only one variable (focal length) changes, making it easier for the model to learn that specific variable.

Exemplary Metadata

Metadata is critical for training the model to identify specific elements. Each video will be accompanied by detailed metadata files, which can be stored in JSON or CSV formats, as well as proprietary automated metadata software in the unreal system associated with the Filmmaker capture and are synchronized with the video frames.

Metadata Types May Include the Following:

Focal Length: This refers to the distance between the lens and the image sensor (or flange) and is measured in millimeters (e.g., 24 mm, 35 mm, 50 mm, 85 mm). For each video, the exact focal length used for the entire duration of the shot may be documented. A metadata file example:

```
{
    "video_id": "Video_001.mov",
    "focal_length_mm": 24,
    "shot_type": "static"
}
```

Camera Movement (Positional Data): Here, the present techniques document the camera's movement along the X, Y, and Z axes, as well as its rotational movements (pitch, yaw, roll-"pan" "tilt" "dutch")

LiDAR and Laser Locator Data: When using LiDAR and laser locator data, this information will provide highly accurate, frame-by-frame positioning of both the camera and objects in the scene.

X, Y, Z Axes: These axes track translational movement (left-right, up-down, forward-backward).

Rotational Movement: Captured as pitch (up-down tilt), yaw (side-to-side movement), and roll (rotation around the Z-axis).

Example of Frame-Level Movement Metadata:

```
{
  "video_id": "Video_004.mov",
  "frame": 125,
  "camera_position": {"x": 1.25, "y": 2.33, "z": −0.75},
  "camera_rotation": {"pitch": 0.02, "yaw": −0. 15, "roll": 0.01},
  "object_position": {"x": 5.10, "y": 0.75, "z": 1.40}
}
```

Data Source: Use the LiDAR/laser locator metadata to track the camera's precise location and angle in space. This will be updated for every frame of the video.

Object Distance: Object distance refers to how far the main subject is from the camera. This distance may be measured using the laser locator or LiDAR and recorded at each frame. This helps the model learn depth cues related to lens compression and field of view.

Example:

```
{
  "video_id": "Video_002.mov",
  "frame": 67,
  "object_distance_ft": 8.3
}
```

Cinematic Framing: Framing refers to the composition of the shot. Some examples of framing types include:

Close-Up (CU): The camera focuses on a subject's face or object detail.

Medium Shot (MS): Shows the subject from the waist up.

Wide Shot (WS): Captures the entire subject along with significant background.

Over-the-Shoulder (OTS): The camera looks at the subject from behind another person, showing part of their shoulder or back.

Framing labels may be assigned at the shot level. The dataset may include clear tags in the metadata for framing styles used in each video clip. Example of shot-level framing metadata:

```
{
  "video_id": "Video_005.mov",
  "framing": "over_the_shoulder",
  "subject": "human",
  "object_position": {"x": 1.0, "y": 1.5, "z": 2.0}
}
```

Scene Information

Scene-specific metadata provides context about what is in the shot, which can influence the model's predictions. This may include:

Static or Moving Subject: If the subject is stationary or moving within the frame.

Lighting Conditions: Bright, dim, or high-contrast lighting, since lighting may impact how the model interprets lensing or movement.

Background Complexity: Whether the background is plain, busy, or has specific depth-of-field effects.

EXAMPLE

```
{
  "video_id": "Video_006.mov",
  "subject_movement": "static",
  "lighting_conditions": "high_contrast",
  "background": "plain"
}
```

This metadata can help the model disambiguate between subject movement and camera movement.

Exemplary Labeling and Annotation for Cinematic Elements

Part of the training process for the captioner models may be labeling and annotation. Labeling may include defining a ground-truth standard for each cinematic element that will be labeled. This may ensure that the model can correctly interpret the data. This process may include the following steps.

The method may include establishing Ground-Truth Standards. This may include: (1) Focal Length: Create a mapping of all focal lengths used (e.g., 24 mm, 35 mm, 50 mm) and decide on a consistent naming convention. This is particularly important because focal lengths affect how the model perceives depth and perspective in the footage. Example: For each shot, label the exact focal length used (e.g., 24 mm). (2) Camera Movement: Clearly define how each type of movement will be recorded. Movement can occur along the X, Y, or Z axes, or it can involve rotational changes (pitch, yaw, roll). Set clear standards for how these are measured and labeled (e.g., "Translation in X-axis by 0.5 meters over 2 seconds"). Example: Define that X-axis movement refers to lateral shifts, Y-axis to vertical motion, and Z-axis to forward/backward motion. (3) Cinematic Framing: Develop a comprehensive catalog of framing types, such as "Close-Up," "Medium Shot," "Wide Shot," etc. Include rules for how these are defined and detected in the dataset. Example: Over-the-shoulder (OTS) shots are defined as shots where the camera views the subject from behind another person, with part of their body visible in the frame. Also customize these shots according to the kind of aesthetically pleasing, customary manner—a human-in-the-loop training technique may be used here, to leverage cinematic experience.

Next, to start labeling, the method may segment the videos into shots and frames. This labeling can occur at the shot level (e.g., labeling the framing of a shot) and/or at the frame level (e.g., labeling the focal length and camera movement).

Herein, a "shot" may be defined as a continuous sequence captured by the camera without any cuts. Each shot may represent a controlled experiment where only one cinematic element is altered (e.g., focal length or camera movement), which makes it easier for The present techniques may include associating changes in the video with specific metadata. How to Segment: Automatically divide each video file into distinct shots. This may be done using shot detection algorithms that identify scene changes and by manually marking shots based on the beginning and end of a continuous capture. Unlike other general video annotation tasks where the focus may be on objects or actions within a scene, this process emphasizes labeling technical cinematic attributes. The present techniques may include creating controlled shots where the primary goal is to teach the model about how technical filmmaking parameters (such as focal length or movement) affect the image.

Once the shots are segmented, the method may include extracting individual frames at regular intervals. A goal is to ensure that the model learns to associate specific metadata (e.g., focal length, movement) with the visual features present in each frame. This may include the following steps: Extract Frames at Consistent Intervals: Extract frames at consistent intervals (e.g., every 10 milliseconds or every 24 frames, depending on video's frame rate). This ensures that any dynamic elements like movement are captured and labeled correctly. This method may not only segment for content (e.g., a car or person moving in the scene), but also for technical changes (e.g., how the camera is moving through the scene or how lens compression changes as the focal length shifts).

The method may include labeling each extracted frame from a shot with the cinematic parameters that the captioner AI model will be trained to recognize. This labeling may include the following steps, in some aspects:

Label Focal Length: Direct Measurement: Label each frame with the exact focal length used during the shot (e.g., 24 mm, 50 mm). This data may be directly pulled from camera's metadata or recorded manually if necessary such as when film is used. How to Label: Create a metadata file for each shot that lists the focal length used. This can be automated using camera metadata as recorded by the Filmmaker process, which stores the focal length in the EXIF data. Example:

```
{
    "frame": 1245,
    "focal_length_mm": 50
}
```

In this approach, the method may not simply label objects or events; instead, the method may encoding highly technical information about the camera setup itself. This is distinct from more common labeling processes, which often focus on semantic information about objects or activities in a scene.

Label Camera Movement: Use LiDAR and laser locator data to track camera movement to apply precise frame-level labels for any translational or rotational movement of the camera. Translation (X, Y, Z Axes): Label how much the camera is moving along the X (side-to-side), Y (up-and-down), and Z (forward-backward) axes. This may be done by the automated process inherent in Filmmaker that extracts the positional data recorded by the LiDAR/laser locator system for each frame and labeling how much the camera moves between consecutive frames. Example:

```
{
    "frame": 1300,
    "camera_position": {"x": 2.5, "y": 1.0, "z": -4.3},
    "camera_movement": {"x": 0.02, "y": -0.01, "z": 0.05}
}
```

Rotation (Pitch, Yaw, Roll) (pan, tilt, dutch): Label any rotation of the camera, noting the exact angular change in pitch, yaw, and roll. This data may be extracted from the motion tracking system which was written into Filmmaker metadata. Example:

```
{
    "frame": 1300,
    "camera_rotation": {"pitch": 0.02, "yaw": 0.03, "roll": -0.01}
}
```

It should be noted that video annotation tasks generally do not require this level of precision or attention to the technical aspects of cinematography. The method is focused on capturing and labeling the physical movements of the camera with high precision, which is not done in general datasets.

Label Object Distance: If the object of interest in the shot is stationary, label the distance from the camera to the object for each frame. Use the laser locator or LiDAR data to provide exact measurements. How to Label: Each frame may have an associated object distance (e.g., distance between the camera and the subject in the frame). Example:

```
{
    "frame": 1320,
    "object_distance_ft": 8.3
}
```

It should be appreciated that general video labeling often focuses on the presence or actions of objects but does not go to the level of labeling the exact distance between the object and camera for each frame. The labeling process of the method captures spatial relationships that are essential to understanding how focal length, depth of field, and lens compression work.

Apply Shot-Level Labels: While frame-level labels capture dynamic and frame-specific elements, shot-level labels provide a broader context for the entire scene.

Label Cinematic Framing: Each shot may be labeled with the type of framing being used (e.g., Close-Up, Medium Shot, Over-the-Shoulder). This will be applied uniformly to all frames in a shot. How to Label: For each shot, apply a single label representing the framing style. This can be done either manually by reviewing each shot or programmatically if an embodiment has predefined shot setups. Example:

```
{
    "shot_id": "Shot_001",
    "framing": "close_up"
}
```

It should be noted that while some general video labeling tasks include scene descriptions, the method is labeling cinematic techniques, which are unique to filmmaking and require a deeper understanding of composition, camera placement, and shot intent.

Label Scene Information: Scene-level metadata can include details like whether the subject is static or moving, lighting conditions, and background complexity. How to Label: For each shot, apply additional context labels, such as whether the subject is moving, the type of lighting used, and any other technical details that might affect the shot (e.g., camera filters or special effects). Example:

```
      }
    "shot_id": "Shot_002",
    "subject_movement": "static",
    "lighting": "low_key"
      }
```

Automate the Labeling Process: The method may automate the extraction and labeling of data using tools derived from Filmmaker. For example: Focal Length: may be automatically extracted from camera metadata and created by the sensor detection by using Master Prime lenses. Camera Movement and Object Distance: may be automatically extracted from LiDAR or laser locator systems. Framing: While framing labels are more subjective, they are still semi-automated using predefined shot templates. By automating as much of the process as possible, the method advantageously reduces the time spent on manual labeling, and improves consistency.

A final step of the method may be validating the labeled dataset, to ensure consistency in labeling across all shots and frames: Review a Subset Manually: Review a subset of the labeled data manually to ensure that the automatic extraction and labeling processes are working correctly. Check for Label Consistency: Ensure that labels are consistent across frames within the same shot and between similar shots across the dataset.

The above-described labeling method represents technological improvements in the field of video model training. For example, these improvements include: Improved Technical Precision: The method focuses on labeling technical cinematic elements like focal length, camera movement, and framing-elements not commonly labeled in general video datasets. Improved Controlled Environment: The Filmmaker dataset is built from controlled shots in a soundstage environment where only one variable is changed at a time, allowing the model to learn in a focused and isolated way. Improved Frame-by-Frame Precision: The labeling process tracks technical aspects at both the frame and shot levels, allowing for highly granular learning, which is not found in conventional datasets that focus more on semantic content. Improved Use of Motion and Positioning Data: Leveraging precise motion and positioning data (LiDAR, laser locators) ensures that the labels reflect exact physical movements and distances, which is critical for understanding camera operations and movement dynamics.

Exemplary Retraining of Pre-Trained Video Model with Captioned Metadata

In some aspects, retraining may be performed using outputs of the captioner model(s). For example, once fine-tuning of a pre-trained video model is complete, retraining the video model using captioned metadata generated by the captioner model(s) may be executed as a next step, to ensure that the captioner model can not only recognize cinematic elements (such as focal length, movement, and framing) but also generate video according to those precise technical instructions. This step bridges the gap between understanding and generation, using newly generated metadata to guide the model toward producing highly controlled video outputs.

By retraining the pre-trained video model using captioned metadata, the present techniques enables the pre-trained model to generate video that adheres to specific cinematic parameters, such as focal length, movement, and depth of field. This approach conditions the model on both visual features and technical metadata, ensuring that it can respond to complex prompts and generate video that meets professional standards for cinematic production.

The method may include the following steps, for retraining the model, enabling the retrained model to generate video in a controlled, parameter-driven way. The method may include accurately labeling video sequences with detailed metadata about focal length, camera movement, depth of field, and other cinematic parameters. This metadata is key to retraining the video model (e.g., a large pre-trained video model), enabling it to learn how specific visual outcomes correspond to precise technical setups.

The method may include collecting the captioned metadata. The objective of this step is to ensure that every frame in the dataset has been labeled with precise metadata. For example: Focal Length: The specific focal length used in that frame (e.g., 35 mm, 50 mm); Camera Movement: Precise vectors indicating how the camera is moving (e.g., X-axis translation, Y-axis movement); Occlusion and Parallax: Information about objects moving in front of or behind each other and the resulting visual effects; Depth of Field: Parameters like aperture and focus distance that affect the sharpness of the background and foreground. This particular aspect of the method is an improvement, because conventional video models may be trained on large-scale datasets but without detailed, frame-by-frame technical metadata. The method advantageously provides more granularity by training the model not just on what objects or scenes are present but on how those scenes were captured cinematically.

A goal of the method may be to retrain the pre-trained video model to condition the model's outputs on the captioned metadata. This means that the model learns to associate visual outputs (video frames) with the specific camera setups and parameters provided by the metadata and generated by the captioner model. Specifically, the method may use metadata as input, wherein an objective is to modify the pre-trained video model's architecture to take the metadata generated by the captioner model as part of the input, alongside the visual data. This allows the pre-trained video model to generate video frames conditioned not just on the general visual features but on specific cinematic parameters.

Thus, the input to the video model may include Video Frames: The standard visual features from the video; and Metadata Vectors: The detailed captioned metadata, such as focal length, camera movement, and object positions relative to the camera. The method may include incorporating metadata, by concatenating metadata vectors with the visual features extracted from the frames. For example, in a Transformer-based video model, the method may include concatenating the visual embeddings from the video frames with the metadata embeddings, ensuring the model considers both inputs during training. For example, this may be implemented in PyTorch:

```
class ConditionalVideoModel(nn.Module):
    def _init_(self, video_model, metadata_dim):
        super(ConditionalVideoModel, self)._init_( )
        self.video_model=video_model # Pre-trained video
            model backbone
        self.fc_metadata=nn.Linear(metadata_dim, 512) #
            Process metadata
        self.fc_concat=nn.Linear(1024, 512) # Combine
            video and metadata features
    def forward(self, video_frames, metadata):
        video_features=self.video_model(video_frames) #
            Extract visual features
        metadata_features=self.fc_metadata(metadata) #
            Process metadata
        combined_features=torch.cat((video_features, meta-
            data_features), dim=1)
``` output=self.fc_concat(combined_features)
return output

This method of retraining the pre-trained video model is an advantageous improvement. For example, in conventional video generation models, the input consists solely of visual data (frames or temporal sequences). The approach of the method of retraining the video model is particularly advantageous, and an improvement over conventional techniques, because it combines both visual features and cinematic metadata as part of the model's input, enabling far greater control over the output. This type of conditioning ensures that the model's outputs correspond exactly to the specified camera setups, such as focal length or movement. In some aspects, further training techniques may be used to even further enhance the generated output.

For example, to teach the video model to learn the precise relationships between visual data and cinematic metadata, the method may include applying a conditional loss function that penalizes the model for generating frames that deviate from the expected parameters. This may be implemented using a multi-task learning approach, in some aspects. For example, the method may train the video model to minimize losses for both: Visual Quality: Ensure that the generated frames are visually consistent with the input data; and Cinematic Accuracy: Ensure that the generated frames match the cinematic parameters specified by the metadata (e.g., correct focal length, movement, and parallax effects).

In some aspects, the method may compute Visual Quality Loss using standard visual quality loss functions like Mean Squared Error (MSE) or Perceptual Loss (based on feature maps from a pre-trained model) to ensure that the generated frames are high-quality and consistent with the ground-truth frames. For example:

visual_loss=nn.MSELoss( ) # Minimize error between generated and true frames

In some aspects, the method may compute Cinematic Parameter Loss. This loss ensures that the frames are generated in a way that matches the cinematic metadata. For example, the method may compute respective Focal Length Loss: The predicted focal length from the generated video will match the metadata; Camera Movement Loss: The camera movement inferred from the generated video will match the motion vectors in the metadata; and/or Parallax Loss: Ensure that parallax effects match the metadata, with closer objects moving faster than distant ones. For example:

focal_length_loss=nn.MSELoss( ) # Penalizes differences in focal length predictions
camera_movement_loss=nn.MSELoss( ) # Penalizes errors in camera movement prediction
parallax_loss=custom_parallax_loss(pred_parallax, true_parallax)

In some aspects, the method may compute Total Loss, wherein the total loss function is a weighted sum of these components:

total_loss=visual_loss+lambda1*focal_length_loss+ lambda2*camera_movement_loss+ lambda3*parallax_loss The present techniques provide advantageous improvements over conventional video modeling techniques, which focus solely on generating visually plausible frames. This approach integrates cinematic accuracy into the training process, ensuring that the generated video respects specific technical parameters, such as camera movement, focal length, and depth of field.

In some aspects, the method may include training the model iteratively, ensuring it refines its ability to generate video that matches specific cinematic parameters, once the model architecture is adjusted to accept metadata and the loss functions are set. This may include Training on a Subset of Data, by training on smaller batches of video data and metadata to ensure the model is learning the correct relationships between inputs and outputs. The method may include validating periodically to ensure that both the visual quality and the cinematic accuracy are improving.

Iterative training in the method may further include Active Learning and Fine-Tuning. As the model begins to learn, use active learning techniques to iteratively fine-tune the model: Focus on cases where the model struggles, such as highly dynamic scenes with complex parallax or rapid camera movements. Re-train the model on these difficult cases, allowing it to learn from its mistakes and improve the generation process.

Iterative training in the method may include Scaling to Larger Datasets. Once the model performs well on smaller datasets, scale the training to larger, more diverse video sequences with complex interactions (e.g., multiple objects, occlusion, and dynamic camera movements).

The method may include evaluations and testing using complex prompts. For example, in some aspects, after the retraining phase, the method may include testing the model on highly specific prompts (e.g., "50 mm lens, camera moving at 1 foot per second along the Z-axis, etc.")—to evaluate its ability to generate video according to detailed instructions. Prompt-Based Testing may include providing the model with complex prompts that specify the exact cinematic setup, including: Focal length; Camera movement in space (X, Y, Z axes); and/or Parallax and occlusion. The method may include checking the generated video to determine whether it matches the expected visual effects (e.g., objects passing in front of others in a realistic parallax effect) and the technical parameters (e.g., correct depth of field and camera movement). The method may include Comparison to Ground Truth: Compare the generated video to ground-truth sequences captured on Filmmaker and present in the captioner models to ensure that the model is accurately reproducing real-world cinematography.

This present techniques represent advantageous improvements. First, due to their Combination of Visual and Cinematic Data: Most video models are trained only on visual data (scenes, objects, movements). By conditioning the model on detailed metadata, the present techniques are training it to generate video according to specific cinematic parameters that dictate how the camera moves, how objects interact, and how lenses and optics affect the scene. Second, due to Precision in Video Generation: By integrating losses that account for cinematic accuracy, this method ensures that the model not only generates visually plausible videos but also adheres to the technical instructions provided in prompts. This level of control is not present in most current models. Third, due to Real-World Cinematic Application: The retraining process focuses on teaching the model to generate video that meets the needs of cinematic professionals, including directors and cinematographers, who require precision in lensing, movement, and scene composition.

Example Metadata Generation

In some aspects, the method may generate detailed metadata for video sequences using captioner models, fine-tuned in earlier steps. This metadata may contain information on critical cinematic parameters like focal length, camera movement, depth of field, occlusion, and parallax. The metadata may serve as the foundation of training or retraining one or more video models, enabling the models to generate highly controlled video content according to precise prompts. As noted, metadata generation may begin with inputting video data into the captioner model, that the captioner model will process to generate metadata. This video data can be: Existing video sequences (such as those in a pre-existing video library or newly captured footage); and/or Video generated by the fine-tuned video model in the methods described above (which will be captioned for further refinement).

The method may include Input Video Data Preparation, the objective of which is to prepare video data by dividing it into individual frames and organizing the temporal sequences. This method may ensure that each frame has corresponding spatial and temporal relationships preserved, so the captioner model can predict parameters like camera movement and depth. Frame Extraction may include extracting frames at the appropriate frame rate (e.g., 24 fps) from the video sequences. This maintains consistency with cinematic standards. An example (using OpenCV in Python) is shown below:

```
import cv2
def extract_frames(video_path, output_dir, frame_rate=24):
    cap=cv2.VideoCapture(video_path)
    frame_id=0
    while True:
        ret, frame=cap.read( )
        if not ret:
            break
        if frame_id % frame_rate==0: # Save every 'frame_rate' frame
            cv2.imwrite(f"{output_dir}/frame_{frame_id}.jpg", frame) frame_id+=1
    cap.reLease( )
```

The method may include providing the captioner model with existing metadata (e.g., rough estimates of focal length, camera movement, or object positioning) if such data exists. This will help the model refine its output during metadata generation.

It should be appreciated that the captioner model is not just processing static frames; it is generating dynamic metadata based on the movement and cinematic properties across the video sequence. In general, conventional captioning focuses merely on object identification or activity recognition, whereas the present techniques focus on understanding and predicting technical cinematic parameters.

The method may include Generating Metadata from the Captioner Model, by processing each frame (or sequence of frames) in the captioner model to generate metadata predictions for cinematic parameters such as focal length, camera movement, and depth of field. This metadata may then be used to retrain the video generation model.

Video Data (e.g., the above-described existing video sequences and/or video generated by the fine-tuned video model) may be fed into the captioner model, which has been trained to recognize and predict technical cinematic parameters. For each video frame, the captioner model may predict: Focal Length: Estimate the focal length used in the frame (e.g., 24 mm, 50 mm); Camera Movement: Predict the camera's movement in space along the X, Y, Z axes; Depth of Field: Estimate the depth of field, based on aperture, focus distance, and relative object distance from the camera; and/or Parallax and Occlusion: Determine how objects move relative to each other in the frame, and whether closer objects occlude those behind them. An example in PyTorch appears below:

```
for frame in video_frames:
    pred_focal_length, pred_camera_movement, pred_depth_of_field=captioner_model(frame)
    # Store the metadata for later use
```

In some aspects, the method may perform Sequence-Level Analysis. For example, the captioner model may process video frames to determine Temporal Relationships, by analyzing video frames in sequence, recognizing how camera movement and object dynamics evolve over time. This allows the captioner model to predict cinematic parameters not just for individual frames but for entire sequences, where camera movements (e.g., dolly shots or pans) are present. This is advantageous, and an improvement, because unlike static image models, the temporal aspects such as camera movements and depth effects only become clear across a sequence of frames. For example, parallax effects can only be detected when objects move relative to each other across frames. While traditional models may focus on describing objects or actions in a scene, the improved captioner model is generating technical cinematic metadata by recognizing camera mechanics—something that goes far beyond standard object recognition or description.

Once the captioner model has predicted the cinematic parameters for each frame or sequence, the method may include storing this metadata in a structured format that can be used for future model retraining and video generation. The method may include Structuring the Metadata, by organizing the metadata so that it is easy to query and use in future stages (e.g., video generation, fine-tuning, or evaluation).

The method may include generating metadata in a framewise nested metadata format for storage, in some aspects. This nested format may include Focal Length (mm): A continuous value representing the lens's focal length used in the frame; Camera Movement (X, Y, Z axes): Vectors representing the camera's movement in space; Depth of Field (DOF): A numerical estimate of the aperture and focus distance, along with the background/foreground separation; Parallax and Occlusion: Relationships between objects, indicating whether closer objects occlude distant ones, or how the parallax effect is experienced. An Example (in JSON) is as follows:

```
{
  "frame_0001": {
    "focal_length_mm": 35,
    "camera_movement": {"x": 0.02, "y": 0.01, "z": 0.00},
    "depth_of_field": {"aperture": 2.8, "focus_distance": 10},
    "occlusion": {"foreground_object": "tree",
  "background_object": "building"}
  },
  "frame_0002": {
    "focal_length_mm": 50,
    "camera_movement": {"x": 0.03, "y": 0.01, "z": -0.01},
    "depth_of_field": {"aperture": 3.5, "focus_distance": 12},
    "occlusion": {"foreground_object": "car",
  "background_object": "pedestrian"}
  }
}
```

The method may include Database or File Storage, in some aspects. For example, the method may include storing the metadata in a database or structured file format (such as JSON or CSV) so that it can be easily queried during the video generation process.

Database Example:

Use a SQL or NoSQL database to store and index metadata for quick retrieval:

```
INSERT INTO video_metadata (frame_id, focal_length,
    camera_movement, depth_of_field, occlusion)
VALUES (1, 35, 'x:0.02,y:0.01,z:0.00', 'aperture:2.8,
    focus_distance:10', 'tree occludes building');
```

This is an improvement because standard video captioning methods usually result in textual descriptions of objects and actions. With the captioner model, however, the output is structured as cinematic metadata-which provides an entirely different kind of annotation that can be used to control video generation processes.

The method may include Iterative Metadata Refinement. For example, once the initial metadata has been generated, a next step may be to refine this metadata by allowing the captioner model to run multiple passes over the video sequences. With each iteration, the model can refine its predictions, ensuring greater accuracy and alignment with real-world cinematic parameters. An objective of the Refinement Process may be to improve the accuracy of the metadata predictions by comparing the model's output with ground-truth data (if available) or by running iterative refinements where the model self-corrects based on feedback from previous iterations.

For example, the method may include running a second (or further) pass where the model compares its initial metadata predictions with actual metadata (or with human annotations, if available). The method may adjust the model's weights to improve its predictions for complex cases (such as rapidly changing camera movement or challenging parallax effects).

```
for epoch in range(refinement_epochs):
    for frame, metadata in video_frames:
        pred_metadata=captioner_model(frame)
        loss=calculate_metadata_loss(pred_metadata,
            true_metadata)
        optimizer.zero_grad( )
        loss.backward( )
        optimizer.step( )
```

It should be appreciated that existing models generate output in a single pass. Thus, the method's iterative refinement process improves upon conventional techniques by allowing for self-correction and fine-tuning, ensuring that the generated metadata becomes increasingly accurate and reliable over time.

Once the captioner model has generated detailed and refined metadata, the method may use the metadata to guide video generation processes. For example, a video model can use this metadata to generate video sequences that match precise cinematic instructions (such as focal length, camera movement, and depth of field).

The method may include conditioning video generation on metadata. An objective of the method may be to the generated metadata as input conditions during video generation. This enables the method to cause the video model to produce sequences that adhere to specific cinematic constraints (like the example prompt: "a 50 mm lens moving on the Z-axis by 1 foot per second"). An example of enabling the video model to be conditioned to generate frames that match the exact focal length and movement patterns described by the metadata follows:

```
def generate_video_frames(metadata, prompt):
    # Use metadata to guide the video generation
    for frame_metadata in metadata:
        generated_frame=video_model.generate_frame
            (prompt, metadata=frame_metadata)
        save_frame(generated_frame)
```

It should be appreciated that enabling the video model to be conditioned is an advantageous improvement. First, technical Cinematic Focus: conventional techniques focus on describing scenes in semantic terms (e.g., objects, actions). This approach uniquely focuses on cinematic parameters-teaching the model to predict technical aspects like focal length, depth of field, and camera movement, which are essential for professional filmmaking. Second, Structured and Actionable Metadata: The generated metadata is not a simple description but a structured set of technical parameters that can be directly used to guide the video generation process. This is unlike conventional techniques, which primarily serve descriptive or indexing purposes. Third, Iterative Refinement: The model is allowed to refine its metadata predictions iteratively, improving its accuracy over time. This self-correcting process ensures that the metadata becomes increasingly aligned with real-world cinematic requirements. Fourth, Scalability to Complex Prompts: The metadata generated by the captioner model allows for precise control over complex cinematic instructions, which current techniques cannot handle with simple text prompts alone. By conditioning the video generation process on this metadata, the captioner model can generate video according to detailed, multi-variable prompts (such as camera movements, parallax, and lens effects).

Exemplary End-to-End Training: Combining Data and Model Refinement

In some aspects, the method may further include training the entire system end-to-end, combining the captioner model (for generating cinematic metadata) and the video generation model (for generating video frames). This step may include refining both models simultaneously so that the video generation model learns to produce frames based on specific cinematic instructions and technical metadata generated by the captioner model. This process allows the video model to generate consistent and realistic video that adheres to precise, parameter-driven prompts (such as focal length, movement, camera positioning, and depth of field). The method may combine data from the captioner model and refining the video generation model to ensure that video is generated according to precise cinematic instructions. By integrating visual data with detailed metadata, training the system end-to-end, and continuously refining its performance, this approach offers a stringently controlled method for generating video that adheres to professional filmmaking standards.

It should be appreciated that this end-to-end represents an advantageous improvement, because the training integrates two traditionally separate tasks—metadata generation (capturing technical cinematic details) and video generation—into a single training pipeline, where both components learn to work together to achieve high-level cinematic control.

Specifically, end-to-end training may include integrating the captioned metadata generated in prior steps with the corresponding video frames. Each video sequence may have metadata that describes the cinematic parameters, such as focal length, camera movement, and depth of field. An objective of this step is to ensure that video sequences have corresponding metadata necessary for conditioning the video generation model. For example, for each video frame or sequence, metadata will include: Focal Length: The lens focal length used for each frame (e.g., 24 mm, 50 mm); Camera Movement: The camera's movement on the X, Y, Z axes (e.g., dolly in, tilt, pan); and Depth of Field: The aperture and focus distance, affecting how much of the scene is in focus. In PyTorch, for example, this may be achieved as shown in the following example code listing:

```
video_sequence=load_video_frames('video_path')
metadata_sequence=load_metadata('metadata_path')
``` for frame, metadata in zip(video_sequence, metadata_sequence):
    combined_input=(frame, metadata)

Once the captioner model-generated metadata is integrated with the video frames, the method may include modifying the video generation model so that it conditions its output on the metadata, allowing it to generate frames that adhere to precise cinematic rules. Specifically, the method may include modifying the architecture of the video generation model so that it takes both the visual input (video frames) and cinematic metadata as input, allowing the generated video to align with the specific technical instructions provided by the metadata.

Here, an Input Structure may include Visual Frames: Representing the current frame or sequence of frames; and Metadata: The corresponding technical details (focal length, camera movement, depth of field) for each frame. The Model Architecture: may include modifying the video model to include a branch that processes the metadata input alongside the visual input. This can be done by combining the metadata with the frame embeddings (e.g., through concatenation). An example (PyTorch) follows:

```
class VideoModelWithMetadata(nn.Module):
    def __init_(self, base_video_model, metadata_dim):
        super(VideoModelWithMetadata, self).__init_( )
        self.base_video_model=base_video_model
        self.fc_metadata=nn.Linear(metadata_dim, 512) # Embed metadata
        self.fc_concat=nn.Linear(1024, 512) # Combine visual and metadata features
    def forward(self, video_frame, metadata):
        visual_features=self.base_video_model(video_frame)
        metadata_features=self.fc_metadata(metadata)
        combined_features=torch.cat((visual_features, metadata_features), dim=1)
        output=self.fc_concat(combined_features)
        return output
```

It should be appreciated that this is an advantageous improvement-while conventional models may learn to generate video purely based on visual patterns, the method—by incorporating cinematic metadata (focal length, camera movement, etc.) into the model—allows the video generation process to be controlled and parameter-driven, ensuring precise adherence to cinematic rules and instructions.

Once the metadata and video data are combined and the model architecture is adapted, the next step is to train the entire system end-to-end. This means training the model to predict the next video frames based on both the current frames and the cinematic metadata.

In end-to-end training, the model has two primary objectives: (1) Visual Quality: The generated video frames must be visually consistent with the real video data; and (2) Cinematic Accuracy: The generated frames must adhere to the cinematic metadata, ensuring that technical parameters like focal length, camera movement, and depth of field are respected.

The method may use a visual quality loss function to ensure that the generated frames match the ground-truth frames in terms of visual fidelity. Loss functions that may be used for this task include: Mean Squared Error (MSE): Measures the pixel-wise error between the generated frames and the ground-truth frames; and Perceptual Loss: Compares higher-level feature maps between the generated and ground-truth frames, ensuring that the perceptual quality is maintained.

visual_loss=nn.MSELoss( ) # Penalizes pixel-wise differences between real and generated frames In some aspects, the method may include penalizing the model if it generates video that does not adhere to the specified cinematic parameters (i.e., Cinematic Accuracy Loss). For example: Focal Length Loss: If the generated frame does not match the expected focal length, the model may be penalized. Camera Movement Loss: If the generated camera motion (inferred from the video) does not match the expected movement (based on metadata), a loss may be applied. Depth of Field Loss: Penalizes differences between the expected and actual depth of field effects (e.g., foreground blur, background sharpness). For example:

focal_length_loss=nn.MSELoss( ) # Penalizes errors in focal length prediction
    camera_movement_loss=nn.MSELoss( ) # Penalizes errors in camera movement
    depth_of_field_loss=nn.MSELoss( ) # Penalizes errors in depth of field The method may include applying a total loss function to combine both the visual quality loss and the cinematic accuracy losses:

total_loss=visual_loss+lambda1*focal_length_loss+
      lambda2*camera_movement_loss+
      lambda3*depth_of_field_loss It should be appreciated that conventional video generation models may focus on optimizing visual fidelity, and do not include any attempt to adhere to cinematic rules or expectations. In contrast, the present techniques introduce multi-task learning, where the model learns not only to generate visually accurate frames but also to ensure that the generated video adheres to the precise cinematic rules dictated by the metadata. This dual learning approach is essential for generating video that meets professional filmmaking standards.

The next step is to iteratively train the model, refining its ability to generate accurate video while adhering to the cinematic metadata. The may involve several sub-steps:

The method may include a Training Loop, that trains the model by iterating over batches of video sequences and corresponding metadata, allowing it to learn how to generate video frames that are both visually consistent and cinematographically accurate. The training process may be as follows: (1) For each batch, load the video frames and the corresponding metadata; (2) Feed the frames and metadata into the video model; (3) Compute the loss using both visual quality and cinematic accuracy loss functions; and (4) Perform backpropagation to update the model's weights. Example:

```
for epoch in range(num_epochs):
    for batch in dataloader:
        video_frames, metadata=batch
        # Forward pass
        generated_frames=video_model(video_frames, metadata)
        # Compute losses
        loss=total_loss(generated_frames, real_frames, metadata)
        # Backward pass and optimization
        optimizer.zero_grad( )
        loss.backward( )
        optimizer.step( )
```

The method may include periodically evaluating the model on a validation set to ensure that it is not overfitting and that it is learning to generalize across different cinematic scenarios. In some aspects, the method may validate both the visual fidelity and cinematic accuracy on unseen data, ensuring that the model performs well across various types of shots (close-ups, wide shots, fast movements, etc.). The method may include refinement based on edge cases. For example, the method may identify cases where the model struggles (e.g., complex parallax or occlusion situations) and apply focused retraining on these edge cases. These cases may include: (1) Shots where camera movement is particularly fast or complex (e.g., multi-axis camera motion); (2) Scenes with significant depth of field variations or where multiple objects occlude each other; and (3) other cases. By refining the model on these challenging cases, the present techniques advantageously improve upon video generation techniques by making them more adept at producing convincing and cinematically relevant video, performing well across a broader range of cinematic scenarios.

The method may include End-to-End Testing with Complex Prompts. Specifically, after training is complete, the method may test the model's ability to generate video that adheres to specific and complex prompts-similar to the example provided earlier (e.g., a camera moving at 1 foot per second along the Z-axis, focal length set to 50 mm, etc.). The method may perform Complex Prompt-Based Testing. Specifically, the method may provide the model with highly detailed prompts, including precise instructions on focal length, camera movement, and other cinematic parameters, and evaluate the output video. An Example Prompt is as follows: "Generate a 10-second clip with the camera dollying in at 1 foot per second on the Z-axis with a focal length of 50 mm, starting at 3 feet from the subject and ending in a close-up with the subject in the center-left of the frame." Example Test Criteria: Focal Length: Verify that the depth of field and lens distortion correspond to the expected focal length; Camera Movement: Ensure that the camera moves consistently and at the correct speed along the specified axis; Framing: Verify that the final shot is composed as described (e.g., close-up with the subject in the center).

It should be appreciated that conventional techniques may be tested on general prompts (e.g., "generate a sunset"). The present techniques provide advantageous improvements to prompt-based approach is unique because it tests the model on highly specific cinematic prompts, evaluating its ability to follow precise technical instructions that mimic real-world filmmaking scenarios.

The method may include Continuous Feedback and Iterative Retraining, in some aspects. For example, after testing, a next step may be to implement a feedback loop, allowing the model to continually improve its performance on specific types of shots or scenarios where it might be struggling.

The method may include Active Learning, to allow the model to identify areas where its predictions are uncertain or incorrect (e.g., where camera movement or focal length deviations occur), and retrain the model on these difficult cases. Specifically, the method may implement uncertainty estimation techniques to flag sequences where the model is less confident in its output. The method may focus retraining on these areas to improve the model's robustness. The method may perform Continuous Retraining by periodically retraining the model using new metadata and video sequences to ensure it continues to improve over time, especially as new types of shots and camera setups are introduced.

It should be appreciated that the method's end-to-end training is an advantageous improvement, due to the Integration of Metadata and Video, for instance. Conventional models do not consider technical cinematic parameters. The present techniques uniquely integrate cinematic metadata (e.g., focal length, camera movement, depth of field, and/or others) into the video generation process, allowing for fine-grained control over the output. By optimizing for both visual quality and cinematic accuracy through multi-task learning, the present techniques ensure that the generated video adheres to real-world filmmaking standards, something that traditional video generation models cannot achieve. Further, the present techniques provide greater control and precision: the ability to generate video that matches precise cinematic prompts (such as specific camera movements, focal lengths, framing, etc.) is unprecedented, providing filmmakers with a powerful tool for controlling video content generation. The continuous feedback loop and active learning approach ensure that the model improves over time, making it adaptable to new and complex cinematic scenarios.

Exemplary Input Representation for the One or More Captioner Models

In this step, I will focus on preparing the input for the captioner models. This process may involve transforming the raw video frames and associated cinematic metadata (e.g., focal length, camera movement, framing, etc.) into a unified format that the captioner model can process. The captioner model is not simply processing visual data; but combining it with precise technical metadata related to cinematography, which requires special attention to how these inputs are formatted and fed into the model.

The method may include creating the input representation for the captioner models, ensuring that it's well-suited for a model that deals with both visual features and technical metadata, may be implemented. The method may include processing Image Input Representation (Visual Data). For example, the visual data may come from the individual video frames extracted in earlier steps. The method may be encoded as tensors that the captioner model can process. The method may include Preprocessing Image Frames, by a multi-step process:

Step 1: Resizing Frames: Resize the extracted video frames to a fixed size that matches the input dimensions of a backbone model (e.g., ResNet50 or Vision Transformer). A common size is 224×224 pixels for standard models like ResNet, but this can vary based on the architecture. However, given the quality sought the present techniques may explore images as large as 1080×1080 to weigh the quality versus the compute/energy/time cost of such large images. Example in PyTorch:

import torchvision.transforms as transforms
    resize_transform=transforms.Resize((224, 224))

Step 2: Normalize Frames: Normalize the pixel values to standardize the input data. Min/Max normalization is easiest. Normalization may be required because most pre-trained models expect pixel values in the range [0, 1] or normalized based on mean and standard deviation (e.g., ImageNet-trained models expect normalization with mean [0.485, 0.456, 0.406] and standard deviation [0.229, 0.224, 0.225]). Example in PyTorch:

normalize_transform=transforms.Normalize(mean=
      [0.485, 0.456, 0.406],
      std=[0.229, 0.224, 0.225])

Step 3: Convert to Tensor: Convert each image frame to a tensor. The final image tensor will have the shape [batch_size, channels, height, width], where channels=3 for RGB images. Example in PyTorch:

to_tensor_transform=transforms.ToTensor( )
    img_tensor=to_tensor_transform(image) # Image is a PIL
      image The method may include Image Batch Preparation. Batching: Once the frames are resized, normalized, and converted to tensors, the method may batch them together for efficient processing. Batch sizes between 16 and 64 may be used depending on the available GPU memory. The method may seek to maximize memory on certain computational setups (e.g., H-100s) to optimize the process. Example:

img_batch=torch.stack([img_tensor_1, img_tensor_2, . . . , img_tensor_N])

It should be appreciated that the context of these image preprocessing steps is unique, insofar as the method is preparing frames that will later be combined with technical metadata, which means the images are part of a larger process of understanding how cinematographic elements like focal length and camera movement affect the visual content.

The method may include transforming the cinematic metadata (e.g., focal length, camera movement, framing, etc.) into a format that the captioner model can process. This metadata may be treated as numerical inputs, which will later be merged with the visual data. Normalizing numerical metadata may be a multi-step subprocess of the method, as follows:

Step 1: Normalize Focal Length: If focal lengths range from, say, 24 mm to 85 mm, normalize them into a range that the model can more easily process, such as [0, 1]. This will ensure that the model treats focal length uniformly, rather than favoring larger numerical values. Example:

def normalize_focal_length(focal_length, min_focal_length, max_focal_length):
        return (focal_length−min_focal_length)/(max_focal_length−min_focal_length)
    normalized_focal_length=normalize_focal_length(50, 24, 85) # Example focal length Step 2: Normalize Camera Movement: Camera movement data (X, Y, Z translations, pitch, yaw, roll) must also be normalized. If the camera movement values range from −5 to 5 meters for translations, the present techniques may normalize them into a range like [−1, 1]. Example:

def normalize_movement(movement, max_movement):
        return movement/max_movement
    normalized_x_movement=normalize_movement (x_movement, 5) # Assuming max movement is 5 meters Step 3: One-Hot Encode Categorical Metadata (e.g., Framing): As the metadata includes framing styles (e.g., close-up, medium shot, wide shot), the method may one-hot encode those values, to allow the model to learn the relationships between different framing styles without interpreting them as ordinal values. Example:

framing_dict={"close_up": [1, 0, 0], "medium_shot": [0, 1, 0], "wide_shot": [0, 0, 1]}
    one_hot_framing=framing_dict["close_up"]# Example framing type The method may further include Batching Metadata: Just as the method batches the image frames, it may also batch the corresponding metadata. For each frame in the batch, its corresponding metadata (focal length, camera movement, etc.) may be combined into a single feature vector. Example:

metadata_batch=torch.stack([metadata_tensor_1, metadata_tensor_2, . . . , metadata_tensor_N])

Unlike conventional datasets where metadata might include semantic labels (e.g., object categories), this batched metadata is highly technical and represents camera and cinematic settings. These inputs are crucial because they tell the model not just what is in the scene, but how the scene was captured, making this input representation unique.

Once the image data and metadata are prepared as tensors, the method may combine them into a unified input representation. A goal of this step may be to feed both streams of data (visual and metadata) into the model simultaneously so it can learn how they relate (i.e., a combined input representation).

After the image data is processed by the feature extraction network (e.g., ResNet or ViT), it will be reduced to a feature vector. Similarly, after the metadata is passed through its own fully connected layers, it will be reduced to a metadata feature vector. The two feature vectors (from the image and metadata) are then concatenated into a single input vector, according to the following subprocess:

Step 1: Pass Image Through Feature Extractor: The image is passed through the CNN or ViT to extract its features. Example:

img_features=resnet(img_batch) # Result: img_features of shape [batch_size, feature_size]

Step 2: Pass Metadata Through Fully Connected Layers: The metadata is passed through its own fully connected layers to extract the relevant features.

metadata_features=metadata_processor(metadata_batch) # Result: metadata_features [batch_size, feature_size_meta]

Step 3: Concatenate Image and Metadata Features: The two feature vectors are concatenated along the last dimension, creating a unified representation for each frame. Example in PyTorch:

combined_features=torch.cat([img_features, metadata_features], dim=1)

The computer-implemented method may include creating a final input tensor that represents both the visual data (from the images) and the technical metadata (e.g., focal length, movement, framing, etc.) in one unified format that the model can process.Example: If img_features has a size [batch_size, 2048] and metadata_features has a size [batch_size, 32], the combined tensor will have the size [batch_size, 2080].

In some aspects, the method may include handling temporal data. For example, when the model needs to handle temporal sequences (e.g., multiple frames from a shot), the method may account for how data across frames is represented. This may include a sub-process of Stacking Frame Inputs for Temporal Sequences, according to the following steps:

Step 1: Stack Consecutive Frames: As efficiency permits, the method may be process multiple frames in a sequence (to capture temporal dynamics like camera movement), stack the image tensors and metadata for each consecutive frame.

Example stacked_images=torch.stack([frame_1, frame_2, frame_3]) # Sequence of frames
    stacked_metadata=torch.stack([meta_1, meta_2, meta_3]) # Corresponding metadata In some aspects, an RNN/Transformer may be used for Sequence Processing. For example, the method may employ an architecture that uses either an RNN or Transformer to handle the temporal relationships between frames, the stacked image and metadata features can be passed through this network to learn temporal dependencies. Example (RNN):

rnn_output, hidden_state=rnn(sequence_of_combined_features)

It should be appreciated that handling temporal data in a cinematic context involves learning how changes over time (e.g., camera panning or zooming) affect the shot. This differs from traditional modeling, which often focuses on action or motion in broad terms and which objects appear and disappear, rather than technical cinematic fundamentals.

The method may include generating a Final Input Representation for the Model. Specifically, the final input to the model may be a batch of concatenated feature vectors, where each vector contains: Visual Data: Features extracted from the frame (e.g., image embeddings from CNN or ViT); and Cinematic Metadata: Numerical data representing technical settings like focal length, camera movement, and framing style. The input tensor may have the following structure: Shape: [batch_size, combined_feature_size], where combined_feature_size is the sum of the visual feature size and metadata feature size.

It should be appreciated that the unlike conventional models that process visual data alone, this model incorporates technical cinematographic metadata (focal length, camera movement, etc.) into the input. This creates a unique challenge where the model must learn how technical parameters impact the image content. Further, the metadata is not high-level semantic information (like object labels) but precise technical camera settings that require careful normalization and representation. This is a distinctive input pipeline that captures the essence of how a shot was composed. Each frame in a moving video can be more precisely labeled specifically relative to numerical coordinates as well as the location of objects. Still further, the optional inclusion of temporal data (e.g., handling sequences of frames) allows the model to learn dynamic aspects of cinematography, such as tracking shots or camera pans, which are rarely the focus of standard video models. By following this input representation process, the present techniques can handle both visual and technical inputs, uniquely positioning it to understand and caption cinematic elements in a highly specific and accurate way.

The method may include training the captioner model. Training the captioner model is a crucial step where the input representation (both visual and technical metadata) is used to teach the model how to generate captions that describe cinematic elements like focal length, camera movement, and framing. This training process is unique because the model is learning not just from the visual content, but from technical cinematographic metadata in SamildAnach as well, making it different from conventional models that focus on objects or actions.

By following the SamildAnach process, the model will learn to accurately caption cinematic elements in video, providing detailed insights into how shots are composed, framed, and executed. This makes the SamildAnach training process highly specialized and unique to the field of filmmaking and cinematography.

Below is a step-by-step process for training the model, with specific emphasis on the unique aspects related to learning cinematic metadata alongside visual data. The present techniques may include a computer-implemented method for training a captioner AI model. The method may include Preparing Training, Validation, and Testing Datasets. Before training, the method may ensure that the datasets are correctly split and preprocessed as per the previous steps. For example, the method may generate split sets as follows: Training Set: 70-80% of training data; Validation Set: 10-15% for hyperparameter tuning and early stopping; Test Set: 10-15% for final evaluation of the model.

Each set may include both the visual data (frames) and cinematic metadata (focal length, camera movement, framing), properly synchronized for each frame.

The method may include creating Data Loaders for each dataset to handle batching and shuffling during training. For example, PyTorch's DataLoaderclass may be used for managing this process:

from torch.utils.data import DataLoader
train_loader=DataLoader(train_dataset, batch_size=32, shuffle=True)
val_loader=DataLoader(val_dataset, batch_size=32, shuffle=False)

The method may include Defining the Model Architecture. For example, the model architecture may include two main components: Visual Feature Extractor: A CNN or ViT for extracting features from the video frames; and Metadata Processor: A fully connected network for processing the cinematic metadata. The model architecture may also include a Fusion Layer: A layer that combines the visual features with the metadata for final prediction. The architecture may be configured as defined elsewhere herein.

The method may include Loading a Pre-trained Visual Backbone. Specifically, using a pre-trained visual backbone (like ResNet or ViT) can speed up training and improve performance. Fine-tuning the last few layers allows the model to focus on learning the specific cinematic elements while benefiting from already learned visual features.

import torchvision.models as models
resnet=models.resnet50(pretrained=True)
resnet.fc=nn.Linear(2048, 512) # Adjust for final feature size Of course, residual networks having different numbers of layers may be used (e.g., resnet 10, resnet 20, resnet 75, resnet 90, resnet 100, etc.).

The method may include Building Fully Connected Layers for Metadata. Specifically, the method may build the fully connected layers for processing the metadata (focal length, camera movement, etc.). These layers will map the metadata inputs into a feature space that can be merged with the visual features.

```
class MetadataProcessor(nn.Module):
    def __init_(self):
        super(MetadataProcessor, self)._init_( )
        self.fc1=nn.Linear(10, 128) # Adjust for input size
        self.fc2=nn.Linear(128, 64)
        self.fc3=nn.Linear(64, 32) # Final feature size for fusion
    def forward(self, metadata):
        x=torch.relu(self.fc1(metadata))
        x=torch.relu(self.fc2(x))
        return self.fc3(x)
```

The method may include concatenating features in a fusion layer. Specifically, after extracting the visual and metadata features, concatenate them in the Fusion Layer and pass them through further fully connected layers to make final predictions (e.g., for focal length, camera movement, and framing).

```
class FusionModel(nn.Module):
    def __init_(self, resnet, metadata_processor):
        super(FusionModel, self)._init_( )
        self.resnet=resnet
        self.metadata_processor=metadata_processor
        self.fc1=nn.Linear(512+32, 256) # Combine visual and metadata features
        self.fc2=nn.Linear(256, 128)
        self.fc3=nn.Linear(128, num_classes) # num_classes depends on output
    def forward(self, image, metadata):
        img_features=self.resnet(image)
        metadata_features=
```

```
    self.metadata_processor(metadata)
        combined_features=torch.cat([img_features, meta-
            data_features], dim=1)
        x=torch.relu(self.fc1(combined_features))
        x=torch.relu(self.fc2(x))
        return self.fc3(x)
```

It should be appreciated that the Fusion Layer, which combines the visual features from the image with the technical metadata, allows the model to make predictions that are grounded in both the visual composition and the underlying technical setup of the shot.

The method may include defining the Loss Functions. Specifically, since the model is performing multiple tasks (e.g., predicting focal length, camera movement, and framing), a multi-task loss function may be advantageous, as it allows the model to optimize for all tasks simultaneously. The method may include defining Multi-task Loss Components, including Classification Loss: Use CrossEntropyLoss for categorical predictions like framing (close-up, wide shot, etc.); and Regression Loss: Use Mean Squared Error (MSE) for continuous values like focal length or camera movement.

Example

```
    classification_loss=nn.CrossEntropyLoss( )
    regression_loss=nn.MSELoss( )
    def multi_task_loss(pred_focal_length, true_focal_
        length,
        pred_framing, true_framing):
        loss_focal_length=regression_loss(pred_focal_length,
            true_focal_length)
        loss_framing=classification_loss(pred_framing, true_
            framing)
        return loss_focal_length+loss_framing # Sum of both
            losses
```

It should be appreciated that the loss function is multi-task, combining both regression and classification objectives, which is different from conventional models that might only predict a single type of output.

The method may include defining an optimizer. In some aspects, the method may use Adam an optimizer for updating the model weights due to its efficiency in handling sparse gradients and faster convergence in deep learning tasks. Example:

```
    optimizer=torch.optim.Adam(model.parameters( ),
        tr=0.001)
```

The method may include modifying learning rate scheduling to improve performance over time. Example (with learning rate scheduler):

```
    scheduler=torch.optim.tr_scheduler.StepLR(optimizer,
        step_size=5, gamma=0.1)
```

The method may include processing inputs and training the model in a training loop. The training loop include iterating over the dataset, feeding inputs into the model, calculating the loss, and updating the weights.

The method may include defining Epochs. Specifically, the method may define the number of epochs for training. For example, 20-50 epochs may be used, depending on the dataset size and complexity.

The method may include a Forward Pass, wherein for each batch of data, the following steps are performed: Load Batch: Load a batch of image frames and their corresponding metadata; and Forward Pass: Pass the images and metadata through the model to get predictions. Example:

```
    for images, metadata, labels_focal_length, labels_framing
        in train_loader:
        outputs=model(images, metadata) # Run forward pass
```

The method may include Loss Calculation. Specifically, the method may compute the loss for each task (focal length, framing, camera movement, etc.) using the multi-task loss function. Example:

```
    loss=multi_task_loss(pred_focal_ength, labels_focal_
        length,
        pred_framing, labels_framing)
```

The method may include Backpropagation, to compute gradients and update the model weights. Example:

```
    optimizer.zero_grad( ) # Clear previous gradients
    loss.backward( ) # Backpropagate the loss
    optimizer.step( ) # Update weights
```

The method may include validation. Specifically, after each epoch, the method may evaluate the model on the validation set to monitor performance and adjust hyperparameters if necessary. Example:

```
    with torch.no_grad( ):
        for images, metadata, labels_focal_length,
            labels_framing in val_loader:
            outputs=model(images, metadata)
            val_loss=multi_task_loss(pred_focal_ength,
                labels_focal_length,
                pred_framing, labels_framing)
```

The method may include a Scheduler, stepping the learning rate after each epoch to adjust the learning rate. Example:

```
    scheduler.step( )
```

The method may include Early Stopping and Model Checkpointing.

To avoid overfitting and ensure that the best model is saved, the method may use early stopping and checkpointing. Early Stopping may include monitoring the validation loss and stop training if it doesn't improve for a certain number of epochs. Example:

```
    early_stopping(patience=5) # Stop training if no improve-
        ment for 5 epochs
```

Model Checkpointing may include saving the model weights at the end of each epoch if the validation loss improves. This ensures that the best-performing model is retained. Example:

```
    if val_loss<best_val_loss:
        best_val_loss=val loss
        torch.save(modeL.state_dict( ), "best_modeL.pth")
```

The method may include Final Evaluation, After training is complete, evaluate the model on the test set to assess its generalization performance. This step ensures that the model is capable of accurately predicting focal length, camera movement, and framing on unseen data. Example:

```
    modeL.Load_state_dict(torch.load("best_model.pth")) #
        Load the best model
    model.eval( ) # Set model to evaluation mode
```

The method may include testing the model on Unseen Data. Specifically, the method may evaluate the model on the test dataset, which contains unseen examples that the model didn't encounter during training.

```
    with torch.no_grad( ):
        for images, metadata, labels_focal_length,
            labels_framing in test_loader:
            outputs=model(images, metadata)
            test_loss=multi_task_loss(pred_focal_ength,
                labels_focal_length,
                pred_framing, labels_framing)
```

The method may include analyzing performance, for example, by analyzing various performance metrics for both tasks (e.g., Mean Squared Error for focal length predictions and classification accuracy for framing). This will give insights into how well the model performs across different tasks.

It should be appreciated that the method represents an advantageous improvement over conventional techniques. In particular, the method includes Multi-task Learning: The model learns multiple tasks (focal length, camera movement, framing) simultaneously, optimizing for both classification and regression objectives. The method includes Fusion of Cinematic Metadata and Visual Data: Unlike traditional training loops that only focus on visual content (e.g., object detection or action recognition), this model integrates technical cinematographic metadata into the learning process, making the training unique to the domain of filmmaking and cinematography. Precision for Cinematic Tasks: The SamildAnach model is not just recognizing high-level objects or scenes; it is trained to predict technical parameters like focal length and camera movement, which are crucial for professional cinematic workflows. The training process must account for this high level of detail, making it distinct from standard image or video captioning tasks.

The method may include Model Deployment and Labeling a Large Video Database. Deploying the captioner model for labeling a large video database involves a series of steps that ensure the model is efficiently used to process and label massive amounts of video data. This step is unique compared to general model deployment because the task here is highly specific: labeling cinematic elements like focal length, camera movement, and framing-something not found in conventional systems. The key to this deployment process is integrating the model into a pipeline that can handle large-scale video input, manage metadata, and efficiently output labels for cinematic parameters. Following is a detailed, step-by-step process for deploying the model and labeling a large video database.

The method may include Preparing the Infrastructure for Deployment. This may include, before deploying the model, configuring necessary infrastructure for handling large volumes of video data and metadata. The method may include selecting High-Performance Deployment Environment. For example, the present techniques may be deployed in a hybrid environment capable of handling high computational loads because labeling a large video database can be resource intensive. This includes: Cloud Platforms: AWS, Google Cloud, or Azure, with GPU or TPU instances for efficient processing; On-Premise Infrastructure: High-performance GPU clusters if the data needs to be processed locally and for the security of sensitive video being used. FIG. 1 includes more details about suitable deployment environments. The computer-implemented methods discussed herein may each be operated in the environment of FIG. 1.

The method may include Installing libraries (e.g., PyTorch, TensorFlow, OpenCV, or others) for processing video data and running the model inference pipeline. Example (installing PyTorch with CUDA support):

pip install torch torchvision torchaudio--extra-index-urt https://download.pytorch.org/wht/cu113

The method may include Preparing the Video Dataset for Processing The next step involves preparing the video dataset for the model. This process is unique because the videos are being processed for technical cinematic elements, requiring both visual and metadata information.

The method may include organizing the large video database into manageable batches of video files to process in parallel. This allows efficient use of computational resources and prevents memory overflow. Each batch will contain several video files, depending on the available hardware.

Example
/video_batches/
  /batch_01/
    video_001.mov
    video_002.mov
  /batch_02/
    video_003.mov The method may include Extracting Frames from Video. Specifically, for each video, the method may extract frames at a consistent frame rate (e.g., 24 fps). This step ensures that the model receives the input in the form it expects (i.e., individual frames). Example using FFmpeg to extract frames:

ffmpeg   -i   video_001.mov-vf   fps=24/frames/frame_%04d.png

The output will be a sequence of images representing each frame of the video.

The method may include Extracting Metadata from Video. Specifically, the method may extract any relevant camera metadata embedded in the video files, if available. Although unlikely, this may include some focal length, exposure time, or sensor information. This metadata may be synchronized with the video frames to ensure that each frame has corresponding cinematic metadata. Example: If the video file has EXIF metadata that includes focal length or camera details, the present techniques may extract it using libraries like exifread in Python:

import exifread
with open("video_001.mov", "rb") as video_file:
  tags=exifread.process_file(video_file)
  focal_length=tags["EXIF FocalLength" ]

It should be appreciated that unlike conventional labeling, the method prepares the video dataset for cinematic analysis. This involves working not just with the frames but also with any available technical metadata like camera settings, focal length, and camera movement.

The method may include performing Model Inference on Video Frames and Metadata. Once the video frames and metadata are extracted and prepared, the next step is running the trained captioner model on the video data to generate labels for cinematic elements.

The method may include loading the trained captioner model into the deployment environment, in some aspects, making sure to load the best model checkpoint that was saved during the training phase. Example in PyTorch:

model=FusionModel( )
model.Load_state_dict(torch.Load("best_modeL.pth"))
model.eval( ) # Set model to evaluation mode The method may include Batch Processing of Frames and Metadata. The method may include processing video frames in batches for efficient inference. Depending on the available memory, the present techniques may use batch sizes between 16 and 64. The metadata will be aligned with the corresponding frames for each batch. Example:

for batch_frames, batch_metadata in video_loader:
  outputs=model(batch_frames, batch_metadata)

The steps for batch processing may include: Pass the video frames through the visual feature extractor (e.g., CNN or Vision Transformer); Pass the corresponding cinematic metadata (e.g., focal length, camera movement) through the metadata processor; and Fuse the outputs from both streams in the fusion layer and generate predictions for cinematic elements like focal length and framing.

The method may include Labeling Cinematic Elements. Specifically, for each frame, the model will output predicted labels for: Focal Length: The lens focal length used in the shot; Camera Movement: Movement along the X, Y, and Z axes, including pitch, yaw, and roll; and Framing: Whether the shot is a close-up, medium shot, or wide shot.

The method may include storing the model's output in an organized format (e.g., JSON or CSV) for each video file. Example output:

```
{
    "frame_0001.png": {
        "focal_length_mm": 50,
        "camera_movement": {"x": 0.02, "y": 0.01, "z": -0.03},
        "framing": "close_up"
    },
    "frame_0002.png": {
        "focal_length_mm": 85,
        "camera_movement": {"x": -0.01, "y": 0.02, "z": 0.01},
        "framing": "wide_shot"
    }
}
```

It should be appreciated that the captioner model labels cinematic elements rather than traditional video attributes. For example, the model predicts specific camera movements, focal lengths, and shot framings-critical details for video professionals that are not captured in conventional systems.

The method may include Post-Processing and Aggregation of Labels. Specifically, once the model has labeled the frames in the video, the next step is to aggregate the labels at the shot or video level. This may include Shot-Level Aggregation, wherein for each shot (sequence of continuous frames), the labels are aggregated across the frames. For example, the method may calculate an average focal length used in the shot or identify the dominant framing type across frames. Example (calculate average focal length for a shot):

```
def average_focal_length(labels):
    focal_lengths=[frame["focal_length_mm"] for frame in labels]
    return sum(focal_lengths)/len(focal_lengths)
```

This step helps consolidate the frame-level labels into more meaningful shot-level or video-level insights.

In some aspects the method may can use a majority voting system to determine the predominant framing style for the entire shot or video. This is useful when there are small variations in framing, but the shot should be labeled with a single framing style. Example:

```
from collections import Counter
def majority_voting_framing(labels):
    framings=[frame["framing"] for frame in labels]
    return Counter(framings).most_common(1)[0][0]# Return most frequent framing
```

The method may include generating Final Output for Each Video. Specifically, after aggregating the data, the method may generate a final output for each video that includes: (1) Average focal length for the video; (2) Predominant framing style for the video; and/or Camera movement patterns for the video. Example final output (in JSON format):

```
{
    "video_001.mov": {
        "average_focal_length_mm": 50,
        "dominant_framing": "medium_shot",
        "camera_movement": {"x": 0.02, "y": -0.01, "z": 0.03}
    }
}
```

The method may include Storing and Indexing the Labels. Specifically, once the labels are generated, they need to be stored in a format that can be easily queried and retrieved. The method may include storing the labels in a database. Specifically, the method may store the final labels in a relational database or NoSQL database for efficient querying. This allows video professionals to search for videos based on specific cinematic parameters (e.g., videos shot with a 50 mm lens or videos with extensive camera movement). Example:

INSERT INTO video_labels (video_id, avg_focal_length, dominant_framing, camera_movement)
VALUES ("video_001.mov", 50, "medium_shot", "x:0.02, y:-0.01, z:0.03");

The method may include Indexing for Fast Retrieval. Specifically, the method may configure indexing for key columns like focal length, framing, and camera movement to allow fast retrieval of videos based on these parameters. Example in SQL:

CREATE INDEX idx_focal_length ON video_labels (avg_focal_length);

The method may include performing Quality Control and Error Handling. Specifically, before deploying the model across the entire video database, the method may implement mechanisms for quality control to ensure the accuracy of the labels.

In some aspects, the method may include receiving Manual Review of Sample Labels. Manual review may be conducted by randomly selecting a sample of labeled videos and reviewing the labels for accuracy. This helps ensure that the model is correctly predicting focal lengths, camera movements, and framing.

The method may include Automated Consistency Checks. For example, the method may implement automated checks to detect inconsistent labels. For example, check if the focal length changes drastically between consecutive frames where no camera zoom is expected. Example:

```
def check_focal_length_consistency(labels):
    for i in range(1, len(labels)):
        if abs(labels[i]["focal_length_mm"]-labels[i-1]["focal_length_mm"])>10:
            print(f"Inconsistent focal length at frame {i}")
```

The method may include Scaling for Large Video Databases. Specifically, for very large video databases, the method may include additional steps that ensure that the system can scale efficiently. For example, parallel processing or distributed computing may be implemented to enable labeling multiple videos in parallel, or concurrently (different types of parallelism/concurrency may be used, including threads, processes, distributed message queues, etc.). In some aspects, parallelization can be accomplished by splitting the dataset across multiple machines or cloud instances. Example with Python's multiprocessing (thread pool):

```
from multiprocessing import Pool
with Pool(processes=4) as pool:
    pool.map(process_video_batch, video_batches)
```

In some aspects, the method may implement load balancing to distribute the workload across multiple servers or cloud instances. This ensures that no single machine is overwhelmed by the processing load.

It should be appreciated that the method's cinematic labeling, unlike conventional labeling that focuses on objects or actions, processes labels' technical cinematic elements like focal length, camera movement, and framing, which are critical for filmmaking and video production. The model not only processes visual data from the frames but also integrates technical metadata (focal length, camera movement), making it a unique tool for labeling cinematic features. The post-processing steps aggregate frame-level predictions into meaningful shot-level and video-level insights (e.g., average focal length, dominant framing), something never done in standard video analysis. This process can be configured to scale efficiently for very large video databases, ensuring that a vast number of video files can be captioned/labeled with detailed cinematic information in a computationally tractable manner. By following this process, the captioner model can be deployed effectively to label a large video database, providing valuable insights into the technical composition of each video shot, which can be used for professional filmmaking, editing, and archiving purposes.

The method may include post-processing and quality control, to confirm accuracy and reliability of the labels generated by the captioner model. Since the captioner models are uniquely designed to label cinematic elements (e.g., focal length, camera movement, and framing) in large video datasets, the post-processing phase must focus on refining the raw predictions, handling any inconsistencies, and validating the quality of the output. This step is distinct because the focus is not only on visual content but also on technical cinematic metadata, which requires specialized handling.

Following is a detailed, step-by-step process for post-processing the model output and implementing quality control checks:

The method may aggregate frame-level predictions; specifically, the model may output predictions for each frame of the video. Post-processing these frame-level predictions into more meaningful shot-level or video-level insights confirms effective use of the labels. The method may aggregate focal length. Since focal length is a continuous value, the method can compute the average focal length over a series of frames or a full shot. This helps provide a more stable and useful value rather than relying on per-frame focal length, which can fluctuate. The post-processing may include the aggregation and majority voting techniques discussed above. It should be appreciated that in cinematography, the focal length may change smoothly over a sequence unless there is a deliberate zoom. Averaging the focal length across frames provides a more meaningful result, reducing noise in the data, and improving the output. Unlike object detection models, the goal here is to understand cinematic composition. The majority-voting technique ensures that small fluctuations in the model's frame-by-frame predictions do not mislabel the framing of an entire shot.

The post-processing steps of the method may include Camera Movement Smoothing. Specifically, camera movement values (along X, Y, Z axes, or pitch, yaw, roll) can vary slightly frame to frame. To reduce jitter in these predictions, the method may apply a smoothing filter (e.g., a moving average or Gaussian filter) to create a more stable movement profile for the camera. Example (using a simple moving average):

```
import numpy as np
def smooth_camera_movement(movements, window_size=5):
    movements_array=np.array(movements)
    smoothed_movements=np.convolve(movements_array,
        np.ones (window_size)/window_size, mode='valid')
    return smoothed_movements
```

It should be appreciated that in video, smoothness is important for accurately labeling camera movements. This is especially important in professional filmmaking, where the camera is often moved in carefully controlled ways. Smoothing the camera movement data reflects these intentions more accurately than the raw, frame-level predictions.

After aggregating the frame-level predictions, the method may run consistency checks across the data. This ensures that the labels are accurate and free from obvious errors.

The method may further check for Inconsistent Focal Length Changes. Focal length will not change drastically between consecutive frames unless there is an intentional zoom. A large, sudden change in focal length may indicate a misprediction by the model. Example check:

```
def check_focal_length_consistency(frame_predictions,
    threshold=10):
    for i in range(1, len(frame_predictions)):
        if abs(frame_predictions[i]["focal_length_mm" ]
        -frame_predictions[i-1]["focal_length_mm"])
        >threshold:
            print(f"Inconsistent focal length change between
                frame {i-1} and {i}")
```

It should be appreciated that cinematic elements like focal length may be controlled in a deliberate manner, so ensuring consistent focal length predictions is critical to maintaining the integrity of the labeled data. Also the focus of the present techniques may be on a discrete set of focal lengths most commonly used in filmmaking, making this task simpler.

The method may include check for Inconsistent Camera Movement.

Similarly, camera movement will not experience large, sudden shifts unless explicitly intended (e.g., a whip pan or fast dolly movement). A velocity threshold can be applied to flag potentially erroneous camera movement predictions. Example:

```
def check_camera_movement_consistency(frame_predictions,
    velocity_threshold=0.1):
    for i in range(1, len(frame_predictions)):
        prev_frame=frame_predictions[i-1]["camera_movement" ]
        curr_frame=frame_predictions[i]["camera_movement" ]
        velocity=np.linalg.norm(np.array([curr_frame['x'],
            curr_frame['y'], curr_frame['z']])-np.array([prev_frame['x'], prev_frame['y'], prev_frame['z']]))
        if velocity>velocity_threshold:
            print(f"High camera movement detected between
                frame {i-1} and {i}: {velocity}")
```

It should be appreciated that camera movement is a technical parameter critical to shot composition. Ensuring that movement predictions are consistent with actual cinematic movement patterns (e.g., smooth tracking shots) is one way in which the present techniques improve upon conventional video generation techniques, by maintaining accuracy in the labeling.

The method may further include checking for framing transitions. Specifically, framing transitions are expected to follow the logical flow of the scene. For example, a close-up will not suddenly transition to a wide shot without an apparent reason. This check ensures that framing predictions change in reasonable increments. Example check:

```
def check_framing_transitions (frame_predictions):
    valid_transitions = {"close_up": ["medium_shot"],
        "medium_shot": ["close_up",
"wide_shot"],
            "wide_shot": ["medium_shot"]}
    for i in range (1, len (frame_predictions)):
        prev_frame = frame_predictions [i-1]["framing"]
```

-continued

```
curr_frame = frame_predictions [i]["framing"]
if curr_frame not in
   valid_transitions.get (prev_frame, [ ]):
      print (f"Invalid framing transition from
{prev_frame} to {curr_frame} at frame {i}")
```

It should be appreciated that this check is particularly tailored for cinematic workflows, where framing transitions are dictated by narrative or visual flow. Ensuring that the predicted framing transitions make sense in the context of cinematic rules is critical for post-processing in this domain.

The method may further include Outlier Detection and Correction. Specifically, outlier detection may be used to flag any anomalies in the predictions, especially for technical parameters like focal length or camera movement. The method may Detect and Correct Focal Length Outliers. Specifically, the method may flag any focal length prediction that falls outside the expected range for the given camera equipment or shot type. Example:

```
def detect_focal_length_outliers(frame_predictions,
   min_focal_length=24, max_focal_length=85):
   for i, frame in enumerate(frame_predictions):
      if    not    (min_focal_length<=frame["fo-
         calt_ength_mm"]<=max_focal_length):
         print(f"Outlier focal length detected at frame {i}:
            {frame['focal_length_mm']}")
```

The method may include a correction strategy that replaces outliers with the average focal length of surrounding frames to maintain consistency. Example correction:

```
def    correct_camera_movement_outiers(frame_predic-
   tions):
   for i in range(1, len(frame_predictions)-1):
      for axis in ["x", "y", "z"]:
         if
         abs(frame_predictions[i-]["camera_movement"][axis])
            >5.0:
         frame_predictions[i]["camera_movement"][axis]=
            frame_predictions[i-1]["camera_movement"][axis]+
            frame_predictions[i+1]["camera_movement"][axis])/2
```

The method may further include confidence scoring and thresholding. It is important to assign confidence scores to the model's predictions and set thresholds to filter out low-confidence labels. Generated confidence scores may be included in the final labels to help assess reliability. Example:

```
def assign_confidence_scores(predictions, confidences):
   for i, frame in enumerate(predictions):
      frame["confidence"]=confidences[i]
```

The method may include Thresholding Based on Confidence. Specifically, the method may set a confidence threshold below which the predictions will either be discarded or marked as needing manual review. This ensures that only high-confidence predictions are used in the final labeled dataset. Example:

```
def filter_low_confidence_predictions (frame_predic-
   tions, confidence_threshold=0.8):
   high_confidence_predictions=[frame for frame in
      frame_predictions if frame["confidence"]>=confi-
      dence_threshold]
   return high_confidence_predictions
```

It should be appreciated that the confidence scoring is particularly important for cinematic labeling, as filmmakers require high accuracy in technical parameters. Lower confidence predictions will either be flagged for review or excluded from critical tasks. By generating the confidence scores for the frames, the present techniques significantly improve upon conventional techniques that do not include any such confidence information.

In some aspects, the method may include a feedback Loop for Model Improvement. Specifically, based on the findings from the manual review, retrain and/or fine-tune the model on the identified error cases to improve accuracy. This feedback loop ensures continuous improvement in the model's ability to label cinematic elements.

The method may include a Final Label Export and Storage. Specifically, once the post-processing and quality control steps are completed, the method may export the final labeled data in a format suitable for future use (e.g., as a serialized string, pickled object, etc.). The method may store the final labels in a relational database, NoSQL database, flat file, etc. for efficient querying. This allows filmmakers or video professionals to retrieve labeled data based on specific cinematic elements (e.g., focal length, camera movement).

It should be appreciated that the post-processing is designed to handle the intricacies of cinematic metadata (focal length, camera movement, framing), which requires specialized checks and corrections not found in conventional techniques. The focus on smooth transitions, smoothing camera movements, and majority voting for framing is unique to cinematic applications, where precision and control over technical elements are paramount. The quality control process ensures that the model's performance is continuously improved, ensuring that it remains highly accurate in its predictions of cinematic elements. The outlier detection strategies for focal length and camera movement ensure that the final labels are true to the cinematographic intent, a consideration that is especially important in professional filmmaking and editing contexts. By following this post-processing and quality control process, through the captioner models, the present techniques ensure that the labels generated by the captioner model are accurate, consistent, and of high quality, ready for use in professional cinematic workflows or large-scale video databases.

Exemplary Captioner Model Training and Use

Training the one or more captioner models may include a multi-task learning approach, where the captioner model is trained to predict multiple types of metadata simultaneously. This approach allows the captioner model to learn interdependencies between cinematic parameters, such as how focal length impacts depth of field and how camera movement affects parallax and occlusion. The training process may include providing temporal sequences of frames to the captioner model as training inputs, to enable the captioner model to capture dynamic changes across video sequences rather than relying on static images. This focus on temporal data enables the captioner model to accurately predict technical metadata for professional filmmaking.

Once trained, captioner models may be deployed and used to label a large video database with speed and scalability. For example, in some aspects, a trained captioner model may process video sequences in batches, maintaining temporal consistency in the metadata generation. Special attention may be given to ensuring that the generated metadata is accurate, consistent, and useful for downstream filmmaking tasks. To this end, automated error detection and correction mechanisms may be integrated into the model deployment process, along with quality control checks to validate the accuracy of the metadata. This optimized deployment ensures that the captioner model can efficiently label vast video libraries with precise cinematic metadata.

In some aspects, the present techniques may include post-processing and quality control steps that refine the generated metadata. Automated error detection and correction mechanisms may be employed to identify and resolve inconsistencies in the metadata. The present techniques may include temporal consistency checks verify that predictions for key parameters transition smoothly across consecutive frames. In some aspects, manual review and expert intervention may be incorporated to provide further feedback correct complex or subtle inconsistencies in initial model runs. In some aspects, a continuous feedback loop may be used to enable model refinement, ensuring continuous improvement in the captioner model's accuracy and consistency over time.

The process of capturing and organizing the dataset on a soundstage for the captioner model represents an approach to teaching the captioner model the technical aspects of cinematography. By focusing on detailed metadata and ensuring temporal consistency, the captioner model is equipped to generate video content that adheres to professional filmmaking standards. This process enables achieving true controllability in AI video generation, bridging the gap between AI-generated content and real-world video production.

Exemplary Numerical Tokenization of Geographic Data

In some aspects, the captioner model is an AI video generation that processes and understands complex cinematic metadata. This model's approach to handling both visual data and detailed cinematic metadata, including the use of numerical tokenization for geographic data, sets it apart from conventional models. By focusing on the precise technical parameters of filmmaking, such as focal length, camera movement, shot type, and motion blur, the captioner model is designed to generate video content that adheres to professional filmmaking standards.

One of the key innovations in the captioner model is its approach to encoding geographic location data numerically, rather than relying on textual descriptions. This method of numerical tokenization allows for a more efficient and precise representation of spatial relationships within a scene. For instance, the captioner model can accurately interpret the camera's position in three-dimensional space (X, Y, Z coordinates) relative to a fixed origin point on the soundstage. Similarly, the position of objects or subjects within the scene may be represented using the same numerical coordinate system. This precise, numerical approach to spatial data ensures that the captioner model can accurately learn and predict the impact of camera positioning and movement on the visual composition of a shot.

The benefits of numerical tokenization for geographic data are manifold. Firstly, numerical tokenization allows for direct input into captioner models (e.g., AI or machine learning models) as part of the input vector, minimizing preprocessing steps and reducing computational overhead. Secondly, numerical tokenization maintains high precision, as exact coordinates provide a clear and unambiguous representation of spatial relationships. This precision enables training the captioner model to learn relationships underlying subtle nuances of cinematic composition and camera dynamics. Thirdly, numerical tokenization facilitates faster convergence during training, as the captioner model can more easily learn quantitative differences between positions. Finally, numerical tokenization offers a compact representation of geographic metadata, reducing memory usage and computational complexity.

By integrating detailed cinematic metadata, including numerical tokenization of geographic data, into the input representation, the captioner model is equipped to learn complex interdependencies between various cinematic parameters. This learning process is further enhanced by the captioner model's multi-task learning architecture, which allows it to simultaneously predict multiple technical parameters. The model's training on temporal data captures the dynamics of camera movement and object motion, enabling it to generate metadata that accurately reflects the continuous movement and visual effects seen in professional filmmaking.

Exemplary Multi-Task Learning and Model Training

The present techniques' approach to multi-task learning, where the model is trained to predict and optimize for multiple outputs such as focal length, camera movement, and shot type, represents a significant advancement in the field of AI video generation. By understanding the interdependencies between these parameters, the present techniques are equipped to handle the complex and nuanced demands of professional filmmaking, setting them apart from traditional techniques.

Incorporating geographic location as numerical metadata further enhances the present techniques' capabilities. Specifically, recording geographic data numerically allows for efficient numerical tokenization, which is more precise and less ambiguous than textual descriptions. This precision is crucial for accurately modeling spatial relationships and dynamics in video content, enabling the present techniques to generate video that adheres closely to professional standards. The structured approach to capturing detailed cinematic metadata, combined with the captioner model's ability to learn from temporal sequences of frames, ensures that the present techniques can accurately predict technical cinematic parameters. This level of detail and precision in training is what enables the present techniques to achieve true AI video controllability, bridging the gap between AI-generated content and real-world video production.

By focusing on the technical aspects of cinematography, such as lens optics, camera dynamics, and framing conventions, the present techniques are uniquely positioned to generate metadata that aligns with professional filmmaking standards. This capability is particularly valuable for high-end visual effects and automated video generation workflows, where precise control over focal length, camera movement, and shot types is essential.

In some aspects, the present techniques may be used to further train an existing trained model. In other aspects, the present techniques may be used to generate a new trained model. In still further aspects, the present techniques may be adapted to facilitate continuous learning, enabling models to incrementally update and refine their capabilities over time based on new data or evolving requirements. This approach supports the development of AI systems that remain relevant and effective as the landscape of video content and cinematic techniques continues to change.

In some aspects, the present techniques encompass a computer-implemented method for training artificial intelligence (AI) models for video content generation and understanding, wherein a captioner model plays a role in the training pipeline. The captioner model may be designed to automate the captioning and labeling of video content, a task that is essential for the effective training of AI models, especially those aimed at generating or interpreting video content. This captioner model may leverage complex cinematic metadata, including numerical tokenization of geographic data, to provide precise and contextually relevant captions and labels.

In some aspects, the captioner model is positioned upstream in the training pipeline. In this configuration, the captioner model is one of the initial steps in the process, directly handling raw video data to produce captioned and labeled content. This processed content is then utilized to train foundation models, which may require extensive, accurately labeled video data to learn how to generate new video content or understand video content with high accuracy. The upstream positioning of the captioner model may be used to ensure that the foundation models have access to high-quality, well-annotated data from the outset of their training process.

In some aspects, the captioner model is used downstream in a transfer learning context. Here, a foundation model is first trained on a broad dataset to develop a general understanding of video content. The captioner model is then fine-tuned using the outputs of the foundation model, specializing in the automated captioning and labeling of video content. This downstream application allows the captioner model to benefit from the foundational insights gained from the initial broad training, applying these insights to the specific task of captioning and labeling.

In some aspects, the present techniques include methods for integrating the captioner model both upstream and downstream in the training pipeline, depending on the specific requirements of the training process and the desired outcomes. This flexibility in positioning allows for the optimization of the training process, ensuring that AI models are trained efficiently and effectively, with a strong foundation in accurately labeled video content.

In some aspects, the present techniques further include a multi-task learning architecture for the captioner model, enabling it to perform multiple captioning and labeling tasks simultaneously. This architecture is particularly beneficial when the captioner model is used downstream, as it allows the model to leverage its training on a broad range of tasks to provide highly accurate and contextually relevant captions and labels for a wide variety of video content.

In some aspects, the present techniques emphasize the importance of numerical tokenization of geographic data in enhancing the accuracy and efficiency of the captioner model, whether used upstream or downstream. By encoding geographic location data numerically, the captioner model can more precisely represent spatial relationships within a scene, facilitating the accurate interpretation of camera and object positions. This precision is crucial for generating captions and labels that accurately reflect the content of the video.

In some aspects, the present techniques may use detailed cinematic metadata in training the captioner model, enabling it to understand and interpret complex cinematic elements such as camera angles, movement, and shot types. This understanding may be used to generate high-quality captions and labels that can be used to train foundation models or to refine the outputs of such models in a downstream transfer learning scenario.

In some aspects, the present techniques include combining upstream and downstream uses of the captioner model in a single training pipeline. This hybrid approach allows for the initial broad training of foundation models with high-quality, captioned, and labeled data, followed by the specialized fine-tuning of the captioner model to enhance its performance in specific captioning and labeling tasks.

In some aspects, the use of the captioner model in a downstream position enables a more focused and efficient approach to training AI models for specific tasks. By leveraging the pre-trained foundation model, the captioner model can achieve higher accuracy and performance in captioning and labeling without the need for extensive training from scratch. This approach not only saves computational resources but also allows for the rapid deployment of specialized models in various applications.

For example, in some aspects the pre-trained or foundational model may be a Filmmaker AI model such as the ones described in U.S. Patent Application No. 63/657,756 entitled "COMPUTING SYSTEM, COMPUTER-IMPLEMENTED METHOD, AND COMPUTER-READABLE MEDIUM FOR GENERATING VIDEO CONTENT WITH PROFESSIONAL FILMMAKING TECHNIQUES", filed on Jun. 7, 2024 and herein incorporated by reference in its entirety for all purposes. Herein, the '756 patent application, and its techniques, may be generally referred via the shorthand "Filmmaker."

In this case, the output of the Filmmaker AI model may aggregate, organize and reshape data generated during training of the Filmmaker data into tensors which can be used to train the captioner model so that it is enabled to generate metadata based upon an existing or future AI video library, and transform that video data into training data that can be used to train a model to generate video that is reliable, realistic and consistent with and controllable by the standards of professional filmmaking.

As noted, a challenge facing video AI now is that it cannot understand complex and interrelated cinematic principles necessary to fully comprehend and regenerate photography, and this leads to uncanny/bizarre/grotesque results. Correcting for these uncanny artifacts may be accomplished by exhaustive re-captioning of all textual descriptors, and re-training of existing video models, including the recreation of weights and vectors from scratch, using metadata outputs of the present captioner model. In other aspects, the present techniques may be used to fine-tune such models to generalize. In effect, the existing model may teach itself to apply the principles of the present techniques across its entire library without needing to create an entire new library of vectors. Via this fine-tuning, the present techniques may insert a set of weights into the existing AI model architecture (e.g., by the addition of one or more layer(s)) while existing weights remain consistent in their construction and organization.

As noted, conventional AI video systems are plagued by uncanny valley effects and grotesque/bizarre outputs. To overcome this, the present techniques are configured such that when constructing an image, the central, defining characteristics that will apply regardless of the subject are the photographic parameters. This explains why focal length (which provides clear boundaries and physics) and camera movement may be first defined, prior to subjects being photographed (generated). In this manner, there is context and understanding for how and where subjects appear within the film output. The present captioner model techniques include understanding of key cinematic elements that is not present in any large video (LVM) model today and which are vital for professionalizing any large video model so it can be used for professional cinema. In addition to making an LVM reliable and functional for professional film B2B and consumer purposes, the present techniques can improve existing LVMs significantly, making them produce actually useful video outputs.

Exemplary Deployment and Scalability

The present captioner models may be deployed to handle vast video libraries and generate metadata that is accurate, consistent, and temporally coherent. In some aspects, this process is rooted in the detailed and controlled dataset captured on a soundstage, focusing on the narrow but critical cinematic parameters like focal length, camera movement, shot types, and motion blur. The deployment strategy may include several steps that leverage the unique strengths of the captioner models and address the challenges of processing large-scale video data with high precision.

For example, the deployment process may begin with efficient batch processing for large datasets. By organizing the video data into manageable batches and employing distributed processing, the present techniques can process large volumes of video efficiently, maintaining high-quality labeling without sacrificing speed. This approach enables handling the demands of professional filmmaking workflows, where vast amounts of footage need to be processed and labeled with technical cinematic metadata. The deployment process may emphasizes temporal sequence-based metadata generation. The present techniques may process sequential frames rather than isolated frames, ensuring that metadata such as focal length, camera movement, and motion blur are generated in a temporally consistent manner. This approach reflects the real-world dynamics of camera movements and focal length changes, providing metadata that aligns with professional filmmaking standards.

Further, the deployment process may incorporate real-time feedback and quality control mechanisms. Automated error detection and correction mechanisms may flag inconsistencies or errors in the predicted metadata, allowing for immediate corrections. This level of automated quality control, combined with manual review and expert intervention, ensures that generated metadata is accurate, consistent, and meets the high standards required in professional filmmaking. Additionally, the deployment may include continuous feedback and model refinement. By feeding corrected and flagged sequences back into the model's training process, the present techniques may continuously improve its accuracy and consistency. This adaptive learning loop allows the captioner models to evolve and refine complex cinematic parameters over time, ensuring that the models remains highly effective in predicting technical metadata for professional filmmaking purposes. The deployment process may organize and store refined metadata in a structured format, making the metadata accessible for post-production tasks. By integrating the labeled metadata with common post-production tools and databases, the present techniques facilitate seamless integration into filmmaking workflows, allowing filmmakers to search, retrieve, and manipulate video data based on specific technical parameters.

Exemplary Post-Processing and Quality Control

The captioner models represent a significant leap forward in the field of AI-generated video, particularly in their ability to understand and replicate the nuanced, technical aspects of professional filmmaking. By focusing on the precise, controlled capture of cinematic metadata such as focal length, camera movement, shot types, occlusion, parallax, and motion blur, the present techniques are uniquely positioned to generate video content that meets the high standards of the film industry. This approach not only enhances the models' ability to produce visually compelling and technically accurate video sequences but also ensures that these generated videos can be seamlessly integrated into professional filmmaking workflows.

As noted, the present techniques may use numerical tokenization for geographic metadata, which significantly improves the efficiency and precision of the model's learning process. By representing geographic locations and camera positions as numerical coordinates, the model can directly process this information without the need for complex tokenization or dimensionality reduction steps. This not only reduces computational overhead but also eliminates ambiguity, ensuring that the model has a clear, unambiguous understanding of spatial relationships. This precision is important for accurately modeling cinematic techniques such as parallax and occlusion, which rely on precise spatial positioning.

Furthermore, the use of the multi-task learning architecture allows the captioner model to simultaneously predict multiple cinematic parameters, capturing the complex interdependencies between these variables. This is a departure from traditional captioning models, which may focus on a single output. By learning to predict focal length, camera movement, shot type, and motion blur in a cohesive manner, the captioner models can generate metadata that accurately reflects the technical and artistic considerations of professional filmmaking.

The post-processing and quality control steps are integral to ensuring the accuracy and consistency of the generated metadata. Automated error detection and correction mechanisms, combined with manual review and expert intervention may be used to ensure that any inconsistencies or errors are promptly identified and corrected.

Exemplary Integration with Post-Production Tools

The present techniques may include computer-executable instructions for integrating generated metadata with post-production tools and video databases, to make the captioner model a practical tool for filmmakers, editors, and content creators. This integration ensures that the rich, detailed metadata generated by the model—covering technical cinematic parameters like focal length, camera movement, shot type, and motion blur—is readily accessible and usable within the professional video production workflow. In some aspects, this integration may be achieved by integrating with video editing software. This may include metadata import functionality, including plugins or extensions for popular video editing software (e.g., Adobe Premiere Pro, Final Cut Pro) that allow users to import the metadata generated by the captioner models directly into their projects. This may include information about shot types, camera movements, and focal lengths for each clip in the editor's timeline. This may also include, automated sequence assembly, wherein metadata is used to automate the assembly of video sequences based on specific criteria. For example, an editor could quickly compile all close-up shots taken with a 50 mm lens or all shots with dolly-in movement, streamlining the editing process. This may also include enhanced clip organization, wherein metadata is used to tag and organize clips within the editing software, making it easier for editors to find the right shots for their projects. This may include sorting clips by shot type, focal length, or camera movement.

In some aspects, the present techniques may integrate the metadata with visual effects software for precise visual effects (VFX) matching. For visual effects artists working in software like Adobe After Effects or Nuke, the metadata provides information for matching CGI elements with live-action footage. Knowing the exact camera movement and focal length used for a shot allows for more accurate integration of CGI, ensuring that the visual effects blend seamlessly with the live-action footage. The metadata may be integrated with automated camera tracking. For example, camera movement metadata can be used to automate the camera tracking process in VFX software, reducing the time and effort required to match CGI elements with the movement of the live-action camera.

In some aspects, the present techniques may integrate the metadata with automated video generation systems. For example, for systems designed to generate video content automatically, the detailed metadata from the present techniques may provide a blueprint for creating shots that adhere to professional filmmaking standards. This may include generating shots with specific camera movements, focal lengths, and shot compositions based on the metadata. The present techniques may integrate the metadata for enhanced realism and consistency, for example, by basing automated video generation on precise cinematic metadata, to produce content that is more realistic and consistent with human-made footage. This is particularly valuable for applications like virtual reality, where maintaining immersion is critical.

The present techniques may integrate the metadata with video databases. For example, the present techniques may incorporate the metadata into video database systems, making it searchable by filmmakers and content creators. This allows users to query the database for shots based on specific technical criteria, such as focal length, camera movement, shot type, etc.; facilitating the discovery of footage that meets their project's needs. The present techniques may integrate the metadata to curate and recommend content within video databases or stock footage libraries. For example, a filmmaker looking for establishing shots with a dolly-out movement could be presented with a selection of clips that match this criterion, thanks to the metadata generated by the present techniques.

By integrating the generated metadata with post-production tools, visual effects software, automated video generation systems, and video databases, the captioner model not only enhances the efficiency and creativity of video production workflows but also opens up new possibilities for content creation and discovery.

Exemplary Additional Optimizations

In some aspects, the present techniques may include additional optimizations. In one aspect, the focus of the computer-implemented method for constructing captioner model(s) may be tailored to the principal goal of analyzing Filmmaker's data and identifying areas for special attention during the process. Given Filmmaker's method of capturing data on a soundstage with a specific focus on focal length, camera movement, and shot types, adjustments to the method steps may be made. These adjustments reflect how the captioner model(s) have been altered and improved to better process the Filmmaker's data. The aim is to build a model capable of generating professional-grade metadata to guide video generation, taking into account the specific nature of the data.

Here, the computer-implemented method may include data collection and preparation, where the model may rely on a narrowly defined dataset while attempting to maintain meaningful diversity within each category. The data collection may become highly focused on variables such as focal length, camera position, movement vectors, depth, and framing. The data preparation process may prioritize the clean and precise capture of these variables, ensuring that each video file is meticulously annotated with camera metadata, including LiDAR and laser locator data for tracking spatial relationships between objects. The scope of data collection may be narrowed to capture all possible cinematic shot types and the core focal lengths used in professional filmmaking.

The computer-implemented method may include data labeling and annotation, shifting the focus entirely to labeling technical cinematic parameters. Video sequences may be labeled with cinematic shot types and include precise lens metadata in each frame's annotation. The exact camera movement vectors for every shot may also be annotated, allowing the model to capture how different movements interact with focal length and framing.

The method may include dataset splitting for training, validation, and testing. The dataset may be split deliberately to ensure that each set has a balanced representation of all shot types and focal lengths, as well as various camera movements, to teach the model how different types of movement affect framing and focus.

The method may include preprocessing, focusing on extracting technical cinematic features such as lens distortion, depth of field, and motion blur. Preprocessing may also include generating data for occlusion and parallax by tracking object and camera movements relative to each other.

The method may include configuring the architecture of the captioner model(s), which may now focus specifically on predicting technical cinematic metadata. The architecture may include specific heads trained to predict focal length, camera movement vectors, and shot type, employing multi-task learning for cinematic metadata.

The method may include input representation for the model, focusing entirely on cinematic elements like focal length, movement, and framing. The input representation may include the focal length as a continuous variable, detailed camera movement vectors, and shot type labels.

The method may include training the model to predict precise cinematic metadata for each shot. The training process may focus on the accuracy of the predicted focal length and camera movement vectors, classification of shots based on cinematic framing, and prediction of depth relationships between objects in the scene.

The method may include model deployment and labeling a large video database with cinematic metadata, ensuring that the captioner model(s) apply its learned knowledge of focal lengths, camera movements, and shot types to new data.

The method may include post-processing and quality control, focusing on ensuring that the technical cinematic metadata predicted by the model is accurate. This may include checking the accuracy of focal lengths, verifying camera movement vectors with LiDAR and laser locator data, and validating shot type labels against professional filmmaking standards.

The changes across all steps reflect the need for more specific and precise metadata encoding, focusing on the technical cinematic parameters captured in a highly controlled environment. The captioner model(s) may be trained to predict and encode focal length, camera movement, and shot types with extreme accuracy, which is critical for professional filmmakers who require precise video generation based on real-world cinematic conventions.

Exemplary Optimization of Planning of Filmmaker Dataset for Captioner Model Cinematic Parameters In one aspect, the optimization of the planning for the filmmaker dataset for captioner model(s) may involve constructing a controlled dataset on a soundstage to ensure the data may be of high enough quality to train a large video model capable of generating highly accurate, cinema-standard video. The dataset captured may include the precise optics of photography such as focal length, frame rate, shutter angle, camera movement, and may also include clear labels and metadata for cinematic framing terms like close-up, over-the-shoulder, and wide shot. This structured, comprehensive dataset may provide the foundation for the captioner model(s) to learn the interdependencies between camera optics and cinematographic language, enabling reliable and precise video generation according to real-world filmmaking standards. The step-by-step process may detail the optimal construction of the Filmmaker dataset, ensuring it covers all necessary variables, capturing both isolated effects and complex interdependencies to best function with captioner model(s). The goal may be to allow the model to learn from clear, high-quality data that matches the real-world cinematic standards required in professional filmmaking.

In one aspect, the optimal planning of the dataset for cinematic parameters may begin by defining the key parameters that the captioner model(s) may need to understand and generate video reliably. These parameters may include capturing different focal lengths such as 18 mm, 24 mm, 35 mm, 50 mm, 85 mm, 135 mm to cover wide-angle, normal, and telephoto shots. Precision-controlled movements on the X, Y, and Z axes such as dolly in/out, pan, tilt, crane, and boom movements may be included. A variety of frame rates such as 24 fps, 30 fps, 60 fps to reflect real-world standards for cinematic, television, and high-frame-rate footage may be captured. Varying shutter angles such as 180°, 90°, 360° to control the amount of motion blur, which may be crucial for realism in fast-moving or dynamic scenes, may be included. Composition and cinematic language shots that conform to cinematic framing conventions like close-up, medium close-up, over-the-shoulder, wide shot, establishing master—with clear labeling and metadata for each may also be part of the dataset.

In one aspect, creating a controlled environment on the soundstage may involve setting up a motion control camera system that can automate camera movements, allowing exact replication of shots while adjusting only specific parameters such as focal length or camera movement. A motion control camera rig may be essential for capturing precise camera movements with millimeter-level accuracy. This may allow varying the movement in a controlled manner along the X, Y, and Z axes while changing only one variable at a time such as focal length, movement speed. It may be able to repeat identical shots while making slight modifications to specific variables. Systems like the Techno crane, Panther Dolly, and a robotic arm like KUKA that automate and precisely repeat camera movements may be used. A high-quality camera with interchangeable cinema lenses that can shoot in various focal lengths, ideally with a full-frame sensor, may be chosen. LiDAR and laser locator systems to track the exact position of the camera, lens, and subjects in 3D space may be installed. This metadata may allow the model to learn the precise relationship between camera position, movement, and image characteristics like parallax and occlusion.

In one aspect, lighting may be a key variable in video and may be controlled to ensure that the camera captures a range of different lighting conditions, but within a replicable, consistent setup. For example, shooting scenes in both bright, evenly lit conditions (high key) and darker, moodier setups (low key) to show how focal length, exposure, and depth of field interact may be included. Variable exposure by adjusting aperture and ISO to capture a wide range of depth-of-field effects, from shallow to deep focus, may be considered. The choice of subjects and sets may represent a range of scenes in film production. Simple objects such as blocks, charts used initially to isolate focal length, lens distortion, depth of field, and camera movement may have clear shapes and distance markers. Live subjects such as actors, mannequins for shots requiring realistic human interaction, facial details, and dynamic movement in a scene may be used. A diverse set of actors of different body types, skin tones, and clothing to ensure that the model learns how focal length and camera movement impact human subjects in a variety of scenarios may be included. A mix of static sets such as furniture, walls, and architecture and dynamic elements such as moving props, opening doors to represent complex camera-subject interactions like parallax and occlusion may be part of the set design.

In one aspect, capturing single-variable iterations with Filmmaker may start with single-variable iterations, where only one variable such as focal length may be changed while all other conditions remain constant. This may allow the model to learn the precise effect of each variable in isolation. Capturing identical shots using different focal lengths such as 18 mm, 24 mm, 35 mm, 50 mm, 85 mm may be an objective. Filming a static scene where objects and subjects are positioned at varying distances from the camera, repeating the same shot using different lenses, ensuring that only the focal length changes, keeping camera movement and framing constant may be an approach. For example, a stationary object such as a chair may be filmed from the same position using different lenses to show how perspective and depth of field change. Capturing precise, linear and non-linear camera movements along the X, Y, and Z axes may be an objective. Setting up shots where the camera performs controlled movements such as dolly in/out, boom up/down, pan, and tilt, but only change one movement parameter at a time, ensuring that the speed and direction of the movement are consistent across iterations may be an approach. For example, a dolly-in shot may be filmed at a speed of 1 foot per second, with the camera moving along the Z-axis towards a subject, repeating the shot but changing the speed or axis of movement in each iteration. Capturing the same scene at varying frame rates such as 24 fps, 30 fps, 60 fps and with different shutter angles such as 180°, 90°, 360° to teach the model how motion blur and temporal sampling affect the visual output may be an objective. Using dynamic scenes such as people walking or objects moving to capture differences in motion blur across various frame rates and shutter angles may be an approach.

In one aspect, after gathering sufficient data from single-variable iterations, introducing multi-variable scenarios, where multiple aspects such as focal length, camera movement, depth of field change together may begin. This may allow the model to learn the interdependencies between cinematic variables. Capturing shots where both the camera and objects/subjects move within the frame, creating complex parallax effects may be an objective. Filming scenes where the camera moves along a dolly or crane while a subject moves through the frame such as walking toward the camera, varying the focal length and camera position to teach the model how parallax changes based on lens choice and movement may be an approach. Capturing shots that conform to cinematic framing standards such as close-up, medium close-up, over-the-shoulder, wide shot, establishing master may be an objective. Using the same scene setup and vary only the camera distance and framing to create shots that match these cinematic terms, using metadata to label each shot according to the appropriate framing type may be an approach. For example, filming a subject's face from a short distance with a narrow focal length such as 85 mm and labeling the shot as a close-up, filming a wide-angle shot such as 18 mm that captures the entire environment, labeling it as an establishing master may be examples.

In one aspect, to provide the necessary technical data for training the model, ensuring that all video captures include metadata for each frame such as camera position (X, Y, Z), focal length and lens information, depth information may be necessary. Using LiDAR to capture depth data for each frame, recording how far each object is from the camera may be included. This metadata may be attached to each video frame, allowing the model to learn the relationship between camera position, lens choice, and resulting visual effects like parallax, depth of field, and framing.

In one aspect, once the dataset is captured with the necessary cinematic variables and metadata, the next step may be to organize the data in a structured manner that enables efficient use for training the model. Proper data organization may ensure that the model can accurately learn from the visual footage, metadata, and accompanying labels, allowing it to generalize well and generate high-quality, cinema-standard video. For captioner model(s) to work at its optimal level, the filmmaker dataset may be structured in a hierarchical format, organizing the video footage according to scene type, shot type, and the specific cinematic variables captured. This structure may allow for more targeted training, ensuring the captioner model(s) can learn how different variables like focal length and camera movement affect different types of shots. Organizing the data by scene and cinematic variables may involve creating a folder structure such as:

```
Dataset/
├        Interior_Kitchen/
│        ├        Close_Up/
│        │        ├ 35mm/
│        │        ├ 50mm/
│        │        ├ Wide_Shot/
│        │        ├ 35mm/
│        │        ├ 50mm/
│        Exterior_Street/
│        ├        Establishing_Shot/
│        │        ├ 24_fps/
│        │        ├ 60_fps/
│        │        ├ Medium_Shot/
│        │        ├ Dolly_In/
│        │        ├ Pan_Left/
```

Each video file or sequence may now be accompanied by detailed metadata files. The metadata may be in a machine-readable format such as JSON or CSV and attached to each video frame. This metadata includes camera position (X, Y, Z), the exact coordinates of the camera for every frame, focal length (in mm), the focal length used for the shot, camera movement, the vector describing the movement (if any) of the camera along the X, Y, or Z axes, frame rate and shutter angle, the frame rate and shutter angle at which the footage was shot, framing type, a label describing the cinematic language of the shot such as "close-up," "wide shot". An example of metadata in JSON format may be

```
{
    "frame_0001": {
        "camera_position": {"x": 0.0, "y": 1.5, "z": 3.0},
        "focal_length": 50,
        "camera_movement": {"x": 0.0, "y": 0.0, "z": -0.02},
        "frame_rate": 24,
        "shutter_angle": 180,
        "shot_type": "medium close-up"
    },
    "frame_0002": {
        "camera_position": {"x": 0.0, "y": 1.5, "z": 2.98},
        "focal_length": 50,
        "camera_movement": {"x": 0.0, "y": 0.0, "z": -0.02},
        "frame_rate": 24,
        "shutter_angle": 180,
        "shot_type": "medium close-up"
    }
}
```

In one aspect, once the data is labeled and structured, creating an indexing system for fast retrieval during training may be critical. This may allow the model to quickly access specific types of shots or frames based on the cinematic variables, which may be essential for efficient batch processing during training. Indexing the dataset by key metadata parameters such as focal length, camera movement, shot type to allow quick retrieval of subsets of the data during training may be an objective. An example of indexing parameters may involve querying data based on specific focal lengths such as retrieve all shots filmed with a 35 mm lens, retrieving only specific framing types such as "over-the-shoulder" shots, querying shots where the camera follows a dolly path or crane motion. A database indexing example in SQL may be CREATE INDEX idx_focal_length ON video_metadata (focal_length);
CREATE INDEX idx_shot_type ON video_metadata (shot_type).

In one aspect, to ensure that the model generalizes across various conditions, data augmentation may be applied to certain elements of the dataset. For instance, modifying brightness and contrast for certain scenes to simulate different lighting conditions, adding controlled noise or simulate motion blur to represent challenging shooting environments such as handheld shaky camera shots may be considered. As the dataset evolved, especially as additional shots are added and the labeling improves over time, maintaining version control over the dataset may be crucial. Each iteration of the dataset may be clearly versioned, with detailed changelogs explaining what has been added or modified. An example may involve Dataset_v1: Initial dataset with single-variable iterations, Dataset_v2: Expanded dataset with multi-variable scenarios, Dataset_v3: Added complex lighting setups and new framing variations.

In one aspect, after the dataset is organized, the next step may be to validate the data to ensure it meets the requirements for training the video model. The goal may be to ensure that the dataset captures all relevant parameters with high precision and consistency across all iterations. Randomly selecting video sequences and their corresponding metadata files to manually review the accuracy of the labels, verifying that the focal length, camera movement, and framing descriptions match the visual content of the video may be part of manual spot-checking. Implementing automated scripts to run consistency checks on the dataset, verifying that metadata values such as camera movement, focal length are within expected ranges and align with the visual data may be part of automated consistency checks. For example, ensuring that parallax effects match the metadata describing object positions and relative movement, checking that shutter angles correctly match the amount of motion blur in dynamic scenes may be included. Reviewing the dataset for completeness, ensuring that all cinematic shot types such as close-up, medium shot, establishing shot and all focal lengths, camera movements, and lighting conditions are covered adequately may be part of dataset completeness review.

Exemplary Optimization of Data Labeling and Annotation for Captioner AI Model

In one aspect, the optimization of step two for the captioner model(s) may reflect the narrow focus of the dataset captured on the soundstage, where precision in labeling focal length, camera movement, shot types, occlusion, and parallax may be paramount. This detailed process may ensure that the captioner model(s) can learn to encode the cinematic technical parameters necessary for professional filmmaking. The objective of step two may include providing detailed, consistent, and precise metadata for each video frame and shot. It may also ensure that the captioner model(s) can learn from this metadata and accurately predict it in future, unseen videos. Furthermore, it may emphasize the core variables essential for filmmaking, such as focal length, camera movement, and cinematic shot type.

This process may be unique because traditional captioner model training may focus on broad scene descriptions, object identification, and generalized camera data. However, this process may focus exclusively on technical cinematic parameters that are critical to professional video production, such as focal length and camera movement vectors. It may aim to build a model that can generate film-specific metadata for controlled and highly repeatable video shots. The process may incorporate precise metadata annotation for each frame, creating a rich dataset that emphasizes the relationships between the camera, subject, and movement in a cinematic context.

Before beginning the labeling process, it may be ensured that the video data collected on the soundstage is properly organized. Each shot may be captured with the exact parameters in mind, and the data may be structured to make the labeling process efficient. The organization may involve each folder representing a specific shot or scene, organized by focal length, camera movement, and shot type. Subfolders may indicate specific variables being adjusted, such as "Dolly_in_50 mm_CloseUp". Video files may follow a strict naming convention that reflects the parameters used in the shot, such as Scene1_CloseUp_50 mm_DollyIn.mp4 or
Scene2_WideShot_85 mm_PanLeft.mp4.

This may help ensure clarity during the annotation process and provide an easy way to track specific shots and their corresponding metadata.

The process for automated and manual metadata extraction for labeling may combine both automated tools for extracting technical metadata and manual annotation for labeling cinematic shot types to ensure accuracy. For automated metadata extraction, camera settings may be used to automatically extract the focal length for each shot. This data may be recorded during filming and can be automatically extracted from the metadata embedded in the camera files. For example, the focal length, such as 50 mm or 85 mm, for each shot may be extracted and stored in a JSON file as part of the metadata.

```
{
    "frame_0001": {
        "focal_length": 50,
        "camera_position": {"x": 0.0, "y": 1.5, "z": -2.5},
        "camera_movement": {"x": 0.0, "y": 0.0, "z": 0.05},
        "shot_type": "close-up"
    },
    "frame_00002": {
        "focal_length": 50,
        "camera_position": {"x": 0.0, "y": 1.5, "z": -2.45},
        "camera_movement": {"x": 0. 0, "y": 0.0, "z": 0.05},
        "shot_type": "close-up"
    }
}
```

The motion control system or LiDAR/laser locator systems may be used to track the exact movement of the camera along the X, Y, and Z axes. This data may be recorded for each frame and included as part of the metadata. For example, a dolly-in movement on the Z-axis toward the subject may be tracked and the speed and distance covered may be recorded.

```
{
    "frame_00001": {
        "movement_vector": {"x": 0.0, "y": 0.0, "z": 0.05}
    }
}
```

For manual annotation for cinematic shot types, while technical metadata can be extracted automatically, shot types, such as close-up or over-the-shoulder, may require manual annotation by a human expert. Labelers may manually review the footage and assign appropriate shot type labels based on standard filmmaking conventions. Tools such as DaVinci Resolve or dedicated annotation software may be used to manually annotate the shot type for each sequence. The software may allow annotators to navigate through the footage frame by frame and assign labels to each shot.

```
{
    "frame_00001": {
        "focal_length": 50,
        "camera_position": {"x": 0.0, "y": 1.5, "z": -2.5},
        "camera_movement": {"x": 0.0, "y": 0.0, "z": 0.05},
        "shot_type": "close-up"
    },
    "frame_00002": {
        "focal_length": 50,
        "camera_position": {"x": 0.0, "y": 1.5, "z": -2.45},
        "camera_movement": {"x": 0.0, "y": 0.0, "z": 0.05},
        "shot_type": "close-up"
    }
}
```

For labeling spatial relationships, such as occlusion and parallax, for each shot where occlusion and parallax effects are present, it may be ensured that the spatial relationships between objects and the camera are properly labeled. For occlusion annotation, frames where foreground objects occlude background objects may be labeled. Occlusion metadata

```
{
    "frame_00030": {
        "foreground_object": "shoulder",
        "background_object": "character",
        "occlusion_type": "partial"
    }
}
```

Annotators may review frames and manually mark which objects in the foreground block or partially block objects in the background. For parallax effects, for shots with significant parallax, where objects at different distances move relative to each other as the camera moves, the relative depth of objects in the scene may be labeled. Objects may be labeled with depth markers to indicate their relative positions from the camera. Example parallax metadata:

```
{
    "frame_00030": {
        "foreground_object": {"position": "3m"},
        "background_object": {"position": "10m"}
    }
}
```

After the automated and manual labeling process, it may be essential to verify the consistency and accuracy of the metadata annotations. This may be particularly important given the focus on precision in cinematic parameters. The focal length and depth of field may be cross-checked to verify that they match the expected results for each shot. Camera movement vectors may be reviewed to ensure that they match the expected motion for each shot. This can be done by cross-referencing the movement data with the motion control rig's logs or the LiDAR data collected during filming. The manual shot type annotations may be reviewed to ensure that they match the framing conventions used in filmmaking.

After labeling and verifying the metadata, the next step may be to store it in a structured format that can be easily retrieved for training the captioner model(s). All the metadata may be stored in JSON or CSV format, ensuring that it is indexed by frame number. Each metadata file may include focal length (in mm), camera movement (X, Y, Z vectors), shot type (close-up, wide shot, etc.), and occlusion and parallax data (if applicable). An indexing system for fast retrieval of data during training may be created. This index may allow for querying shots based on focal length, camera movement type, or shot type. For example, a query for "50 mm dolly-in close-up" may quickly retrieve all shots with those parameters, facilitating efficient model training.

```
{
    "frame_00001": {
        "movement_vector": {"x": 0.0, "y": 0.0, "z": 0.05}
    }
}
```

Exemplary Optimization of Data Splitting for Training, Validation and Testing

In the process of optimizing dataset splitting for the captioner model, a highly controlled dataset captured on a soundstage is meticulously divided to facilitate the model's learning and generalization across core cinematic parameters such as focal length, camera movement, and shot types. This step is crucial to prevent overfitting and to ensure the model's ability to apply learned parameters to new, unseen videos. The dataset is split into training, validation, and testing sets, with a keen focus on balancing technical parameters and subject variety across these subsets.

The objective of this step is multifaceted: it aims to divide the dataset in a manner that enables the captioner model to grasp and generalize the technical cinematic parameters effectively. It seeks to distribute focal lengths, camera movements, and shot types evenly across the training, validation, and testing sets. Additionally, it aims to avert overfitting by ensuring a diverse representation of subjects, camera setups, and movements within each subset of the dataset.

This dataset splitting process stands out because it diverges from traditional methods that often rely on random or scene-based splits. Instead, it meticulously balances the dataset based on a narrow array of technical cinematic variables, ensuring each subset of the dataset provides a comprehensive representation of these core parameters. This approach also emphasizes the inclusion of a variety of human subjects in each split to prevent the model from overfitting to specific individuals.

To achieve a balanced and structured dataset split, the video sequences are first organized according to key cinematic parameters as outlined above. This involves structuring the dataset based on focal length, shot type, and camera movement, with each video sequence clearly labeled with these variables. For example, the dataset might be organized into folders and subfolders that represent specific shots or scenes, such as

```
Dataset/
    ├── Scene1/
    │       ├── CloseUp_50mm_DollyIn/
    │       ├── CloseUp_85mm_PanLeft/
    │       ├── WideShot_35mm_Static/
    │   Scene2/
    │       ├── TwoShot_50mm_BoomUp/
    │       ├── EstablishingShot_24mm_PanRight/
    │       └── OverTheShoulder_85mm_Static/
```

The balancing of technical cinematic parameters across the splits is meticulously planned. For instance, to balance focal lengths, the strategy might involve dividing the range of focal lengths (e.g., 27 mm to 185 mm) evenly across the training, validation, and test sets. This ensures that the model is exposed to all focal lengths during training but still encounters new focal lengths to generalize in the validation and test sets. Similarly, shot types and camera movements are distributed evenly across the sets. For example, the training set might include close-ups at 50 mm and 85 mm, while the validation set includes close-ups at 65 mm, ensuring a variety of shot types across focal lengths.

Given the controlled environment of the soundstage, the main source of variety comes from the human subjects. To prevent overfitting to specific people or body types, the dataset ensures a diverse set of actors across the training, validation, and test sets. This might involve splitting by actors, ensuring that no single actor is predominantly featured in any set, and introducing new combinations of actors in different pairings than those seen in the training set for the validation and test sets.

The dataset split employs a stratified sampling approach, ensuring a balanced distribution of focal lengths, camera movements, shot types, and subjects across all splits. This stratification is based on both technical parameters and subject variety, making this approach unique. It focuses on ensuring that the model is exposed to the full range of technical cinematic parameters during training and validation, preparing it for generalization.

Finally, the test set is designed to contain a balanced mix of unseen combinations of focal length, shot types, camera movements, and actors, while the individual components should be familiar to the model from training. This ensures that the model is tested on its ability to generalize from known parameters to new contexts, evaluating its capacity to apply the technical cinematic knowledge it has learned to new scenarios. This detailed approach to dataset splitting is tailored specifically for the professional filmmaking context, aiming to equip the model with the ability to learn and predict technical parameters with precision and to generalize to unseen combinations of variables in a controlled and balanced manner.

Exemplary Optimizing of Preprocessing Pipeline

The preprocessing pipeline may be further optimized to handle the highly controlled and specific dataset captured on a soundstage, focusing on narrow cinematic parameters such as focal length, camera movement, shot types, parallax, and occlusion. The primary goal of preprocessing is to structure the data in a manner that facilitates the model's learning of how these variables interact and to accurately predict them when labeling future video data. The objectives of this step include preprocessing the video data and metadata to enable the captioner model to efficiently learn technical cinematic parameters, enriching each frame with high-quality metadata such as focal length, camera movement vectors, and spatial relationships, and preparing data in a structured and optimized format for fast and efficient model training.

This preprocessing pipeline is distinct because it concentrates on cinematic technical parameters, ensuring the model learns to predict focal length, camera movements, and shot composition with precision, diverging from traditional pipelines that focus on extracting semantic features.

During frame extraction and preparation, frames are extracted from raw video files at a specific frame rate, such as 24 fps, using tools like Python's OpenCV library, to maintain temporal relationships and cinematic pacing. Temporal sequencing is preserved by maintaining sequential indexing of frames, allowing the model to track camera movement and object motion over time. Example:

```
import cv2
def extract_frames(video_path, output_dir, frame_rate=24):
    cap=cv2.VideoCapture(video_path)
    frame_id=0
    while True:
        ret, frame=cap.read( )
        if not ret:
            break
        if frame_id % frame_rate==0: # Save frame every 1/24th of a second
            cv2.imwrite(f"{output_dir}/frame_{frame_id}.jpg", frame)
        frame_id+=1
    cap.release( )
```

Focal length and camera movement metadata are associated with each frame, enriching them with data extracted from the camera's EXIF data or manually annotated during the shot.

```
{
  "frame_0001": {
    "focal_length": 50
  },
  "frame_0002": {
    "focal_length": 50
  }
}
```

For example, if a frame was shot using a 50 mm lens, the focal length data is stored as part of the frame's metadata in a machine-readable format. Similarly, camera movement vectors (X, Y, Z) for each frame are recorded, capturing precise information on how the camera moved during the shot.

Example

```
{
  "frame_0001": {
    "camera_movement": {"x": 0.0, "y": 0.0, "z": 0.02}
  },
  "frame_0002": {
    "camera_movement": {"x": 0.0, "y": 0.0, "z": 0.02}
  }
}
```

Occlusion and parallax detection and labeling involve using computer vision techniques or manual annotations to mark occluding objects in each frame and calculate the relative movement of foreground and background objects based on the camera's movement and depth data. This is essential for training the model to understand depth and how occlusion and parallax affect the visual composition of a scene.

Example

If an actor's arm occludes part of the background in an over-the-shoulder shot, label this frame as follows:

```
{
  "frame_0005": {
    "occlusion": {
      "foreground_object": "arm",
      "background_object": "building",
      "occlusion_type": "partial"
    }
  }
}
```

Example

In a scene where a foreground tree moves more quickly than a distant building due to a dolly-in movement, label the frame as follows:

```
{
  "frame_0008": {
    "parallax": {
      "foreground_object": {"name": "tree", "depth": 5.0},
      "background_object": {"name": "building", "depth": 20.0}
    }
  }
}
```

Shot type and cinematic framing annotation ensure that each frame is labeled with the correct cinematic shot type and narrative function, using manual annotation to label the shot type for each sequence. This informs the model of the visual structure of different framing types and their narrative functions.

Example

A close-up shot would be labeled as:

```
{
  "frame_0010": {
    "shot_type": "close-up"
  }
}
```
Example:
o A frame labeled as an "establishing shot" would be annotated as:
```
{
  "frame_0020": {
    "cinematic_framing": "establishing shot"
  }
}
```

Data augmentation for depth, focus, and motion blur includes simulating varied depth of field and focus settings and enhancing motion blur effects based on shutter angle and camera movement. This step systematically introduces controlled motion blur effects, helping the captioner model understand and predict how motion blur varies depending on cinematic settings. Example Code for Applying Motion Blur:

```
import cv2
import numpy as np
def    apply_motion_blur(image,    blur_strength,
    direction='horizontal'):
    # Define kernel size based on blur strength
    if direction=='horizontal':
       kernel_size=(blur_strength, 1)
    else:
       kernel_size=(1, blur_strength)
    # Create the motion blur kernel
    kernel=np.zeros(kernel_size)
    kernel[int((kernel_size[0]-1)/2),    :]=np.ones(blur_
       strength)
    kernel=kernel/blur strength
    # Apply the kernel to the image
    blurred_image=cv2.filter2D(image, -1, kernel)
    return blurred_image
# Example usage
image=cv2.imread('frame_0010.jpg')
blurred_image=apply_motion_blur(image,      blur_
    strength=15, direction='horizontal')
cv2.imwrite('frame_0010_blurred.jpg', blurred_image)
```

For a sequence where an actor runs across the frame during a pan shot, apply motion blur along the horizontal axis to simulate the natural blur that would occur due to the actor's movement speed combined with the panning motion.
Metadata:
 Annotate the frames with the blur effect strength and direction to help the captioner model learn how to recognize and predict motion blur in the context of cinematic scenes:

```
{
   "frame_0010": {
     "motion_blur": {
       "blur_strength": 15,
       "blur_direction": "horizontal",
       "shutter_angle": 180
     }
   }
}
```

To train the model on different shutter angles, simulate blur for frames with various shutter angles (e.g., 90°, 180°, 360°). This will expose the model to a variety of motion blur effects and help it understand how different cinematic settings affect image quality. Example: For a 360° shutter angle, apply heavier motion blur across the entire image, as this simulates the effect of a longer exposure time for each frame, leading to more pronounced blurring of moving objects or camera movement.
360° Shutter Angle Metadata:

```
{
   "frame_0012": {
     "motion_blur": {
       "blur_strength": 25,
       "blur_direction": "horizontal",
       "shutter_angle": 360
     }
   }
}
```

Finally, metadata storage and indexing involve storing the augmented frames alongside the original frames, with both versions indexed and organized by scene, shot type, focal length, and camera movement. Metadata associated with each frame, including motion blur parameters, is indexed for fast retrieval during model training. This detailed organization of metadata allows the model to learn from complex interactions between technical parameters, ensuring it can accurately label and generate cinematic metadata.
Example Folder Structure:

```
Dataset/
|—     Scene 1/
|        |—     Original_Frames/
|        |        |—     frame_0010.jpg
|        |        |—     frame_0011.jpg
|        |_     Augmented_Frames /
|                 |—     frame_0010_blurred.jpg
|                 |—     frame_0011_blurred.jpg
```

Metadata File Example:
```
{
   "frame_0010": {
     "focal_length": 50,
     "camera_movement": {"x": 0.0, "y": 0.0, "z": 0.02},
     "motion_blur": {
       "blur_strength": 15,
       "blur_direction": "horizontal",
       "shutter_angle": 180
     },
     "shot_type": "close-up"
   }
}
```

Exemplary End-to-End Training for SamildAnach: Combining Data and Model Refinement Optimizing End-to-End Training for the captioner model(s) involves the comprehensive integration of preprocessed data, including highly detailed cinematic metadata, into the model training process. This step is crucial to ensure that the model is adept at accurately predicting and encoding metadata according to specific cinematic parameters captured on the soundstage, such as focal length, camera movement, occlusion, parallax, and motion blur. The training process for the captioner model(s) is meticulously structured to prioritize precision in technical cinematic features over broader scene understanding.

This optimization integrates various types of cinematic metadata (focal length, camera movement, shot type, motion blur) into a multi-task learning architecture. This allows the model to learn and predict these parameters simultaneously with high precision. The training process emphasizes the interaction between these variables, ensuring that the model comprehends the technical aspects of cinematography comprehensively.

The objective of this step may include training the captioner model(s) to predict and encode highly detailed metadata for a variety of cinematic elements, including lens choices, camera movement, depth of field, motion blur, and shot composition. It may also involve iteratively refining the model using continuous feedback from the validation set to ensure it generalizes well to new combinations of cinematic parameters. Furthermore, it may employ multi-task learning, allowing the model to learn and predict multiple aspects of a cinematic shot (focal length, camera movement, and shot type) in a coherent and integrated manner.

The model architecture setup for multi-task learning involves ensuring that the input to the model includes the preprocessed video frames along with frame-level metadata such as focal length, camera movement vectors, and motion blur information. The input representation is tailored to include focal length and camera movement vectors, which are not found in conventional models. The architecture may use a convolutional neural network (CNN) for visual feature extraction, followed by temporal processing using an LSTM (Long Short-Term Memory) network to capture the dynamic aspects of camera movement and motion blur.

Custom loss functions for each task are defined to guide the model's learning process, with each task having its own loss function. The overall loss may be a weighted sum of these individual losses. For example, for focal length prediction, a mean squared error (MSE) loss function may be used to minimize the difference between the predicted and true focal lengths. A combined loss function may be defined that weights the importance of each task, ensuring that all tasks are optimized during training.

```
def focal_length_joss(y_true, y_pred):
    return  tf.reduce_mean(tf.square(y_true-y_pred))  # MSE for continuous focal length
def camera_movement_loss(y_true, y_pred):
    return  tf.reduce_mean(tf.square(y_true-y_pred))  # MSE for movement vectors
def shot_type_joss(y_true, y_pred):
    return  tf.keras.losses.CategoricalCrossentropy( )(y_true, y_pred)
def motion_blur_loss(y_true, y_pred):
    return  tf.reduce_mean(tf.square(y_true-y_pred))  # MSE for blur parameters
def combined_loss(focal_ength_loss, camera_movement_ loss, shot_type_loss, motion_blur_loss, alpha=1.0, beta=1.0, gamma=1.0, delta=1.0):
    return                        alpha*focal_length_loss+ beta*camera_movement_loss+ gamma*shot_type_loss+delta*motion_blur_loss
```

Training the model on temporal sequences ensures it learns the dynamic relationships between camera movement, focal length changes, and parallax effects. Sequential batches of frames may be used during training, allowing the model to capture the temporal context of camera movements and changes in shot composition.

Validation on unseen cinematic combinations tests the model's ability to generalize to new combinations of cinematic variables that were not seen during training. The validation process focuses on testing the model's ability to generalize across cinematic parameters.

Continuous refinement using feedback loops involves analyzing the model's errors and retraining on difficult sequences where predictions were incorrect. This active learning loop focuses specifically on technical cinematic errors, ensuring that the model achieves the highest possible level of precision in predicting professional filmmaking parameters.

Exemplary Optimized Input Representation for Captioner AI Model(s)

In one aspect, the method may include the design and structuring of inputs for the captioner model(s) to accommodate specific cinematic metadata and visual data collected during a controlled soundstage process. The inputs may include detailed frame-level data, such as focal length, camera movement vectors, occlusion, parallax, and motion blur, and may ensure that the model can learn from these features in an integrated manner. The input representation may be essential because it dictates how the model perceives and learns from the data, allowing it to accurately predict technical parameters during training. This detailed input representation may enable the captioner model(s) to learn and predict complex cinematic features with a high degree of precision, making it an invaluable tool for generating metadata for professional video production. The version of Input Representation for the Model optimized for captioner model(s) ensures that it receives both visual data and cinematic metadata in a structured format. The model may be fed rich metadata about focal length, camera movement, shot type, and motion blur, enabling it to learn the relationships between these technical cinematic parameters.

An objective may include creating an input pipeline that represents the full range of cinematic technical parameters needed for the model to learn and predict metadata accurately. It may also ensure that both visual data (video frames) and cinematic metadata (focal length, camera movement, shot type, etc.) are seamlessly integrated into the input format. Additionally, it may emphasize temporal consistency, allowing the model to learn how changes in camera movement and focal length affect the visual output over time. What's unique about this process may include that in conventional model training, inputs focus primarily on visual features (like objects or scenes) or scene-level descriptions. In contrast, captioner model(s) integrate cinematic metadata into the input, making it unique by focusing on technical parameters essential for professional filmmaking, such as lens distortion, parallax, and shot framing. The input representation includes temporal data to capture the dynamics of camera movements, a component often missing in traditional image captioning models.

The method may perform Visual Frame Representation, wherein the primary input to the model may be the sequence of raw video frames, extracted from the original video files. These frames are essential for learning the visual structure of each shot, such as lighting, contrast, and subject positioning. The process may involve extracting video frames at a consistent frame rate (e.g., 24 fps) to ensure that the temporal relationships between frames are maintained and normalizing the pixel values to a range that the model can process (e.g., scaling from 0 to 1 for grayscale or 0 to 255 for RGB values). To represent each shot as a temporal sequence of frames, ensuring the model captures the relationship between camera movement and object shifts over time, for each video sequence, frames may be grouped into time-based sequences (e.g., sequences of 10 frames, with overlap if necessary) to feed into the model. These sequences should represent the continuous movement of the camera and any changes in the subject's position or the scene's composition.

```
import cv2
import numpy as np
def preprocess_frame (frame_path):
    frame=cv2.imread(frame_path)
    frame=cv2.resize(frame, (224, 224)) # Resize frame to standard size
    frame=frame.astype('float32')/255.0 # Normalize pixel values return frame
```

The method my include Focal Length Encoding, wherein the focal length of the lens used in each shot may be encoded as a continuous input feature. This allows the model to understand how changes in focal length affect the depth of field, perspective, and visual compression of the scene. For each frame, the focal length may be included as part of the input vector, represented as a continuous numeric value (e.g., 50 mm, 85 mm) and fed into the model along with the visual data. The focal lengths may be normalized by dividing them by the maximum focal length used in the dataset to ensure the focal length is within a fixed range, helping the model learn efficiently.

```
{
  "frame_0010": {
    "visual_frame": [ ... ],   # Pixel values
    "focal_length": 50
  }
}
```

The method may include Camera Movement Vectors, wherein camera movement may be represented as a vector (X, Y, Z) that describes how the camera moves through space. This helps the model understand how the movement affects the framing, parallax, and occlusion of the scene. For each frame, a movement vector that describes the camera's displacement along the X, Y, and Z axes may be included. If the camera is static, the movement vector should be [0, 0, 0]. For movements like a dolly in (moving closer to the subject), the Z-axis value would increase over time. Ensuring that the camera movement vectors are consistent across time may allow the model to track movement over multiple frames and predict its effects on the visual output. Movement history for sequences of frames may be included, ensuring that the model learns from the cumulative effect of movement.

```
{
  "frame_0010": {
    "visual_frame": [ ... ],
    "focal_length": 50,
    "camera_movement": {"x": 0.0, "y": 0.0, "z": 0.05}
  }
}
```

The method may include Shot Type and Cinematic Framing Encoding, wherein the shot type (e.g., close-up, wide shot, over-the-shoulder) may be encoded as a categorical variable, allowing the model to understand the narrative and technical purpose of the shot. For each frame or sequence of frames, a label indicating the shot type may be included. This helps the model associate visual patterns with specific shot types and predict how they affect the framing and composition. Representing the shot type as an embedding may allow the model to learn a more nuanced representation of shot types, beyond a simple label. Shot types may be converted into embedding vectors, where each shot type (e.g., close-up, wide shot) is mapped to a continuous space. This helps the model learn relationships between shot types and their visual characteristics.

```
{
  "frame_0010": {
    "visual_frame": [ ... ],
    "focal_length": 50,
    "camera_movement": {"x": 0.0, "y": 0.0, "z": 0.05},
    "shot_type": "close-up"
  }
}
```

The method may include Motion Blur and Shutter Angle Encoding, wherein motion blur may be represented as a continuous feature based on the frame's shutter angle and the speed of camera movement. For each frame, the motion blur strength based on the camera's speed and shutter angle may be calculated and included as part of the input. The blur direction (horizontal or vertical) should also be encoded based on the camera's movement direction. The motion blur strength may be encoded based on the speed of the camera movement and the shutter angle. The blur direction may be represented based on the camera's movement axis. The motion blur may be represented as a strength value between 0 and 1, where higher values represent more significant blur. The blur direction may be encoded as well, indicating that the blur is along the Z-axis (due to the dolly-in movement). Normalizing the shutter angle values for consistency across different settings may involve normalizing the shutter angle by dividing the value by the maximum possible shutter angle (e.g., 360°). This ensures that the shutter angle is represented as a continuous value between 0 and 1.

```
{
  "frame_0010": {
    "visual_frame": [ ... ],   # Pixel values of the frame
    "focal_length": 50,        # Focal length in mm
    "camera_movement": {"x": 0.0, "y": 0.0, "z": 0.05},   # Camera movement along Z-axis
    "shot_type": "close-up",   # Cinematic shot type
    "motion_blur": {
      "blur_strength": 0.6,    # Motion blur strength (based on speed and shutter angle)
      "blur_direction": "z-axis",   # Blur is aligned with the camera's Z-axis movement
      "shutter_angle": 180     # Shutter angle setting
    }
  }
}
```

The method may include Structured Input for the captioner model(s), wherein now that all the necessary inputs-visual frames, focal length, camera movement, shot type, and motion blur—have been gathered, these inputs may need to be formatted into a structured form that the model can process. Grouping the inputs into mini-batches for training the captioner model(s) may involve preparing mini-batches where each input contains the visual frame as the raw image, the focal length as a continuous value, the camera movement vectors (X, Y, Z) for each frame, the shot type as a categorical variable or embedding, and the motion blur parameters (strength and direction). Feeding the model sequences of frames (rather than single frames) may help it learn the temporal dynamics of camera movement and how those movements affect parallax and motion blur. Grouping consecutive frames into sequences (e.g., sequences of 5-10 frames) to represent the temporal relationships between frames may be done. Each sequence should contain the full set of metadata (focal length, camera movement, shot type, motion blur).

Example Batch :
```
[
  {
    "visual_frame": [ ... ],
    "focal_length": 50,
    "camera_movement": {"x": 0.0, "y": 0.0, "z": 0.05},
    "shot_type": "close-up",
    "motion_blur": {
      "blur_strength": 0.6,
      "blur_direction": "z-axis",
      "shutter_angle": 180
    }
  },
  {
    "visual_frame": [ ... ],
    "focal_length": 85,
    "camera_movement": {"x": 0.01, "y": 0.0, "z": 0.04},
    "shot_type": "wide shot",
    "motion_blur": {
      "blur_strength": 0.4,
      "blur_direction": "x-axis",
```

```
        "shutter_angle": 90
    }
  }
]
[
  {"frame_0001": { ... }},
  {"frame_0002": { ... }},
  {"frame_0003": { ... }},
  {"frame_0004": { ... }},
  {"frame_0005": { ... }}
]
``` ccKey differentiators may include treating focal length and camera movement vectors as primary inputs, which is not common in traditional captioner models that focus on object recognition or scene descriptions. Temporal sequences of frames ensure the captioner model(s) learn the dynamics of camera movement and the effects of parallax and motion blur over time, enhancing its ability to predict how cinematic techniques affect the visual output. The representation of motion blur and shutter angle as continuous values allows the captioner model(s) to capture subtle differences in motion rendering, making it particularly suited for professional filmmaking applications.

Exemplary Optimized Training Process

In one aspect, the training process for the captioner model(s) may focus on integrating highly controlled and detailed metadata, such as focal length, camera movement, shot types, and motion blur, which has been captured, preprocessed, and structured into input representations. This process may ensure that the model(s) learn to accurately predict technical metadata for professional filmmaking through a comprehensive, multi-task learning process. The optimized version of this training step may ensure that the model(s) learn to predict multiple cinematic parameters with high accuracy and consistency, incorporating elements such as multi-task learning, temporal consistency, and validation on unseen combinations to ensure the model(s) generalize well to new cinematic setups. The goal may be to train the model(s) not only to understand how individual variables affect the video output but also to capture the complex interdependencies between these parameters, allowing the model(s) to generalize effectively across cinematic patterns.

The objective of this training step may include training the captioner model(s) to predict technical cinematic metadata, such as focal length, camera movement, shot type, and motion blur, with a high degree of accuracy. Additionally, it may aim to ensure that the model(s) learn from temporal data, capturing dynamic changes across video sequences, rather than relying on static images. Implementing a multi-task learning approach where the model(s) simultaneously learn and optimize for multiple outputs at once may also be a part of the objective.

What may be unique about this process is the emphasis on technical cinematic metadata, which is specific to professional filmmaking, unlike traditional captioner models that often focus on high-level scene descriptions or object detection. The use of temporal data allows the model(s) to learn the dynamics of camera movement, parallax, and occlusion, which are essential in generating accurate metadata for video production. The captioner model(s) may be trained using a multi-task learning architecture, where they predict multiple cinematic parameters simultaneously, rather than focusing on a single task like scene labeling. Objective: Train the model to simultaneously predict multiple types of metadata (e.g., focal length, camera movement vectors, shot type, motion blur). This may include training a model architecture designed to handle multi-task learning.

Process:
a. The model should have separate output heads for each task:
   i. Head 1: Predicts focal length as a continuous value.
   ii. Head 2: Predicts camera movement vectors as continuous values (X, Y, Z axes).
   iii. Head 3: Classifies the shot type (e.g., close-up, wide shot, over-the-shoulder).
   iv. Head 4: Predicts motion blur strength and direction as continuous values.

Example b. The model's architecture might look like this, with shared layers for visual feature extraction and separate heads for each type of prediction:

```
def build_model( ):
    inputs=tf.keras.Input(shape=(sequence_length, 224, 224, 3)) # Video frame sequence
    # Shared layers
    x=tf.keras.layers.Conv3D(64, (3, 3, 3), activation='relu') (inputs)
    x=tf.keras.layers.MaxPooling3D((2, 2, 2)) (x)
    x=tf.keras.layers.Flatten( ) (x)
    shared_features=tf.keras.layers.Dense(256, activation='relu') (x)
    # Head 1: Focal length prediction
    focal_length_output=tf.keras.layers.Dense(1, name='focal_length') (shared_features)
    # Head 2: Camera movement prediction (X, Y, Z)
    camera_movement_output=tf.keras.layers.Dense(3, name='camera_movement') (shared_features)
    # Head 3: Shot type classification
    shot_type_output=tf.keras.layers.Dense(num_shot_types, activation='softmax', name='shot_type') (shared_features)
    # Head 4: Motion blur prediction
    motion_blur_output=tf.keras.layers.Dense(2, name='motion_blur') (shared_features)
    # Compile model
    model=tf.keras.Model(inputs=inputs, outputs=[focal_length_output, camera_movement_output, shot_type_output, motion_blur_output])
    return model
```

The training setup and configuration may involve initializing a data pipeline to feed the model(s) batches of preprocessed video sequences, along with their associated metadata. The use of a generator function to load sequences of consecutive frames, with their focal length, camera movement vectors, and shot type included for each frame, may ensure that batches are loaded efficiently to minimize training time. Choosing an optimizer that balances the learning of multiple tasks and tuning the learning rate for smooth convergence may also be part of the process.

```
def data_generator(batch_size, data):
    while True:
        batch=[ ]
        for_in range(batch_size):
            sequence=load_sequence(data)
            batch.append(sequence)
        yield batch
optimizer=tf.keras.optimizers.Adam(learning_rate=0.001)
```

Implementing multi-task learning may require the model(s) to have separate output heads for each task, such as predicting focal length as a continuous value, predicting camera movement vectors, classifying the shot type, and predicting motion blur strength and direction. A combined and weighted loss function that balances the learning of multiple tasks may be defined to ensure that all tasks are optimized during training.

def combined_loss(focalj_ength_loss, camera_movement_loss, shot_type_loss, motion_blur_loss, alpha=1.0, beta=1.0, gamma=1.0, delta=1.0):
        return (alpha*focal_length_loss)+(beta*camera_movement_loss)+(gamma*shot_type_loss)+(delta*motion_blur_loss)

Training on temporal data may involve training the model(s) on sequences of frames, where focal length, camera movement, and motion blur are learned over time. Including a temporal regularization term in the loss function may penalize large differences in predictions between consecutive frames, ensuring smooth transitions that simulate real camera movement and lens changes in professional filmmaking.

Example

Input a sequence of 10 frames to the model, ensuring that the camera movement vectors are tracked across the entire sequence. The model should learn how objects move relative to the camera and how focal length affects this motion.

def build_temporal_model( ):
        inputs=tf.keras.Input(shape=(sequence_length, 224, 224, 3)) # Video frame sequence
        x=tf.keras.layers.ConvLSTM2D(64, (3, 3), activation='relu', return_sequences=True) (inputs)
        x=tf.keras.layers.MaxPooling3D((2, 2, 2)) (x)
        x=tf.keras.layers.Flatten( ) (x)
        shared_features=tf.keras.layers.Dense(256, activation='relu') (x)
        # Heads for focal length, camera movement, etc.

Validation and error analysis may continuously validate the model's predictions against unseen combinations of cinematic parameters to ensure it generalizes well to new scenarios. Identifying areas where the model's predictions are inaccurate or inconsistent and fine-tuning the model by retraining on sequences that highlight these weaknesses may also be part of the process.

Learning rate scheduling and early stopping may involve adjusting the learning rate dynamically during training to ensure efficient convergence and implementing early stopping to prevent overfitting. The focus on multi-task learning, temporal data training, and the use of temporal smoothness regularization may differentiate this approach from traditional models.

Example

Add a temporal smoothness term to the loss function that penalizes large differences between predicted values of focal length and camera movement across frames:

def temporal_smoothness_loss(predictions, previous_predictions, weight=0.1):
        smooth_loss=tf.reduce_mean(tf.abs(predictions −previous_predictions)) # Penalize large changes between frames
        return weight*smooth_loss Dynamic Learning Rate Scheduling Objective: Adjust the learning rate dynamically during training to ensure efficient convergence, particularly in the multi-task learning setup where different tasks (e.g., focal length and shot type prediction) may converge at different rates.

Process:
    Implement a learning rate scheduler that reduces the learning rate as training progresses. This prevents the model from overshooting local minima and allows fine-tuning during later stages of training.

Example

Use TensorFlow's ReduceLROnPlateau to decrease the learning rate when validation loss plateaus:

Lr_scheduLe=tf.keras.callbacks.ReduceLROnPlateau (monitor='val_loss', factor=0.5, patience=5)

Early Stopping
    Objective: Implement early stopping to prevent overfitting and ensure that the model does not continue to train once validation performance ceases to improve.

Process:
    Monitor the validation loss during training. If the validation loss stops improving after a certain number of epochs (patience threshold), stop training early to prevent overfitting.

early_stopping=tf.keras.callbacks.EarlyStopping(monitor='val_loss', patience=10, restore_best_weights=True)

In optimizing the deployment of the captioner model(s) to process and label vast video datasets with precise cinematic metadata, the objective may include deploying the trained model(s) across a large video database and generating cinematic metadata for each frame and sequence. Ensuring that the deployment is optimized for speed and scalability, allowing the model(s) to process large amounts of video data efficiently without sacrificing accuracy, and integrating post-deployment quality control mechanisms that check for labeling errors and enable continuous improvement of the model(s) may also be part of the objective. Unlike conventional systems, this process may be unique because it labels technical cinematic parameters critical to filmmaking and focuses on scalability to handle massive datasets efficiently while maintaining the temporal consistency required for video metadata.

Exemplary Optimization of Model Deployment and Labeling of a Video Database

In one aspect, the focus of optimizing the deployment of the captioner model(s) may be on scaling the trained model(s) to process and label vast video datasets with precise cinematic metadata. The model(s) may have been trained to predict multiple technical cinematic features such as focal length, camera movement, shot type, and motion blur, and now they may be deployed to handle large-scale video libraries. The optimized deployment process may be designed to ensure high efficiency and accuracy when generating metadata for millions of hours of video footage, while also integrating feedback loops to maintain quality over time.

The objective of this step may include deploying the trained captioner model(s) across a large video database and generating cinematic metadata for each frame and sequence. It may also aim to ensure that the deployment is optimized for speed and scalability, allowing the model(s) to process large amounts of video data efficiently without sacrificing accuracy. Additionally, integrating post-deployment quality control mechanisms that check for labeling errors and enable continuous improvement of the model(s) may be part of the objective.

What may be unique about this process is the emphasis on labeling technical cinematic parameters critical to filmmaking, unlike conventional systems that might focus on high-level scene descriptions or object detection. The model(s) may need to encode information about lens optics, camera dynamics, and framing conventions that are specific to professional film production. The focus on scalability means that the deployment process must handle massive datasets efficiently while maintaining the temporal consistency required for video metadata.

The efficient batch processing for large datasets may involve developing a batch inference pipeline that loads and processes batches of video frames, rather than processing one frame at a time. This may reduce memory usage and increase inference speed when generating metadata for each video frame or sequence. The batch size may be optimized based on system memory and processing power, ensuring that the model(s) can handle large datasets without running out of resources. Each batch may consist of temporal sequences of frames, ensuring that the model(s) process videos in context, maintaining the temporal consistency learned during training.

Example

A batch of 32 sequences (each sequence being 10 frames long) is processed at once, with the model generating predictions for focal length, camera movement, and shot type for each sequence.

```
def batch_inference(model, video_sequences, batch_size=32):
    results=[ ]
    for i in range(0, len(video_sequences), batch_size):
        batch=video_sequences[i:i+batch_size]
        batch_predictions=model.predict(batch)
        results.extend(batch_predictions)
    return results
```

Distributed processing for scalability may involve using distributed computing frameworks to split the dataset into smaller chunks that can be processed in parallel across multiple machines. This approach may ensure that the model(s) can label vast video libraries efficiently. By combining batch processing and distributed computing, the model(s) may label extremely large video datasets quickly and efficiently, which is crucial for handling the demands of professional filmmaking workflows. This approach balances speed and memory usage while maintaining the accuracy required for complex cinematic metadata.

Example

Split the video dataset into shards, with each shard containing a subset of the video sequences. Each shard is processed by a separate worker node, allowing the model to generate metadata for millions of video hours in a fraction of the time it would take to process sequentially.

```
from dask.distributed import Client
client=Client( )
def distributed_processing(video_shard):
    return batch_inference(model, video_shard)
future=client.map(distributed_processing, video_shards)
results=client.gather(future)
```

Ensuring temporal consistency in metadata may involve processing sequential frames rather than isolated frames to ensure that metadata is generated in a temporally consistent manner. For example, the predicted camera movement vectors should transition smoothly over time to reflect the continuous movement of the camera in real-world scenarios. Generating metadata for entire shots may ensure that the model(s) generate metadata that is representative of an entire cinematic shot rather than just individual frames. This may allow for shot-based metadata, which is more aligned with how filmmakers think about scenes and shots.

Example

When processing a dolly-in sequence, the model should predict a smooth increase in the Z-axis movement vector across frames, reflecting the camera's forward movement. Similarly, changes in focal length should be gradual and consistent across sequences of frames, preventing abrupt changes in the predicted metadata.

```
[
    {"frame_0010": {"focal_length": 50, "camera_movement": {"x": 0.0, "y": 0.0, "z": 0.02}}},
    {"frame_0011": {"focal_length": 50, "camera_movement": {"x": 0.0, "y": 0.0, "z": 0.04}}},
    {"frame_0012": {"focal_length": 50, "camera_movement": {"x": 0.0, "y": 0.0, "z": 0.06}}}
]
```

Implementing an automated quality control system may check for inconsistencies or errors in the predicted metadata. Developing an automated system that flags sequences where the predicted metadata is inconsistent with real-world cinematic norms may be part of the process. A continuous feedback loop for model improvement may involve retraining the model(s) on problematic cases to improve its accuracy and consistency. This real-time feedback loop may allow the model(s) to continuously improve as it processes more video data, ensuring that errors and inconsistencies are caught early and corrected.

Example

The system could check for cases where the predicted camera movement vectors change abruptly from frame to frame, which might indicate a labeling error. These sequences can be flagged and corrected either manually or through retraining the model.

```
def quality_control_check(predictions):
    flagged_sequences=[ ]
    for seq in predictions:
        if abs(seq['camera_movement']['z']-prev_seq['camera_movement']['z'])>threshold:
            flagged_sequences.append(seq)
        prev_seq=seq
    return flagged_sequences
```

Efficiently storing and organizing the generated cinematic metadata in a structured format may make it easily accessible for post-production tasks. The metadata may be searchable, indexed, and readily retrievable to allow seamless integration into filmmaking workflows. For large video libraries, storing the metadata in a relational database that allows for fast querying and retrieval may be beneficial. Implementing indexing for fast retrieval of metadata and developing a search interface or API that allows editors to query the database for specific shots based on desired cinematic metadata may ensure that the stored metadata is easily searchable.

Example

Store the metadata for each shot in a JSON file, with relevant details about focal length, camera movement, shot type, and motion blur:

```
"shot_sequence_001": {
  "timestamp_start": "00:00:10.0",
  "timestamp_end": "00:00:15.0",
  "focal_length": 85,
  "camera_movement": {"x": 0.0, "y": 0.0, "z": 0.03},
  "shot_type": "close-up",
  "motion_blur": {
    "blur_strength": 0.6,
    "blur_direction": "z-axis",
    "shutter_angle": 180
  }
}
```

Example

A database table for storing shot-level metadata might look like this:

```
{
  "focal_length": 50,
  "camera_position": [0.25, 0.1, -0.43],
  "object_position": [-0.12, 0.0, 0.34],
  "camera_movement": [0.02, 0.03, -0.01]
}
```

Example a. Create an index on the focal length and camera movement fields to enable fast searches across the video library:
CREATE INDEX idx_focal_length ON shot_metadata (focal_length);
CREATE INDEX idx_camera_movement ON shot_metadata (camera_movement_x, camera_movement_y, camera_movement_z);

Integrating the labeled metadata with common post-production tools may involve developing APIs or export functions that allow the metadata to be seamlessly integrated into post-production workflows. For more advanced video production workflows, integrating the metadata directly into video asset management systems or machine learning-based video generation systems may be part of the process. This ability to integrate technical cinematic metadata directly into post-production tools may be unique because it allows filmmakers to search, retrieve, and manipulate video data based on highly specific technical parameters.

Example

Export the metadata for a video sequence as an XML file that can be imported into Adobe Premiere for editing:

```
<metadata>
  <shot id="shot_sequence_001">
    <start_timecode>00:00:10.0</start_timecode>
    <end timecode>00:00:15.0</end timecode>
    <focalt_ength>85</focal_length>
    <camera_movement>
      <x>0.0</x>
      <y>0.0</y>
      <z>0.03</z>
    </camera_movement>
    <shot_type>close-up</shot_type>
    <motion_blur>
      <blur_strength>0.6</blur_strength>
      <blur_direction>z-axis</blur_direction>
    </motion_blur>
    <shutter_angle>180</shutter_angle>
  </shot>
</metadata>
```

The optimized deployment of the captioner model(s) ensures that large video libraries are processed efficiently, with accurate and consistent metadata generated for every shot and frame. By focusing on scalability, temporal consistency, and shot-level metadata generation, this process aligns with the needs of professional filmmaking workflows. The integration of automated quality control and metadata storage ensures that the labeled data is accurate, searchable, and readily available for post-production teams. The focus on batch processing and distributed computing ensures the model(s) can handle vast amounts of video data efficiently, while maintaining high-quality labeling. The temporal sequence-based approach ensures that the generated metadata is consistent and smooth over time, reflecting the real-world dynamics of camera movements and focal length changes. The integration of metadata into post-production tools makes the labeled data immediately useful for video editing, visual effects, and automated video generation, giving filmmakers precise control over their footage at a technical level.

Exemplary Post-Processing and Quality Control

In one aspect, the process for post-processing and quality control may focus on automatically detecting inconsistencies in the generated metadata, such as abrupt or unrealistic changes in focal length, camera movement, or motion blur that deviate from standard cinematic practices. Rule-based checks and statistical models may be implemented to flag anomalies in the metadata. For example, large, unrealistic changes in focal length or camera movement across consecutive frames, or inconsistent shot types, may be checked. If the predicted focal length jumps significantly within a short sequence, this may be flagged as an inconsistency and sent to the post-processing queue for correction. Automated correction mechanisms may apply a smoothing algorithm that adjusts predictions to ensure they remain within realistic ranges. For instance, if focal length predictions fluctuate too much, interpolation between previous and subsequent frames may be used to correct the values.

Example

If the predicted focal length jumps from 50 mm to 135 mm within a short sequence, flag this as an inconsistency and send it to the post-processing queue for correction.

```
def detect_focal_length_inconsistencies(metadata):
    flagged_shots=[ ]
    for i in range(1, len(metadata)):
```

```
        if abs(metadata[i]['focal_length']-metadata[i-1]
            ['focal_length'])>threshold:
            flagged_shots.append(i)
    return flagged_shots
```
Temporal consistency checks may verify that predictions for key parameters like focal length, camera movement, and motion blur are consistent and smooth across time, ensuring that the metadata reflects real-world camera behavior. Temporal consistency checks may ensure that predictions for camera movements and focal lengths transition smoothly across consecutive frames. If there are sudden, erratic changes in the predictions, these should be flagged and smoothed out. For a dolly-in shot, the Z-axis movement vector should increase smoothly across frames. If the vector suddenly decreases or fluctuates, the sequence may be flagged, and the vector corrected to ensure a smooth increase.

Example

If a focal length value deviates from the trend, adjust it by interpolating between the values of neighboring frames to ensure a smooth transition:
```
def smooth_focal_length(metadata, flagged_shots):
    for i in flagged_shots:
        metadata[i]['focal_length']=(metadata[i-1]['focal_
            length']+metadata[i+1]['focal_length'])/2 return
            metadata
```
Sequences with complex or subtle inconsistencies that cannot be resolved automatically may be flagged for manual review, ensuring that human reviewers can step in to make adjustments where necessary. Sequences that exhibit complex errors should be flagged for manual review. Human experts can then assess these sequences and make any necessary adjustments to the metadata. Expert reviewers may be provided with a set of tools that allow them to manually adjust metadata for sequences flagged for review. These tools should integrate seamlessly into the post-processing workflow.

Example

For a dolly-in shot, the Z-axis movement vector should increase smoothly across frames. If the vector suddenly decreases or fluctuates, the sequence is flagged, and the vector is corrected to ensure a smooth increase.
```
def check_temporal_consistency(metadata):
    inconsistent_frames=[ ]
    for i in range(1, len(metadata)):
        if abs(metadata[i]['camera_movement']['z']-meta-
            data[i-1]['camera_movement']['z'])>threshold:
            inconsistent_frames.append(i)
    return inconsistent_frames
```

Example

Apply a moving average filter to the camera movement vectors, smoothing out any abrupt transitions:
```
def smooth_camera_movement(metadata, flagged_
    frames):
    for i in flagged_frames:
        metadata[i]['camera_movement']['z']=(metadata[i-
            1]['camera_movement']['z']+metadata[i+1]
            ['camera_movement']['z'])/2
    return metadata
```
A feedback loop for model retraining may continuously improve the model by feeding any errors or inconsistencies encountered during post-processing back into the training loop, ensuring that the model learns from its mistakes. Flagged sequences and corrections made during post-processing may be fed back into the model's training dataset. The model may be retrained using these difficult examples to refine its predictions and improve its accuracy for future labeling tasks. An adaptive learning system from post-processing data may enable the model to continuously improve based on feedback from the post-processing stage. By feeding corrected and flagged sequences back into the training process, the model can adapt and learn from its errors, gradually increasing its accuracy for future labeling tasks.
```
def flag_for_manual_review(metadata):
    manual_review_queue=[ ]
    for frame in metadata:
        if complex_issue_detected(frame):
            manual_review_queue.append(frame)
    return manual_review_queue
```

Example

If the model consistently mispredicts motion blur for certain types of camera movements, retrain the model on sequences with corrected motion blur values to ensure that it improves its performance in these cases.
```
def retrain_model_on_flagged_data(flagged_sequences):
    retraining_data=load_flagged_sequences(flagged_se-
        quences)
    model.fit(retraining_data)
```

Example

If the model frequently mispredicts occlusion in over-the-shoulder shots, retrain it on flagged sequences where manual corrections were applied to the occlusion metadata. The model will then learn to predict more accurate occlusion scenarios in future shots.
```
def adaptive_retraining(model, flagged_sequences, cor-
    rected_metadata):
    # Load flagged sequences and their corrected metadata
    training_data=prepare_data_for_retraining(flagged_
        sequences, corrected_metadata)
    # Retrain the model with a smaller learning rate to
        fine-tune its predictions
    model.fit(training_data, epochs=5, learnin-
        g_rate=0.0001)
```
A final quality assurance check may run a final quality check on the metadata before delivery to ensure that all predictions meet the required accuracy thresholds and that any remaining inconsistencies have been resolved. Once the metadata has passed the final quality checks, it may be exported in the required format and delivered to the relevant video databases or post-production tools. This final quality assurance step ensures that all metadata is fully refined and accurate before being integrated into professional filmmaking workflows. The focus on cinematic precision makes this process stand out compared to more general-purpose video labeling systems.

Exemplary Optimization of Metadata Geographic Tokenization for Machine Learning and Artificial Intelligence In one aspect, the approach to recording geographic data during the filmmaking process significantly differentiates captioner model(s) from other models, offering a unique opportunity for specificity and efficiency in the tokenization process. This integrity is maintained throughout the training process. The design choice to incorporate geographic location into the metadata allows captioner model(s) to employ numerical tokenization rather than textual representation, providing several efficiency benefits, especially when working with machine learning models. Recording numerical coordinates may allow for numerical tokenization. To avoid large-scale differences in values, all coordinates may be normalized to a consistent scale, such as normalizing to values between −1 and 1, based on the size of the soundstage or recording area. For instance, if the soundstage dimensions are 10 meters by 10 meters, scale X, Y, Z values such that x=0 represents the center, and x=−1 or x=1 represents the extreme left and right edges, respectively. The input vector construction may combine the normalized x, y, z values with other metadata elements into a single input vector that the model can process.

When incorporating geographic location data into metadata, this could refer to either the camera position in physical space relative to the soundstage or the object position relative to the camera. Instead of using textual descriptions for these geographic elements, it is far more efficient to represent geographic data numerically, using coordinates in a fixed reference frame. The numerical representation allows for the camera's position to be stored using 3D Cartesian coordinates relative to a fixed origin point on the soundstage. The object or subject's location can be similarly represented in relation to the camera or stage, depending on the context.

The benefits of numerical tokenization include efficient input for machine learning models, as numerical values like geographic coordinates will be directly fed into machine learning models as input vectors, making them easier and faster to process. Lower dimensionality is achieved since numerical data can be directly converted into vectors and included in the training batches with minimal preprocessing. High precision is maintained with numerical data since exact coordinates are provided, allowing the model to understand spatial relations accurately. Using numerical data allows the model to learn spatial relations and distances more easily, helping the model converge faster during training. Reduced risk of ambiguity is achieved as numerical representations eliminate ambiguity and provide a consistent reference frame for the model to rely on. Compact representation is another benefit, as numerical geographic metadata can be represented as compact 3D vectors, reducing memory usage and computational complexity, especially when dealing with large datasets.

In practice, the model receives precise, unambiguous numeric data for both the camera and object positions and can directly process these numbers without extra tokenization or interpretation. This allows the model to more easily learn relationships between positions, demonstrating the efficacy of captioner model(s)' technique and technology relative to prior captioning models.

Exemplary Aspects

The various embodiments described above can be combined to provide further embodiments. All U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified if necessary to employ concepts of the various patents, applications, and publications to provide yet further embodiments.

These and other changes can be made to the embodiments in light of the above-detailed description. In general, in the following aspects, the terms used should not be construed to limit the aspects to the specific embodiments disclosed in the specification and the aspects but should be construed to include all possible embodiments along with the full scope of equivalents to which such aspects are entitled. Accordingly, the aspects are not limited by the disclosure.

Aspects of the techniques described in the present disclosure may include any of the following aspects, either alone or in combination:

1. A computer-implemented method for training an artificial intelligence (AI) model, the method comprising: providing a large volume of video data, each video data being paired with a textual description; processing the video data through a captioner model to automate the captioning and labeling of the video content; and training the AI model using the captioned and labeled video data, wherein the AI model is configured to recognize and understand specific cinematic components including at least one of focal length, depth maps, movement, occlusion, parallax, or camera angles, to accurately generate new video content based on the training.

2. The method of aspect 1, further comprising processing and understanding complex cinematic metadata through the captioner model, wherein the cinematic metadata includes numerical tokenization for geographic data and focuses on technical parameters of filmmaking selected from the group consisting of focal length, camera movement, shot type, and motion blur.

3. The method of any of aspects 1-2, wherein the captioner model encodes geographic location data numerically to represent spatial relationships within a scene, including interpreting the camera's position in three-dimensional space relative to a fixed origin point and the position of objects or subjects within the scene using a numerical coordinate system.

4. The method of any of aspects 1-3, wherein numerical tokenization for geographic data is used for direct input into the captioner model as part of the input vector, thereby minimizing preprocessing steps and reducing computational overhead.

5. The method of any of aspects 1-4, wherein the numerical tokenization maintains high precision in representing spatial relationships, enabling the captioner model to accurately learn and predict the impact of camera positioning and movement on the visual composition of a shot.

6. The method of any of aspects 1-5, wherein the numerical tokenization facilitates faster convergence during training of the captioner model by enabling it to more easily learn quantitative differences between positions.

7. The method of any of aspects 1-6, wherein the numerical tokenization offers a compact representation of geographic metadata, reducing memory usage and computational complexity.

8. The method of any of aspects 1-7, wherein the captioner model integrates detailed cinematic metadata into the input representation, including the numerical tokenization of geographic data, to learn complex interdependencies between various cinematic parameters.

9. The method of any of aspects 1-8, wherein the captioner model employs a multi-task learning architecture to simultaneously predict multiple technical parameters and is trained on temporal data to capture the dynamics of camera movement and object motion, enabling it to generate metadata that accurately reflects continuous movement and visual effects seen in professional filmmaking.

10. The method of any of aspects 1-9, wherein the captioner model processes both visual data and detailed cinematic metadata, including numerical tokenization of geographic data, to adhere to professional filmmaking standards.

11. The method of any of aspects 1-10, wherein the captioner model encodes geographic location data numerically to efficiently and precisely represent spatial relationships within a scene, facilitating the accurate interpretation of camera and object positions in three-dimensional space.

12. The method of any of aspects 1-11, wherein the numerical tokenization of geographic data is utilized for direct input into the captioner model as part of the input vector, which minimizes preprocessing steps and reduces computational overhead while maintaining high precision in representing spatial relationships.

13. The method of any of aspects 1-12, wherein the captioner model employs a multi-task learning architecture to simultaneously predict multiple technical parameters and is trained on temporal data to accurately reflect continuous movement and visual effects in generated video content.

14. A computer-implemented method for training a captioner model to generate captions for video content based on cinematic elements, the method comprising: a. organizing a dataset comprising raw video clips and corresponding metadata, wherein each video clip represents a specific shot varying one cinematic parameter at a time selected from the group consisting of focal length, camera movement, and framing; b. extracting frames from the video clips at a consistent frame rate and storing the frames in a structured format; c. associating each frame with corresponding metadata detailing the cinematic elements present in the frame, wherein the metadata includes information on focal length, camera movement, object distance, and framing style; d. segmenting the video data into shots and frames, wherein a shot comprises a continuous sequence captured without cuts, and frames are extracted at regular intervals from each shot; e. applying labels to each frame based on the associated metadata, wherein labels include focal length used during the shot, camera movement details, object distance from the camera, and framing style; f. aggregating frame-level labels to generate shot-level labels, wherein the aggregation includes calculating average focal length, determining predominant framing style, and smoothing camera movement data across the shot; g. training the captioner model using the labeled frames and aggregated shot-level labels to recognize and predict the cinematic elements in unseen video content; h. iteratively refining the captioner model based on feedback from validation datasets to improve the accuracy of cinematic element prediction; i. deploying the trained captioner model to process and label a large video database, wherein the model generates metadata for new video content based on learned cinematic elements; and j. post-processing the generated labels to ensure consistency and accuracy, including performing outlier detection, confidence scoring, and manual quality control.

15. The method of aspect 14, wherein organizing the dataset further comprises storing the video clips in a high-resolution, lossless format to preserve visual information critical for model learning.

16. The method of any of aspects 14-15, wherein the metadata associated with each frame is stored in formats selected from the group consisting of JSON and CSV.

17. The method of any of aspects 14-16, wherein segmenting the video data into shots is performed using shot detection algorithms that identify scene changes.

18. The method of any of aspects 14-17, wherein applying labels to each frame further comprises using LiDAR and laser locator data to provide highly accurate, frame-by-frame positioning of the camera and objects within the scene.

19. The method of any of aspects 14-18, wherein aggregating frame-level labels to generate shot-level labels further comprises using majority voting to determine the predominant framing style for the shot.

20. The method of any of aspects 14-19, further comprising conditioning the captioner model on both visual features extracted from video frames and the detailed captioned metadata during training.

21. The method of any of aspects 14-20, further comprising using a multi-task learning approach during training, wherein the captioner model is trained to minimize losses for both visual quality and cinematic accuracy.

22. The method of any of aspects 14-21, further comprising employing active learning techniques to iteratively fine-tune the captioner model based on difficult cases identified during training.

23. The method of any of aspects 14-22, further comprising exporting the final labels generated by the captioner model to a structured format for easy integration into downstream tasks, including database storage and video editing software.

24. The method of any of aspects 14-23, wherein the step of extracting frames from the video clips includes maintaining a consistent frame rate across all video footage to ensure uniform temporal information is captured for model training.

25. The method of any of aspects 14-24, wherein the metadata detailing the cinematic elements present in the frame further includes lighting conditions and background complexity to aid in the disambiguation between subject movement and camera movement.

26. The method of any of aspects 14-25, wherein the step of applying labels to each frame based on the associated metadata further includes labeling the exact distance between the camera and the main subject in the frame to help the model learn depth cues related to lens compression and field of view.

27. The method of any of aspects 14-26, wherein the step of training the captioner model includes using a Transformer-based video model architecture to process both visual features extracted from video frames and metadata embeddings.

28. The method of any of aspects 14-27, further comprising automating the extraction and labeling of data using tools derived from filmmaker processes to reduce manual labeling time and improve consistency across the dataset.

29. The method of any of aspects 14-28, further comprising validating the labeled dataset by manually reviewing a subset of the labeled data to ensure that automatic extraction and labeling processes are working correctly and consistently.

30. The method of any of aspects 14-29, wherein deploying the trained captioner model to process and label a large video database includes using parallel processing or distributed computing to label multiple videos simultaneously for efficient handling of large datasets.

31. The method of any of aspects 14-30, wherein post-processing the generated labels includes implementing automated checks to detect inconsistent labels, such as sudden changes in focal length between consecutive frames where no camera zoom is expected.

32. The method of any of aspects 14-31, further comprising storing the final labels in a relational database or NoSQL database for efficient querying, allowing video professionals to search for videos based on specific cinematic parameters.

33. The method of any of aspects 14-32, wherein the step of iteratively refining the captioner model based on feedback from validation datasets includes implementing uncertainty estimation techniques to flag sequences where the model is less confident in its output.

34. The method of any of aspects 14-33, further comprising setting up indexing for key columns like focal length, framing, and camera movement in the database to allow fast retrieval of videos based on these cinematic parameters.

35. The method of as any of aspects 14-34, wherein the step of aggregating frame-level labels to generate shot-level labels further includes calculating the velocity of camera movement between frames to ensure smoothness in camera movement predictions.

36. The method of any of aspects 14-35, further comprising employing a feedback loop for model improvement, wherein the model is retrained or fine-tuned on identified error cases based on findings from manual quality control.

37. The method of any of aspects 14-36, wherein the step of exporting the final labels generated by the captioner model includes assigning confidence scores to each prediction, indicating the model's certainty about that particular output.

38. The method of any of aspects 14-37, further comprising filtering out low-confidence predictions based on a predetermined confidence threshold to ensure that only high-confidence predictions are used in the final labeled dataset.

39. The method of any of aspects 14-38, wherein the step of manual quality control includes randomly selecting a subset of the labeled video frames or shots for manual review to catch any patterns of errors that may have slipped through automated checks.

40. The method of any of aspects 14-39, further comprising correcting focal length outliers by replacing outlier values with the average focal length of surrounding frames to maintain consistency in the labeled data.

41. The method of any of aspects 14-40, wherein the step of conditioning the captioner model on both visual features and detailed captioned metadata during training includes concatenating metadata vectors with visual features extracted from the frames.

42. The method of any of aspects 14-41, further comprising using a conditional loss function during training that penalizes the model for generating frames that deviate from the expected cinematic parameters specified by the metadata.

43. The method of any of aspects 14-42, wherein the step of using a multi-task learning approach during training further includes penalizing the model for errors in predicting depth of field effects, ensuring that generated frames match the cinematic metadata.

44. The method of any of aspects 14-43, further comprising scaling the training to larger, more diverse video sequences with complex interactions, such as multiple objects, occlusion, and dynamic camera movements, once the model performs well on smaller datasets.

45. The method of any of aspects 14-44, wherein the step of iterative training and refinement includes training the model on a subset of data and validating periodically to ensure that both the visual quality and the cinematic accuracy are improving.

46. The method of any of aspects 14-45, further comprising employing load balancing to distribute the workload across multiple servers or cloud instances during the deployment phase to efficiently handle the processing load of labeling a large video database.

47. The method of any of aspects 14-46, wherein the step of post-processing the generated labels to ensure consistency and accuracy further includes smoothing camera movement data across the shot using a Gaussian filter to create a stable movement profile.

48. The method of any of aspects 14-47, further comprising using shot detection algorithms that identify scene changes to automatically divide each video file into distinct shots during the segmentation process.

49. The method of any of aspects 14-48, wherein the step of labeling each frame based on the associated metadata further includes using automated metadata software in the unreal system associated with the Filmmaker capture to synchronize metadata with video frames.

50. The method of any of aspects 14-49, further comprising maintaining consistency across the dataset by ensuring uniformity of object/subject positioning, size, and lighting across all shots, as well as incremental changes in focal length, movement, or framing to facilitate efficient model learning.

51. A computer-implemented method for enhancing an existing video model's ability to recognize and generate video content based on cinematic elements, the method comprising: a. providing a trained captioner model capable of generating detailed metadata for video sequences, wherein the metadata includes information on cinematic parameters such as focal length, camera movement, depth of field, occlusion, and parallax; b. selecting an existing video model designed to generate video content or recognize cinematic elements in video sequences; c. collecting a dataset of video sequences and corresponding ground-truth metadata detailing the cinematic elements present in each sequence; d. processing the dataset of video sequences through the trained captioner model to generate predicted metadata for each video sequence based on the recognized cinematic elements; e. comparing the predicted metadata generated by the captioner model with the ground-truth metadata to identify discrepancies and areas of improvement for the existing video model; f. retraining the existing video model using a combination of the original training data and the newly generated metadata from the captioner model, wherein the retraining process conditions the existing video model on both visual features and the detailed cinematic metadata; g. iteratively refining the existing video model based on feedback from validation datasets and the accuracy of cinematic element recognition and generation; h. deploying the enhanced existing video model to process new video content, wherein the model utilizes the learned cinematic parameters to improve the accuracy and realism of generated video content or recognition of cinematic elements in video sequences; i. evaluating the performance of the enhanced existing video model on a test dataset to assess improvements in recognizing and generating video content based on cinematic elements; and j. implementing a continuous improvement process, wherein the enhanced existing video model is periodically updated with new metadata generated by the captioner model to maintain high accuracy and relevance in recognizing and generating video content based on cinematic elements.

52. The method of aspect 51, wherein the trained captioner model is specifically fine-tuned on a dataset comprising controlled shots in a soundstage environment, allowing for precise identification of cinematic elements.

53. The method of any of aspects 51-52, wherein the existing video model is a pre-trained model selected from the group consisting of convolutional neural networks (CNNs) and transformer-based models designed for video processing tasks.

54. The method of any of aspects 51-53, further comprising using a conditional loss function during the retraining process that penalizes deviations between the predicted metadata and the ground-truth metadata to enhance the existing video model's accuracy.

55. The method of any of aspects 51-54, wherein the step of processing the dataset through the trained captioner model includes generating metadata predictions for each frame in the video sequences, thereby providing frame-level insights into cinematic elements.

56. The method of any of aspects 51-55, further comprising aggregating the frame-level metadata predictions to generate shot-level metadata, which is used to condition the existing video model during the retraining process.

57. The method of any of aspects 51-56, wherein the step of iteratively refining the existing video model includes employing active learning techniques to focus retraining efforts on video sequences where the model demonstrates lower confidence in its predictions.

58. The method of any of aspects 51-57, further comprising employing a feedback loop wherein the enhanced existing video model's predictions on new video content are periodically compared with additional metadata generated by the captioner model to identify further areas for improvement.

59. The method of any of aspects 51-58, wherein the step of deploying the enhanced existing video model to process new video content includes using the model in applications selected from the group consisting of automated video editing, cinematic video generation, and video content analysis.

60. The method of any of aspects 51-59, further comprising using the enhanced existing video model to generate video content that adheres to specific cinematic prompts, thereby demonstrating the model's improved understanding of cinematic parameters.

61. The method of any of aspects 51-60, wherein the step of evaluating the performance of the enhanced existing video model includes measuring improvements in specific areas such as depth of field recognition, camera movement prediction, and framing style identification.

62. The method of any of aspects 51-61, further comprising integrating the enhanced existing video model into a larger video processing pipeline that includes steps for video capture, editing, and final production, thereby streamlining the creation of cinematic content.

63. The method of any of aspects 51-62, wherein the continuous improvement process includes updating the trained captioner model with new video sequences and corresponding metadata to reflect evolving cinematic techniques and styles.

64. The method of any of aspects 51-63, further comprising using the enhanced existing video model to provide real-time feedback on cinematic quality during the video production process, enabling directors and cinematographers to adjust filming techniques accordingly.

65. The method of any of aspects 51-64, wherein the dataset of video sequences includes a diverse range of cinematic styles and genres to ensure the captioner model and the existing video model are capable of recognizing and generating a wide variety of cinematic elements.

66. A computer-implemented method for training a new model to analyze and generate video content based on cinematic elements using a captioner AI, the method comprising: a. accessing a trained captioner AI model capable of identifying and generating metadata for cinematic elements within video sequences, where the cinematic elements include focal length, camera movement, depth of field, occlusion, and parallax; b. compiling a dataset of video sequences that have not been previously analyzed by the captioner AI model, where each video sequence includes a variety of cinematic elements; c. processing the compiled dataset through the trained captioner AI model to generate metadata for each video sequence, where the metadata describes the cinematic elements present in the sequence; d. designing a new model architecture capable of analyzing video content and generating video sequences based on input cinematic parameters; e. training the new model using the metadata generated by the captioner AI model as training data, where the training process conditions the new model to recognize and replicate the identified cinematic elements in video content; f. validating the accuracy of the new model in recognizing and generating cinematic elements within video sequences using a separate validation dataset processed through the captioner AI model; g. iteratively refining the new model based on performance feedback obtained during validation to enhance its ability to accurately analyze and generate video content based on cinematic elements; h. deploying the trained new model to analyze incoming video content and generate new video sequences that adhere to specified cinematic parameters, thereby demonstrating the model's understanding and application of cinematic elements; i. continuously updating the training dataset for the new model with additional metadata generated by the captioner AI model from newly compiled video sequences to ensure the new model remains current with cinematic trends and techniques.

67. The method of aspect 66, wherein the trained captioner AI model has been fine-tuned on a diverse range of cinematic styles and genres to ensure comprehensive coverage of cinematic elements in the metadata generation process.

68. The method of any of aspects 66-67, wherein the new model architecture includes layers specifically designed to process and interpret metadata related to cinematic elements, enhancing the model's ability to analyze and generate video content based on such elements.

69. The method of any of aspects 66-68, further comprising employing a multi-task learning strategy during the training of the new model, where the model is optimized to achieve high accuracy in both recognizing cinematic elements in video content and generating video sequences that accurately reflect specified cinematic parameters.

70. The method of any of aspects 66-69, wherein the step of validating the accuracy of the new model includes comparing the model's analysis of video content with the metadata generated by the captioner AI model to identify discrepancies and areas for improvement.

71. The method of any of aspects 66-70, further comprising utilizing the new model in real-time video production environments to provide immediate analysis and feedback on the cinematic quality of captured video content, aiding in the decision-making process during filming.

72. The method of any of aspects 66-71, wherein the continuous updating of the training dataset includes processing newly released films and video content through the captioner AI model to capture evolving cinematic styles and techniques.

73. The method of any of aspects 66-72, further comprising integrating the new model into video editing software to automate the generation of video sequences that comply with user-specified cinematic parameters, thereby streamlining the video production process.

74. The method of any of aspects 66-73, wherein the step of deploying the trained new model includes making the model available as a cloud-based service, where users can upload video content for analysis and request the generation of new video sequences based on desired cinematic elements.

75. The method of any of aspects 66-74, further comprising implementing a feedback mechanism where users can rate the accuracy and quality of the new model's analysis and generated video content, providing valuable data for ongoing refinement of the model.

76. A computer-implemented method for generating information on cinematic elements within video content using a trained captioner model, the method comprising: a. providing a captioner model that has been trained to identify and generate metadata for cinematic elements in video sequences, where the cinematic elements include but are not limited to focal length, camera movement, depth of field, occlusion, and parallax; b. inputting a target video sequence into the trained captioner model, where the target video sequence comprises a series of frames depicting various cinematic elements; c. processing the target video sequence through the trained captioner model to generate metadata for each frame of the video sequence, where the metadata describes the cinematic elements identified by the model; d. aggregating the frame-level metadata to produce comprehensive information on the cinematic elements present throughout the target video sequence; e. outputting the aggregated information as a structured report or visualization that details the cinematic elements identified within the target video sequence, including changes in focal length, patterns of camera movement, and instances of occlusion or parallax; f. storing the generated information in a database or file system for future reference or analysis; g. utilizing the generated information to enhance video content analysis, editing, or production processes by providing insights into the cinematic techniques employed within the target video sequence.

77. The method of aspect 76, wherein the trained captioner model utilizes a combination of convolutional neural networks (CNNs) and transformer-based architectures to accurately identify and generate metadata for cinematic elements.

78. The method of any of aspects 76-77, further comprising preprocessing the target video sequence to standardize frame size and resolution before inputting the sequence into the trained captioner model, ensuring consistent analysis across different video content.

79. The method of any of aspects 76-78, wherein the step of aggregating frame-level metadata includes calculating average values for continuous cinematic elements, such as focal length, and determining predominant styles for categorical elements, such as framing.

80. The method of any of aspects 76-79, further comprising applying filters or thresholds to the generated metadata to highlight significant changes or patterns in cinematic elements, thereby focusing the analysis on key aspects of the video content.

81. The method of any of aspects 76-81, wherein the structured report or visualization includes interactive elements that allow users to explore the identified cinematic elements in detail, including frame-by-frame breakdowns and comparisons.

82. The method of any of aspects 76-82, further comprising integrating the generated information into video editing software as metadata tracks that accompany the video content, providing editors with real-time insights into the cinematic elements present.

83. The method of any of aspects 76-83, wherein the database or file system storing the generated information is made accessible to filmmakers, editors, and researchers for querying and retrieving insights into cinematic techniques across a wide range of video content.

84. The method of any of aspects 76-84, further comprising employing machine learning algorithms to analyze the aggregated information on cinematic elements, identifying trends and patterns that can inform future video production and editing decisions.

85. The method of any of aspects 76-85, wherein the generated information is used to train or refine other video analysis models, leveraging the insights into cinematic elements to enhance the models' understanding and interpretation of video content.

86. A computing system for training an artificial intelligence (AI) model, the system comprising: one or more processors; and one or more memories, having stored thereon instructions that, when executed, cause the computing system to provide a large volume of video data, each video data being paired with a textual description; process the video data through a captioner model to automate the captioning and labeling of the video content; and train the AI model using the captioned and labeled video data, wherein the AI model is configured to recognize and understand specific cinematic components including at least one of focal length, depth maps, movement, occlusion, parallax, or camera angles, to accurately generate new video content based on the training.

87. The computing system of aspect 86, the memories having stored thereon further instructions that, when executed, cause the computing system to process and understand complex cinematic metadata through the captioner model, wherein the cinematic metadata includes numerical tokenization for geographic data and focuses on technical parameters of filmmaking selected from the group consisting of focal length, camera movement, shot type, and motion blur.

88. The computing system of any of aspects 86-87, the memories having stored thereon further instructions that, when executed, cause the computing system to encode geographic location data numerically to represent spatial relationships within a scene, including interpreting the camera's position in three-dimensional space relative to a fixed origin point and the position of objects or subjects within the scene using a numerical coordinate system.

89. The computing system of any of aspects 86-88, the memories having stored thereon further instructions that, when executed, cause the computing system to use numerical tokenization for geographic data for direct input into the captioner model as part of the input vector, thereby minimizing preprocessing steps and reducing computational overhead.

90. The computing system of any of aspects 86-89, the memories having stored thereon further instructions that, when executed, cause the computing system to maintain high precision in representing spatial relationships, enabling the captioner model to accurately learn and predict the impact of camera positioning and movement on the visual composition of a shot.

91. The computing system of any of aspects 86-90, the memories having stored thereon further instructions that, when executed, cause the computing system to facilitate faster convergence during training of the captioner model by enabling it to more easily learn quantitative differences between positions.

92. The computing system of any of aspects 86-91, the memories having stored thereon further instructions that, when executed, cause the computing system to offer a compact representation of geographic metadata, reducing memory usage and computational complexity.

93. The computing system of any of aspects 86-92, the memories having stored thereon further instructions that, when executed, cause the computing system to integrate detailed cinematic metadata into the input representation, including the numerical tokenization of geographic data, to learn complex interdependencies between various cinematic parameters.

94. The computing system of any of aspects 86-93, the memories having stored thereon further instructions that, when executed, cause the computing system to employ a multi-task learning architecture to simultaneously predict multiple technical parameters and is trained on temporal data to capture the dynamics of camera movement and object motion, enabling it to generate metadata that accurately reflects continuous movement and visual effects seen in professional filmmaking.

95. The computing system of any of aspects 86-94, the memories having stored thereon further instructions that, when executed, cause the computing system to process both visual data and detailed cinematic metadata, including numerical tokenization of geographic data, to adhere to professional filmmaking standards.

96. The computing system of any of aspects 86-95, the memories having stored thereon further instructions that, when executed, cause the computing system to encode geographic location data numerically to efficiently and precisely represent spatial relationships within a scene, facilitating the accurate interpretation of camera and object positions in three-dimensional space.

97. The computing system of any of aspects 86-96, the memories having stored thereon further instructions that, when executed, cause the computing system to utilize the numerical tokenization of geographic data for direct input into the captioner model as part of the input vector, which minimizes preprocessing steps and reduces computational overhead while maintaining high precision in representing spatial relationships.

98. The computing system of any of aspects 86-97, the memories having stored thereon further instructions that, when executed, cause the computing system to employ a multi-task learning architecture to simultaneously predict multiple technical parameters and is trained on temporal data to accurately reflect continuous movement and visual effects in generated video content.

99. A computing system for training a captioner model to generate captions for video content based on cinematic elements, comprising: one or more processors; and one or more memories, having stored thereon instructions that, when executed, cause the computing system to organize a dataset comprising raw video clips and corresponding metadata, wherein each video clip represents a specific shot varying one cinematic parameter at a time selected from the group consisting of focal length, camera movement, and framing; extract frames from the video clips at a consistent frame rate and store the frames in a structured format; associate each frame with corresponding metadata detailing the cinematic elements present in the frame, wherein the metadata includes information on focal length, camera movement, object distance, and framing style; segment the video data into shots and frames, wherein a shot comprises a continuous sequence captured without cuts, and frames are extracted at regular intervals from each shot; apply labels to each frame based on the associated metadata, wherein labels include focal length used during the shot, camera movement details, object distance from the camera, and framing style; aggregate frame-level labels to generate shot-level labels, wherein the aggregation includes calculating average focal length, determining predominant framing style, and smoothing camera movement data across the shot; train the captioner model using the labeled frames and aggregated shot-level labels to recognize and predict the cinematic elements in unseen video content; iteratively refine the captioner model based on feedback from validation datasets to improve the accuracy of cinematic element prediction; deploy the trained captioner model to process and label a large video database, wherein the model generates metadata for new video content based on learned cinematic elements; and post-process the generated labels to ensure consistency and accuracy, including performing outlier detection, confidence scoring, and manual quality control.

100. The computing system of aspect 99, the memories having stored thereon further instructions that, when executed, cause the computing system to store the video clips in a high-resolution, lossless format to preserve visual information critical for model learning.

101. The computing system of any of aspects 99-100, the memories having stored thereon further instructions that, when executed, cause the computing system to store the metadata associated with each frame in formats selected from the group consisting of JSON and CSV.

102. The computing system of any of aspects 99-101, the memories having stored thereon further instructions that, when executed, cause the computing system to perform segmenting the video data into shots using shot detection algorithms that identify scene changes.

103. The computing system of any of aspects 99-102, the memories having stored thereon further instructions that, when executed, cause the computing system to use LiDAR and laser locator data to provide highly accurate, frame-by-frame positioning of the camera and objects within the scene when applying labels to each frame.

104. The computing system of any of aspects 99-103, the memories having stored thereon further instructions that, when executed, cause the computing system to use majority voting to determine the predominant framing style for the shot when aggregating frame-level labels to generate shot-level labels.

105. The computing system of any of aspects 99-104, the memories having stored thereon further instructions that, when executed, cause the computing system to condition the captioner model on both visual features extracted from video frames and the detailed captioned metadata during training.

106. The computing system of any of aspects 99-105, the memories having stored thereon further instructions that, when executed, cause the computing system to use a multi-task learning approach during training, wherein the captioner model is trained to minimize losses for both visual quality and cinematic accuracy.

107. The computing system of any of aspects 99-106, the memories having stored thereon further instructions that, when executed, cause the computing system to employ active learning techniques to iteratively fine-tune the captioner model based on difficult cases identified during training.

108. The computing system of any of aspects 99-107, the memories having stored thereon further instructions that, when executed, cause the computing system to export the final labels generated by the captioner model to a structured format for easy integration into downstream tasks, including database storage and video editing software.

109. The computing system of any of aspects 99-108, the memories having stored thereon further instructions that, when executed, cause the computing system to maintain a consistent frame rate across all video footage when extracting frames from the video clips to ensure uniform temporal information is captured for model training.

110. The computing system of any of aspects 99-109, the memories having stored thereon further instructions that, when executed, cause the computing system to include lighting conditions and background complexity in the metadata detailing the cinematic elements present in the frame to aid in the disambiguation between subject movement and camera movement.

111. The computing system of any of aspects 99-110, the memories having stored thereon further instructions that, when executed, cause the computing system to label the exact distance between the camera and the main subject in the frame to help the model learn depth cues related to lens compression and field of view when applying labels to each frame based on the associated metadata.

112. The computing system of any of aspects 99-111, the memories having stored thereon further instructions that, when executed, cause the computing system to use a Transformer-based video model architecture to process both visual features extracted from video frames and metadata embeddings during the training of the captioner model.

113. The computing system of any of aspects 99-112, the memories having stored thereon further instructions that, when executed, cause the computing system to automate the extraction and labeling of data using tools derived from filmmaker processes to reduce manual labeling time and improve consistency across the dataset.

114. The computing system of any of aspects 99-113, the memories having stored thereon further instructions that, when executed, cause the computing system to validate the labeled dataset by manually reviewing a subset of the labeled data to ensure that automatic extraction and labeling processes are working correctly and consistently.

115. The computing system of any of aspects 99-114, the memories having stored thereon further instructions that, when executed, cause the computing system to use parallel processing or distributed computing to label multiple videos simultaneously for efficient handling of large datasets when deploying the trained captioner model to process and label a large video database.

116. The computing system of any of aspects 99-115, the memories having stored thereon further instructions that, when executed, cause the computing system to implement automated checks to detect inconsistent labels, such as sudden changes in focal length between consecutive frames where no camera zoom is expected, during post-processing of the generated labels.

117. The computing system of any of aspects 99-116, the memories having stored thereon further instructions that, when executed, cause the computing system to store the final labels in a relational database or NoSQL database for efficient querying, allowing video professionals to search for videos based on specific cinematic parameters.

118. The computing system of any of aspects 99-117, the memories having stored thereon further instructions that, when executed, cause the computing system to implement uncertainty estimation techniques to flag sequences where the model is less confident in its output when iteratively refining the captioner model based on feedback from validation datasets.

119. The computing system of any of aspects 99-118, the memories having stored thereon further instructions that, when executed, cause the computing system to set up indexing for key columns like focal length, framing, and camera movement in the database to allow fast retrieval of videos based on these cinematic parameters.

120. The computing system of any of aspects 99-119, the memories having stored thereon further instructions that, when executed, cause the computing system to calculate the velocity of camera movement between frames to ensure smoothness in camera movement predictions when aggregating frame-level labels to generate shot-level labels.

121. The computing system of any of aspects 99-120, the memories having stored thereon further instructions that, when executed, cause the computing system to employ a feedback loop for model improvement, wherein the model is retrained or fine-tuned on identified error cases based on findings from manual quality control.

122. The computing system of any of aspects 99-121, the memories having stored thereon further instructions that, when executed, cause the computing system to assign confidence scores to each prediction, indicating the model's certainty about that particular output, when exporting the final labels generated by the captioner model.

123. The computing system of any of aspects 99-122, the memories having stored thereon further instructions that, when executed, cause the computing system to filter out low-confidence predictions based on a predetermined confidence threshold to ensure that only high-confidence predictions are used in the final labeled dataset.

124. The computing system of any of aspects 99-123, the memories having stored thereon further instructions that, when executed, cause the computing system to randomly select a subset of the labeled video frames or shots for manual review to catch any patterns of errors that may have slipped through automated checks during manual quality control.

125. The computing system of any of aspects 99-124, the memories having stored thereon further instructions that, when executed, cause the computing system to correct focal length outliers by replacing outlier values with the average focal length of surrounding frames to maintain consistency in the labeled data.

126. The computing system of any of aspects 99-125, the memories having stored thereon further instructions that, when executed, cause the computing system to concatenate metadata vectors with visual features extracted from the frames when conditioning the captioner model on both visual features and detailed captioned metadata during training.

127. The computing system of any of aspects 99-126, the memories having stored thereon further instructions that, when executed, cause the computing system to use a conditional loss function during training that penalizes the model for generating frames that deviate from the expected cinematic parameters specified by the metadata.

128. The computing system of any of aspects 99-127, the memories having stored thereon further instructions that, when executed, cause the computing system to penalize the model for errors in predicting depth of field effects, ensuring that generated frames match the cinematic metadata when using a multi-task learning approach during training.

129. The computing system of any of aspects 99-128, the memories having stored thereon further instructions that, when executed, cause the computing system to scale the training to larger, more diverse video sequences with complex interactions, such as multiple objects, occlusion, and dynamic camera movements, once the model performs well on smaller datasets.

130. The computing system of any of aspects 99-129, the memories having stored thereon further instructions that, when executed, cause the computing system to train the model on a subset of data and validate periodically to ensure that both the visual quality and the cinematic accuracy are improving during iterative training and refinement.

131. The computing system of any of aspects 99-130, the memories having stored thereon further instructions that, when executed, cause the computing system to employ load balancing to distribute the workload across multiple servers or cloud instances during the deployment phase to efficiently handle the processing load of labeling a large video database.

132. The computing system of any of aspects 99-131, the memories having stored thereon further instructions that, when executed, cause the computing system to smooth camera movement data across the shot using a Gaussian filter to create a stable movement profile during post-processing of the generated labels to ensure consistency and accuracy.

133. The computing system of any of aspects 99-132, the memories having stored thereon further instructions that, when executed, cause the computing system to use shot detection algorithms that identify scene changes to automatically divide each video file into distinct shots during the segmentation process.

134. The computing system of any of aspects 99-133, the memories having stored thereon further instructions that, when executed, cause the computing system to use automated metadata software in the unreal system associated with the Filmmaker capture to synchronize metadata with video frames when labeling each frame based on the associated metadata.

135. The computing system of any of aspects 99-134, the memories having stored thereon further instructions that, when executed, cause the computing system to maintain consistency across the dataset by ensuring uniformity of object/subject positioning, size, and lighting across all shots, as well as incremental changes in focal length, movement, or framing to facilitate efficient model learning.

136. A computing system for enhancing an existing video model's ability to recognize and generate video content based on cinematic elements, comprising: one or more processors; and one or more memories, having stored thereon instructions that, when executed, cause the computing system to provide a trained captioner model capable of generating detailed metadata for video sequences, wherein the metadata includes information on cinematic parameters such as focal length, camera movement, depth of field, occlusion, and parallax; select an existing video model designed to generate video content or recognize cinematic elements in video sequences; collect a dataset of video sequences and corresponding ground-truth metadata detailing the cinematic elements present in each sequence; process the dataset of video sequences through the trained captioner model to generate predicted metadata for each video sequence based on the recognized cinematic elements; compare the predicted metadata generated by the captioner model with the ground-truth metadata to identify discrepancies and areas of improvement for the existing video model; retrain the existing video model using a combination of the original training data and the newly generated metadata from the captioner model, wherein the retraining process conditions the existing video model on both visual features and the detailed cinematic metadata; iteratively refine the existing video model based on feedback from validation datasets and the accuracy of cinematic element recognition and generation; deploy the enhanced existing video model to process new video content, wherein the model utilizes the learned cinematic parameters to improve the accuracy and realism of generated video content or recognition of cinematic elements in video sequences; evaluate the performance of the enhanced existing video model on a test dataset to assess improvements in recognizing and generating video content based on cinematic elements; and implement a continuous improvement process, wherein the enhanced existing video model is periodically updated with new metadata generated by the captioner model to maintain high accuracy and relevance in recognizing and generating video content based on cinematic elements.

137. The computing system of aspect 136, the memories having stored thereon further instructions that, when executed, cause the computing system to fine-tune the trained captioner model on a dataset comprising controlled shots in a soundstage environment, allowing for precise identification of cinematic elements.

138. The computing system of any of aspects 136-137, the memories having stored thereon further instructions that, when executed, cause the computing system to select the existing video model from a group consisting of convolutional neural networks (CNNs) and transformer-based models designed for video processing tasks.

139. The computing system of any of aspects 136-138, the memories having stored thereon further instructions that, when executed, cause the computing system to use a conditional loss function during the retraining process that penalizes deviations between the predicted metadata and the ground-truth metadata to enhance the existing video model's accuracy.

140. The computing system of any of aspects 136-139, the memories having stored thereon further instructions that, when executed, cause the computing system to generate metadata predictions for each frame in the video sequences, thereby providing frame-level insights into cinematic elements.

141. The computing system of any of aspects 136-140, the memories having stored thereon further instructions that, when executed, cause the computing system to aggregate the frame-level metadata predictions to generate shot-level metadata, which is used to condition the existing video model during the retraining process.

142. The computing system of any of aspects 136-141, the memories having stored thereon further instructions that, when executed, cause the computing system to employ active learning techniques to focus retraining efforts on video sequences where the model demonstrates lower confidence in its predictions.

143. The computing system of any of aspects 136-142, the memories having stored thereon further instructions that, when executed, cause the computing system to employ a feedback loop wherein the enhanced existing video model's predictions on new video content are periodically compared with additional metadata generated by the captioner model to identify further areas for improvement.

144. The computing system of any of aspects 136-143, the memories having stored thereon further instructions that, when executed, cause the computing system to use the model in applications selected from the group consisting of automated video editing, cinematic video generation, and video content analysis.

145. The computing system of any of aspects 136-144, the memories having stored thereon further instructions that, when executed, cause the computing system to generate video content that adheres to specific cinematic prompts, thereby demonstrating the model's improved understanding of cinematic parameters.

146. The computing system of any of aspects 136-145, the memories having stored thereon further instructions that, when executed, cause the computing system to measure improvements in specific areas such as depth of field recognition, camera movement prediction, and framing style identification.

147. The computing system of any of aspects 136-146, the memories having stored thereon further instructions that, when executed, cause the computing system to integrate the enhanced existing video model into a larger video processing pipeline that includes steps for video capture, editing, and final production, thereby streamlining the creation of cinematic content.

148. The computing system of any of aspects 136-147, the memories having stored thereon further instructions that, when executed, cause the computing system to update the trained captioner model with new video sequences and corresponding metadata to reflect evolving cinematic techniques and styles.

149. The computing system of any of aspects 136-148, the memories having stored thereon further instructions that, when executed, cause the computing system to provide real-time feedback on cinematic quality during the video production process, enabling directors and cinematographers to adjust filming techniques accordingly.

150. The computing system of any of aspects 136-149, the memories having stored thereon further instructions that, when executed, cause the computing system to include a diverse range of cinematic styles and genres in the dataset of video sequences to ensure the captioner model and the existing video model are capable of recognizing and generating a wide variety of cinematic elements.

151. A computing system for training a new model to analyze and generate video content based on cinematic elements using a captioner AI, the computing system comprising: one or more processors; and one or more memories, having stored thereon instructions that, when executed, cause the computing system to access a trained captioner AI model capable of identifying and generating metadata for cinematic elements within video sequences, where the cinematic elements include focal length, camera movement, depth of field, occlusion, and parallax; compile a dataset of video sequences that have not been previously analyzed by the captioner AI model, where each video sequence includes a variety of cinematic elements; process the compiled dataset through the trained captioner AI model to generate metadata for each video sequence, where the metadata describes the cinematic elements present in the sequence; design a new model architecture capable of analyzing video content and generating video sequences based on input cinematic parameters; train the new model using the metadata generated by the captioner AI model as training data, where the training process conditions the new model to recognize and replicate the identified cinematic elements in video content; validate the accuracy of the new model in recognizing and generating cinematic elements within video sequences using a separate validation dataset processed through the captioner AI model; iteratively refine the new model based on performance feedback obtained during validation to enhance its ability to accurately analyze and generate video content based on cinematic elements; deploy the trained new model to analyze incoming video content and generate new video sequences that adhere to specified cinematic parameters, thereby demonstrating the model's understanding and application of cinematic elements; and continuously update the training dataset for the new model with additional metadata generated by the captioner AI model from newly compiled video sequences to ensure the new model remains current with cinematic trends and techniques.

152. The computing system of aspect 151, the memories having stored thereon further instructions that, when executed, cause the computing system to ensure the trained captioner AI model has been fine-tuned on a diverse range of cinematic styles and genres to ensure comprehensive coverage of cinematic elements in the metadata generation process.

153. The computing system of any of aspects 151-152, the memories having stored thereon further instructions that, when executed, cause the computing system to include in the new model architecture layers specifically designed to process and interpret metadata related to cinematic elements, enhancing the model's ability to analyze and generate video content based on such elements.

154. The computing system of any of aspects 151-153, the memories having stored thereon further instructions that, when executed, cause the computing system to employ a multi-task learning strategy during the training of the new model, where the model is optimized to achieve high accuracy in both recognizing cinematic elements in video content and generating video sequences that accurately reflect specified cinematic parameters.

155. The computing system of any of aspects 151-154, the memories having stored thereon further instructions that, when executed, cause the computing system to validate the accuracy of the new model by comparing the model's analysis of video content with the metadata generated by the captioner AI model to identify discrepancies and areas for improvement.

156. The computing system of any of aspects 151-155, the memories having stored thereon further instructions that, when executed, cause the computing system to utilize the new model in real-time video production environments to provide immediate analysis and feedback on the cinematic quality of captured video content, aiding in the decision-making process during filming.

157. The computing system of any of aspects 151-156, the memories having stored thereon further instructions that, when executed, cause the computing system to continuously update the training dataset by processing newly released films and video content through the captioner AI model to capture evolving cinematic styles and techniques.

158. The computing system of any of aspects 151-157, the memories having stored thereon further instructions that, when executed, cause the computing system to integrate the new model into video editing software to automate the generation of video sequences that comply with user-specified cinematic parameters, thereby streamlining the video production process.

159. The computing system of any of aspects 151-158, the memories having stored thereon further instructions that, when executed, cause the computing system to deploy the trained new model as a cloud-based service, where users can upload video content for analysis and request the generation of new video sequences based on desired cinematic elements.

160. The computing system of any of aspects 151-159, the memories having stored thereon further instructions that, when executed, cause the computing system to implement a feedback mechanism where users can rate the accuracy and quality of the new model's analysis and generated video content, providing valuable data for ongoing refinement of the model.

161. A computing system for generating information on cinematic elements within video content using a trained captioner model, the computing system comprising: one or more processors; and one or more memories, having stored thereon instructions that, when executed, cause the computing system to provide a captioner model that has been trained to identify and generate metadata for cinematic elements in video sequences, where the cinematic elements include but are not limited to focal length, camera movement, depth of field, occlusion, and parallax; input a target video sequence into the trained captioner model, where the target video sequence comprises a series of frames depicting various cinematic elements; process the target video sequence through the trained captioner model to generate metadata for each frame of the video sequence, where the metadata describes the cinematic elements identified by the model; aggregate the frame-level metadata to produce comprehensive information on the cinematic elements present throughout the target video sequence; output the aggregated information as a structured report or visualization that details the cinematic elements identified within the target video sequence, including changes in focal length, patterns of camera movement, and instances of occlusion or parallax; store the generated information in a database or file system for future reference or analysis; and utilize the generated information to enhance video content analysis, editing, or production processes by providing insights into the cinematic techniques employed within the target video sequence.

162. The computing system of any of aspects 161, the memories having stored thereon further instructions that, when executed, cause the computing system to utilize a combination of convolutional neural networks (CNNs) and transformer-based architectures to accurately identify and generate metadata for cinematic elements.

163. The computing system of any of aspects 161-162, the memories having stored thereon further instructions that, when executed, cause the computing system to preprocess the target video sequence to standardize frame size and resolution before inputting the sequence into the trained captioner model, ensuring consistent analysis across different video content.

164. The computing system of any of aspects 161-163, the memories having stored thereon further instructions that, when executed, cause the computing system to aggregate frame-level metadata by calculating average values for continuous cinematic elements, such as focal length, and determining predominant styles for categorical elements, such as framing.

165. The computing system of any of aspects 161-164, the memories having stored thereon further instructions that, when executed, cause the computing system to apply filters or thresholds to the generated metadata to highlight significant changes or patterns in cinematic elements, thereby focusing the analysis on key aspects of the video content.

166. The computing system of any of aspects 161-165, the memories having stored thereon further instructions that, when executed, cause the computing system to include interactive elements in the structured report or visualization that allow users to explore the identified cinematic elements in detail, including frame-by-frame breakdowns and comparisons.

167. The computing system of any of aspects 161-166, the memories having stored thereon further instructions that, when executed, cause the computing system to integrate the generated information into video editing software as metadata tracks that accompany the video content, providing editors with real-time insights into the cinematic elements present.

168. The computing system of any of aspects 161-167, the memories having stored thereon further instructions that, when executed, cause the computing system to make the database or file system storing the generated information accessible to filmmakers, editors, and researchers for querying and retrieving insights into cinematic techniques across a wide range of video content.

169. The computing system of any of aspects 161-168, the memories having stored thereon further instructions that, when executed, cause the computing system to employ machine learning algorithms to analyze the aggregated information on cinematic elements, identifying trends and patterns that can inform future video production and editing decisions.

170. The computing system of any of aspects 161-169, the memories having stored thereon further instructions that, when executed, cause the computing system to use the generated information to train or refine other video analysis models, leveraging the insights into cinematic elements to enhance the models' understanding and interpretation of video content.

171. A computer-readable medium having stored thereon a set of non-transitory instructions that, when executed, cause a computer to provide a large volume of video data, each video data being paired with a textual description; process the video data through a captioner model to automate the captioning and labeling of the video content; and train the AI model using the captioned and labeled video data, wherein the AI model is configured to recognize and understand specific cinematic components including at least one of focal length, depth maps, movement, occlusion, parallax, or camera angles, to accurately generate new video content based on the training.

172. The computer-readable medium of aspect 171 having stored thereon further instructions that, when executed, cause a computer to process and understand complex cinematic metadata through the captioner model, wherein the cinematic metadata includes numerical tokenization for geographic data and focuses on technical parameters of filmmaking selected from the group consisting of focal length, camera movement, shot type, and motion blur.

173. The computer-readable medium of any of aspects 171-172 having stored thereon further instructions that, when executed, cause a computer to encode geographic location data numerically to represent spatial relationships within a scene, including interpreting the camera's position in three-dimensional space relative to a fixed origin point and the position of objects or subjects within the scene using a numerical coordinate system.

174. The computer-readable medium of any of aspects 171-173 having stored thereon further instructions that, when executed, cause a computer to use numerical tokenization for geographic data for direct input into the captioner model as part of the input vector, thereby minimizing preprocessing steps and reducing computational overhead.

175. The computer-readable medium of any of aspects 171-174 having stored thereon further instructions that, when executed, cause a computer to maintain high precision in representing spatial relationships, enabling the captioner model to accurately learn and predict the impact of camera positioning and movement on the visual composition of a shot.

176. The computer-readable medium of any of aspects 171-175 having stored thereon further instructions that, when executed, cause a computer to facilitate faster convergence during training of the captioner model by enabling it to more easily learn quantitative differences between positions.

177. The computer-readable medium of any of aspects 171-176 having stored thereon further instructions that, when executed, cause a computer to offer a compact representation of geographic metadata, reducing memory usage and computational complexity.

178. The computer-readable medium of any of aspects 171-177 having stored thereon further instructions that, when executed, cause a computer to integrate detailed cinematic metadata into the input representation, including the numerical tokenization of geographic data, to learn complex interdependencies between various cinematic parameters.

179. The computer-readable medium of any of aspects 171-178 having stored thereon further instructions that, when executed, cause a computer to employ a multi-task learning architecture to simultaneously predict multiple technical parameters and is trained on temporal data to capture the dynamics of camera movement and object motion, enabling it to generate metadata that accurately reflects continuous movement and visual effects seen in professional filmmaking.

180. The computer-readable medium of any of aspects 171-179 having stored thereon further instructions that, when executed, cause a computer to process both visual data and detailed cinematic metadata, including numerical tokenization of geographic data, to adhere to professional filmmaking standards.

181. The computer-readable medium of any of aspects 171-180 having stored thereon further instructions that, when executed, cause a computer to encode geographic location data numerically to efficiently and precisely represent spatial relationships within a scene, facilitating the accurate interpretation of camera and object positions in three-dimensional space.

182. The computer-readable medium of any of aspects 171-181 having stored thereon further instructions that, when executed, cause a computer to utilize the numerical tokenization of geographic data for direct input into the captioner model as part of the input vector, which minimizes preprocessing steps and reduces computational overhead while maintaining high precision in representing spatial relationships.

183. The computer-readable medium of any of aspects 171-182 having stored thereon further instructions that, when executed, cause a computer to employ a multi-task learning architecture to simultaneously predict multiple technical parameters and is trained on temporal data to accurately reflect continuous movement and visual effects in generated video content.

184. A computer-readable medium having stored thereon a set of non-transitory instructions that, when executed, cause a computer to organize a dataset comprising raw video clips and corresponding metadata, wherein each video clip represents a specific shot varying one cinematic parameter at a time selected from the group consisting of focal length, camera movement, and framing; extract frames from the video clips at a consistent frame rate and store the frames in a structured format; associate each frame with corresponding metadata detailing the cinematic elements present in the frame, wherein the metadata includes information on focal length, camera movement, object distance, and framing style; segment the video data into shots and frames, wherein a shot comprises a continuous sequence captured without cuts, and frames are extracted at regular intervals from each shot; apply labels to each frame based on the associated metadata, wherein labels include focal length used during the shot, camera movement details, object distance from the camera, and framing style; aggregate frame-level labels to generate shot-level labels, wherein the aggregation includes calculating average focal length, determining predominant framing style, and smoothing camera movement data across the shot; train the captioner model using the labeled frames and aggregated shot-level labels to recognize and predict the cinematic elements in unseen video content; iteratively refine the captioner model based on feedback from validation datasets to improve the accuracy of cinematic element prediction; deploy the trained captioner model to process and label a large video database, wherein the model generates metadata for new video content based on learned cinematic elements; and post-process the generated labels to ensure consistency and accuracy, including performing outlier detection, confidence scoring, and manual quality control.

185. The computer-readable medium of aspect 184 having stored thereon further instructions that, when executed, cause a computer to store the video clips in a high-resolution, lossless format to preserve visual information critical for model learning.

186. The computer-readable medium of any of aspects 183-185 having stored thereon further instructions that, when executed, cause a computer to store the metadata associated with each frame in formats selected from the group consisting of JSON and CSV.

187. The computer-readable medium of any of aspects 183-186 having stored thereon further instructions that, when executed, cause a computer to segment the video data into shots using shot detection algorithms that identify scene changes.

188. The computer-readable medium of any of aspects 183-187 having stored thereon further instructions that, when executed, cause a computer to apply labels to each frame using LiDAR and laser locator data to provide highly accurate, frame-by-frame positioning of the camera and objects within the scene.

189. The computer-readable medium of any of aspects 183-188 having stored thereon further instructions that, when executed, cause a computer to aggregate frame-level labels to generate shot-level labels using majority voting to determine the predominant framing style for the shot.

190. The computer-readable medium of any of aspects 183-189 having stored thereon further instructions that, when executed, cause a computer to condition the captioner model on both visual features extracted from video frames and the detailed captioned metadata during training.

191. The computer-readable medium of any of aspects 183-190 having stored thereon further instructions that, when executed, cause a computer to use a multi-task learning approach during training, wherein the captioner model is trained to minimize losses for both visual quality and cinematic accuracy.

192. The computer-readable medium of any of aspects 183-191 having stored thereon further instructions that, when executed, cause a computer to employ active learning techniques to iteratively fine-tune the captioner model based on difficult cases identified during training.

193. The computer-readable medium of any of aspects 183-192 having stored thereon further instructions that, when executed, cause a computer to export the final labels generated by the captioner model to a structured format for easy integration into downstream tasks, including database storage and video editing software.

194. The computer-readable medium of any of aspects 183-193 having stored thereon further instructions that, when executed, cause a computer to maintain a consistent frame rate across all video footage to ensure uniform temporal information is captured for model training.

195. The computer-readable medium of any of aspects 183-194 having stored thereon further instructions that, when executed, cause a computer to include lighting conditions and background complexity in the metadata detailing the cinematic elements present in the frame to aid in the disambiguation between subject movement and camera movement.

196. The computer-readable medium of any of aspects 183-195 having stored thereon further instructions that, when executed, cause a computer to label the exact distance between the camera and the main subject in the frame to help the model learn depth cues related to lens compression and field of view.

197. The computer-readable medium of any of aspects 183-196 having stored thereon further instructions that, when executed, cause a computer to use a Transformer-based video model architecture to process both visual features extracted from video frames and metadata embeddings during the training of the captioner model.

198. The computer-readable medium of any of aspects 183-197 having stored thereon further instructions that, when executed, cause a computer to automate the extraction and labeling of data using tools derived from filmmaker processes to reduce manual labeling time and improve consistency across the dataset.

199. The computer-readable medium of any of aspects 184-198 having stored thereon further instructions that, when executed, cause a computer to validate the labeled dataset by manually reviewing a subset of the labeled data to ensure that automatic extraction and labeling processes are working correctly and consistently.

200. The computer-readable medium of any of aspects 184-199 having stored thereon further instructions that, when executed, cause a computer to use parallel processing or distributed computing to label multiple videos simultaneously for efficient handling of large datasets during the deployment of the trained captioner model.

201. The computer-readable medium of any of aspects 184-200 having stored thereon further instructions that, when executed, cause a computer to implement automated checks to detect inconsistent labels, such as sudden changes in focal length between consecutive frames where no camera zoom is expected, as part of the post-processing of the generated labels.

202. The computer-readable medium of any of aspects 184-201 having stored thereon further instructions that, when executed, cause a computer to store the final labels in a relational database or NoSQL database for efficient querying, allowing video professionals to search for videos based on specific cinematic parameters.

203. The computer-readable medium of any of aspects 184-202 having stored thereon further instructions that, when executed, cause a computer to implement uncertainty estimation techniques to flag sequences where the model is less confident in its output as part of the iterative refinement of the captioner model based on feedback from validation datasets.

204. The computer-readable medium of any of aspects 184-203 having stored thereon further instructions that, when executed, cause a computer to set up indexing for key columns like focal length, framing, and camera movement in the database to allow fast retrieval of videos based on these cinematic parameters.

205. The computer-readable medium of any of aspects 184-204 having stored thereon further instructions that, when executed, cause a computer to calculate the velocity of camera movement between frames to ensure smoothness in camera movement predictions as part of the aggregation of frame-level labels to generate shot-level labels.

206. The computer-readable medium of any of aspects 184-205 having stored thereon further instructions that, when executed, cause a computer to employ a feedback loop for model improvement, wherein the model is retrained or fine-tuned on identified error cases based on findings from manual quality control.

207. The computer-readable medium of any of aspects 184-206 having stored thereon further instructions that, when executed, cause a computer to assign confidence scores to each prediction, indicating the model's certainty about that particular output, as part of exporting the final labels generated by the captioner model.

208. The computer-readable medium of any of aspects 184-207 having stored thereon further instructions that, when executed, cause a computer to filter out low-confidence predictions based on a predetermined confidence threshold to ensure that only high-confidence predictions are used in the final labeled dataset.

209. The computer-readable medium of any of aspects 184-208 having stored thereon further instructions that, when executed, cause a computer to randomly select a subset of the labeled video frames or shots for manual review to catch any patterns of errors that may have slipped through automated checks as part of the manual quality control step.

210. The computer-readable medium of any of aspects 184-209 having stored thereon further instructions that, when executed, cause a computer to correct focal length outliers by replacing outlier values with the average focal length of surrounding frames to maintain consistency in the labeled data.

211. The computer-readable medium of any of aspects 184-210 having stored thereon further instructions that, when executed, cause a computer to concatenate metadata vectors with visual features extracted from the frames as part of conditioning the captioner model on both visual features and detailed captioned metadata during training.

212. The computer-readable medium of any of aspects 184-211 having stored thereon further instructions that, when executed, cause a computer to use a conditional loss function during training that penalizes the model for generating frames that deviate from the expected cinematic parameters specified by the metadata.

213. The computer-readable medium of any of aspects 184-212 having stored thereon further instructions that, when executed, cause a computer to penalize the model for errors in predicting depth of field effects, ensuring that generated frames match the cinematic metadata, as part of using a multi-task learning approach during training.

214. The computer-readable medium of any of aspects 184-213 having stored thereon further instructions that, when executed, cause a computer to scale the training to larger, more diverse video sequences with complex interactions, such as multiple objects, occlusion, and dynamic camera movements, once the model performs well on smaller datasets.

215. The computer-readable medium of any of aspects 184-214 having stored thereon further instructions that, when executed, cause a computer to train the model on a subset of data and validate periodically to ensure that both the visual quality and the cinematic accuracy are improving as part of the iterative training and refinement step.

216. The computer-readable medium of any of aspects 184-215 having stored thereon further instructions that, when executed, cause a computer to employ load balancing to distribute the workload across multiple servers or cloud instances during the deployment phase to efficiently handle the processing load of labeling a large video database.

217. The computer-readable medium of any of aspects 184-216 having stored thereon further instructions that, when executed, cause a computer to smooth camera movement data across the shot using a Gaussian filter to create a stable movement profile as part of the post-processing step to ensure consistency and accuracy.

218. The computer-readable medium of any of aspects 184-217 having stored thereon further instructions that, when executed, cause a computer to use shot detection algorithms that identify scene changes to automatically divide each video file into distinct shots during the segmentation process.

219. The computer-readable medium of any of aspects 184-218 having stored thereon further instructions that, when executed, cause a computer to use automated metadata software in the unreal system associated with the Filmmaker capture to synchronize metadata with video frames as part of the step of labeling each frame based on the associated metadata.

220. The computer-readable medium of any of aspects 184-219 having stored thereon further instructions that, when executed, cause a computer to maintain consistency across the dataset by ensuring uniformity of object/subject positioning, size, and lighting across all shots, as well as incremental changes in focal length, movement, or framing to facilitate efficient model learning.

221. A computer-readable medium having stored thereon a set of non-transitory instructions that, when executed, cause a computer to provide a trained captioner model capable of generating detailed metadata for video sequences, wherein the metadata includes information on cinematic parameters such as focal length, camera movement, depth of field, occlusion, and parallax; select an existing video model designed to generate video content or recognize cinematic elements in video sequences; collect a dataset of video sequences and corresponding ground-truth metadata detailing the cinematic elements present in each sequence; process the dataset of video sequences through the trained captioner model to generate predicted metadata for each video sequence based on the recognized cinematic elements; compare the predicted metadata generated by the captioner model with the ground-truth metadata to identify discrepancies and areas of improvement for the existing video model; retrain the existing video model using a combination of the original training data and the newly generated metadata from the captioner model, wherein the retraining process conditions the existing video model on both visual features and the detailed cinematic metadata; iteratively refine the existing video model based on feedback from validation datasets and the accuracy of cinematic element recognition and generation; deploy the enhanced existing video model to process new video content, wherein the model utilizes the learned cinematic parameters to improve the accuracy and realism of generated video content or recognition of cinematic elements in video sequences; evaluate the performance of the enhanced existing video model on a test dataset to assess improvements in recognizing and generating video content based on cinematic elements; and implement a continuous improvement process, wherein the enhanced existing video model is periodically updated with new metadata generated by the captioner model to maintain high accuracy and relevance in recognizing and generating video content based on cinematic elements.

222. The computer-readable medium of aspect 221 having stored thereon further instructions that, when executed, cause a computer to fine-tune the trained captioner model on a dataset comprising controlled shots in a soundstage environment, allowing for precise identification of cinematic elements.

223. The computer-readable medium of any of aspects 221-222 having stored thereon further instructions that, when executed, cause a computer to select the existing video model from a group consisting of convolutional neural networks (CNNs) and transformer-based models designed for video processing tasks.

224. The computer-readable medium of any of aspects 221-223 having stored thereon further instructions that, when executed, cause a computer to use a conditional loss function during the retraining process that penalizes deviations between the predicted metadata and the ground-truth metadata to enhance the existing video model's accuracy.

225. The computer-readable medium of any of aspects 221-224 having stored thereon further instructions that, when executed, cause a computer to generate metadata predictions for each frame in the video sequences, thereby providing frame-level insights into cinematic elements.

226. The computer-readable medium of any of aspects 221-225 having stored thereon further instructions that, when executed, cause a computer to aggregate the frame-level metadata predictions to generate shot-level metadata, which is used to condition the existing video model during the retraining process.

227. The computer-readable medium of any of aspects 221-226 having stored thereon further instructions that, when executed, cause a computer to employ active learning techniques to focus retraining efforts on video sequences where the model demonstrates lower confidence in its predictions.

228. The computer-readable medium of any of aspects 221-227 having stored thereon further instructions that, when executed, cause a computer to employ a feedback loop wherein the enhanced existing video model's predictions on new video content are periodically compared with additional metadata generated by the captioner model to identify further areas for improvement.

229. The computer-readable medium of any of aspects 221-228 having stored thereon further instructions that, when executed, cause a computer to use the enhanced existing video model in applications selected from the group consisting of automated video editing, cinematic video generation, and video content analysis.

230. The computer-readable medium of any of aspects 221-229 having stored thereon further instructions that, when executed, cause a computer to use the enhanced existing video model to generate video content that adheres to specific cinematic prompts, thereby demonstrating the model's improved understanding of cinematic parameters.

231. The computer-readable medium of any of aspects 221-230 having stored thereon further instructions that, when executed, cause a computer to measure improvements in specific areas such as depth of field recognition, camera movement prediction, and framing style identification during the evaluation of the enhanced existing video model's performance.

232. The computer-readable medium of any of aspects 221-231 having stored thereon further instructions that, when executed, cause a computer to integrate the enhanced existing video model into a larger video processing pipeline that includes steps for video capture, editing, and final production, thereby streamlining the creation of cinematic content.

233. The computer-readable medium of any of aspects 221-232 having stored thereon further instructions that, when executed, cause a computer to update the trained captioner model with new video sequences and corresponding metadata to reflect evolving cinematic techniques and styles as part of the continuous improvement process.

234. The computer-readable medium of any of aspects 221-233 having stored thereon further instructions that, when executed, cause a computer to provide real-time feedback on cinematic quality during the video production process, enabling directors and cinematographers to adjust filming techniques accordingly.

235. The computer-readable medium of any of aspects 221-234 having stored thereon further instructions that, when executed, cause a computer to include a diverse range of cinematic styles and genres in the dataset of video sequences to ensure the captioner model and the existing video model are capable of recognizing and generating a wide variety of cinematic elements.

236. A computer-readable medium having stored thereon a set of non-transitory instructions that, when executed, cause a computer to access a trained captioner AI model capable of identifying and generating metadata for cinematic elements within video sequences, where the cinematic elements include focal length, camera movement, depth of field, occlusion, and parallax; compile a dataset of video sequences that have not been previously analyzed by the captioner AI model, where each video sequence includes a variety of cinematic elements; process the compiled dataset through the trained captioner AI model to generate metadata for each video sequence, where the metadata describes the cinematic elements present in the sequence; design a new model architecture capable of analyzing video content and generating video sequences based on input cinematic parameters; train the new model using the metadata generated by the captioner AI model as training data, where the training process conditions the new model to recognize and replicate the identified cinematic elements in video content; validate the accuracy of the new model in recognizing and generating cinematic elements within video sequences using a separate validation dataset processed through the captioner AI model; iteratively refine the new model based on performance feedback obtained during validation to enhance its ability to accurately analyze and generate video content based on cinematic elements; deploy the trained new model to analyze incoming video content and generate new video sequences that adhere to specified cinematic parameters, thereby demonstrating the model's understanding and application of cinematic elements; and continuously update the training dataset for the new model with additional metadata generated by the captioner AI model from newly compiled video sequences to ensure the new model remains current with cinematic trends and techniques.

237. The computer-readable medium of aspect 236 having stored thereon further instructions that, when executed, cause a computer to fine-tune the trained captioner AI model on a diverse range of cinematic styles and genres to ensure comprehensive coverage of cinematic elements in the metadata generation process.

238. The computer-readable medium of any of aspects 236-237 having stored thereon further instructions that, when executed, cause a computer to include in the new model architecture layers specifically designed to process and interpret metadata related to cinematic elements, enhancing the model's ability to analyze and generate video content based on such elements.

239. The computer-readable medium of any of aspects 236-238 having stored thereon further instructions that, when executed, cause a computer to employ a multi-task learning strategy during the training of the new model, where the model is optimized to achieve high accuracy in both recognizing cinematic elements in video content and generating video sequences that accurately reflect specified cinematic parameters.

240. The computer-readable medium of any of aspects 236-239 having stored thereon further instructions that, when executed, cause a computer to validate the accuracy of the new model by comparing the model's analysis of video content with the metadata generated by the captioner AI model to identify discrepancies and areas for improvement.

241. The computer-readable medium of any of aspects 236-240 having stored thereon further instructions that, when executed, cause a computer to utilize the new model in real-time video production environments to provide immediate analysis and feedback on the cinematic quality of captured video content, aiding in the decision-making process during filming.

242. The computer-readable medium of any of aspects 236-241 having stored thereon further instructions that, when executed, cause a computer to continuously update the training dataset by processing newly released films and video content through the captioner AI model to capture evolving cinematic styles and techniques.

243. The computer-readable medium of any of aspects 236-242 having stored thereon further instructions that, when executed, cause a computer to integrate the new model into video editing software to automate the generation of video sequences that comply with user-specified cinematic parameters, thereby streamlining the video production process.

244. The computer-readable medium of any of aspects 236-243 having stored thereon further instructions that, when executed, cause a computer to deploy the trained new model as a cloud-based service, where users can upload video content for analysis and request the generation of new video sequences based on desired cinematic elements.

245. The computer-readable medium of any of aspects 236-244 having stored thereon further instructions that, when executed, cause a computer to implement a feedback mechanism where users can rate the accuracy and quality of the new model's analysis and generated video content, providing valuable data for ongoing refinement of the model.

246. A computer-readable medium having stored thereon a set of non-transitory instructions that, when executed, cause a computer to provide a captioner model that has been trained to identify and generate metadata for cinematic elements in video sequences, where the cinematic elements include but are not limited to focal length, camera movement, depth of field, occlusion, and parallax; input a target video sequence into the trained captioner model, where the target video sequence comprises a series of frames depicting various cinematic elements; process the target video sequence through the trained captioner model to generate metadata for each frame of the video sequence, where the metadata describes the cinematic elements identified by the model; aggregate the frame-level metadata to produce comprehensive information on the cinematic elements present throughout the target video sequence; output the aggregated information as a structured report or visualization that details the cinematic elements identified within the target video sequence, including changes in focal length, patterns of camera movement, and instances of occlusion or parallax; store the generated information in a database or file system for future reference or analysis; and utilize the generated information to enhance video content analysis, editing, or production processes by providing insights into the cinematic techniques employed within the target video sequence.

247. The computer-readable medium of aspect 246 having stored thereon further instructions that, when executed, cause a computer to utilize a combination of convolutional neural networks (CNNs) and transformer-based architectures to accurately identify and generate metadata for cinematic elements.

248. The computer-readable medium of any of aspects 246-247 having stored thereon further instructions that, when executed, cause a computer to preprocess the target video sequence to standardize frame size and resolution before inputting the sequence into the trained captioner model, ensuring consistent analysis across different video content.

249. The computer-readable medium of any of aspects 246-248 having stored thereon further instructions that, when executed, cause a computer to aggregate frame-level metadata by calculating average values for continuous cinematic elements, such as focal length, and determining predominant styles for categorical elements, such as framing.

250. The computer-readable medium of any of aspects 246-249 having stored thereon further instructions that, when executed, cause a computer to apply filters or thresholds to the generated metadata to highlight significant changes or patterns in cinematic elements, thereby focusing the analysis on key aspects of the video content.

251. The computer-readable medium of any of aspects 246-250 having stored thereon further instructions that, when executed, cause a computer to include interactive elements in the structured report or visualization that allow users to explore the identified cinematic elements in detail, including frame-by-frame breakdowns and comparisons.

252. The computer-readable medium of any of aspects 246-251 having stored thereon further instructions that, when executed, cause a computer to integrate the generated information into video editing software as metadata tracks that accompany the video content, providing editors with real-time insights into the cinematic elements present.

253. The computer-readable medium of any of aspects 246-252 having stored thereon further instructions that, when executed, cause a computer to make the database or file system storing the generated information accessible to filmmakers, editors, and researchers for querying and retrieving insights into cinematic techniques across a wide range of video content.

254. The computer-readable medium of any of aspects 246-253 having stored thereon further instructions that, when executed, cause a computer to employ machine learning algorithms to analyze the aggregated information on cinematic elements, identifying trends and patterns that can inform future video production and editing decisions.

255. The computer-readable medium of any of aspects 246-254 having stored thereon further instructions that, when executed, cause a computer to use the generated information to train or refine other video analysis models, leveraging the insights into cinematic elements to enhance the models' understanding and interpretation of video content.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for training a captioner model to generate captions for video content based on cinematic elements, the computer-implemented method comprising:
    organizing a dataset comprising raw video clips and corresponding metadata, wherein each video clip represents a specific shot varying one cinematic parameter at a time selected from the group consisting of focal length, camera movement, and framing;
    extracting frames from the raw video clips at a consistent frame rate and storing the frames in a structured format;
    associating each frame with corresponding metadata detailing the cinematic elements present in the frame, wherein the metadata includes information on focal length, camera movement, object distance, and framing style;
    segmenting the raw video clips into shots and frames, wherein a shot comprises a continuous sequence captured without cuts, and frames are extracted at regular intervals from each shot;
    applying frame-level labels to each frame based on the corresponding metadata, wherein the frame-level labels include focal length used during the shot, camera movement details, object distance from the camera, and framing style;
    aggregating the frame-level labels to generate shot-level labels, wherein the aggregating includes calculating average focal length, determining predominant framing style, and smoothing camera movement data across the shot;
    training the captioner model using the frame-level labels, the frames and the aggregated shot-level labels to recognize and predict the cinematic elements in unseen video content;
    iteratively refining the captioner model based on feedback from validation datasets to improve accuracy of cinematic element prediction;
    deploying the trained captioner model to process and label a large video database, wherein the model generates metadata for new video content based on learned cinematic elements; and
    post-processing the generated labels to ensure consistency and accuracy, including performing outlier detection, confidence scoring, and manual quality control.

2. The method of claim 1, wherein organizing the dataset further comprises storing the video clips in a high-resolution, lossless format to preserve visual information critical for model learning.

3. The method of claim 1, wherein the metadata associated with each frame is stored in formats selected from the group consisting of JSON and CSV.

4. The method of claim 1, wherein segmenting the raw video clips into shots is performed using shot detection algorithms that identify scene changes.

5. The method of claim 1, wherein applying labels to each frame further comprises using LiDAR and laser locator data to provide highly accurate, frame-by-frame positioning of the camera and objects within a scene.

6. The method of claim 1, wherein aggregating frame-level labels to generate shot-level labels further comprises using majority voting to determine the predominant framing style for the shot.

7. The method of claim 1, further comprising conditioning the captioner model on both visual features extracted from video frames and the detailed captioned metadata during training.

8. The method of claim 1, further comprising using a multi-task learning approach during training, wherein the captioner model is trained to minimize losses for both visual quality and cinematic accuracy.

9. The method of claim 1, further comprising employing active learning techniques to iteratively fine-tune the captioner model based on difficult cases identified during training.

10. The method of claim 1, further comprising exporting final labels generated by the captioner model to a structured format for easy integration into downstream tasks, including database storage and video editing software.

11. A computing system for training a captioner model to generate captions for video content based on cinematic elements, comprising:
    one or more processors; and
    one or more memories, having stored thereon instructions that, when executed, cause the computing system to:
    organize a dataset comprising raw video clips and corresponding metadata, wherein each video clip represents a specific shot varying one cinematic parameter at a time selected from the group consisting of focal length, camera movement, and framing;
    extract frames from the raw video clips at a consistent frame rate and store the frames in a structured format;
    associate each frame with corresponding metadata detailing the cinematic elements present in the frame, wherein the metadata includes information on focal length, camera movement, object distance, and framing style;
    segment the raw video clips into shots and frames, wherein a shot comprises a continuous sequence captured without cuts, and frames are extracted at regular intervals from each shot;

apply frame-level labels to each frame based on the corresponding metadata, wherein the frame-level labels include focal length used during the shot, camera movement details, object distance from the camera, and framing style;

aggregate the frame-level labels to generate shot-level labels by calculating average focal length, determining predominant framing style, and smoothing camera movement data across the shot;

train the captioner model using the frame-level labels, the frames and the aggregated shot-level labels to recognize and predict the cinematic elements in unseen video content;

iteratively refine the captioner model based on feedback from validation datasets to improve accuracy of cinematic element prediction;

deploy the trained captioner model to process and label a large video database, wherein the captioner model generates metadata for new video content based on learned cinematic elements; and post-process the generated labels to ensure consistency and accuracy, including performing outlier detection, confidence scoring, and manual quality control.

12. The computing system of claim 11, the memories having stored thereon further instructions that, when executed, cause the computing system to store the video clips in a high-resolution, lossless format to preserve visual information critical for model learning.

13. The computing system of claim 11, the memories having stored thereon further instructions that, when executed, cause the computing system to store the metadata associated with each frame in formats selected from the group consisting of JSON and CSV.

14. The computing system of claim 11, the memories having stored thereon further instructions that, when executed, cause the computing system to perform segmenting the raw video clips into shots using shot detection algorithms that identify scene changes.

15. The computing system of claim 11, the memories having stored thereon further instructions that, when executed, cause the computing system to use LiDAR and laser locator data to provide highly accurate, frame-by-frame positioning of the camera and objects within a scene when applying labels to each frame.

16. The computing system of claim 11, the memories having stored thereon further instructions that, when executed, cause the computing system to use majority voting to determine the predominant framing style for the shot when aggregating frame-level labels to generate shot-level labels.

17. The computing system of claim 11, the memories having stored thereon further instructions that, when executed, cause the computing system to condition the captioner model on both visual features extracted from video frames and the detailed captioned metadata during training.

18. The computing system of claim 11, the memories having stored thereon further instructions that, when executed, cause the computing system to use a multi-task learning approach during training, wherein the captioner model is trained to minimize losses for both visual quality and cinematic accuracy.

19. The computing system of claim 11, the memories having stored thereon further instructions that, when executed, cause the computing system to employ active learning techniques to iteratively fine-tune the captioner model based on difficult cases identified during training.

20. The computing system of claim 11, the memories having stored thereon further instructions that, when executed, cause the computing system to export final labels generated by the captioner model to a structured format for easy integration into downstream tasks, including database storage and video editing software.

21. A non-transitory computer-readable medium having stored thereon a set of instructions that, when executed, cause a computer to:

organize a dataset comprising raw video clips and corresponding metadata, wherein each video clip represents a specific shot varying one cinematic parameter at a time selected from the group consisting of focal length, camera movement, and framing;

extract frames from the raw video clips at a consistent frame rate and store the frames in a structured format;

associate each frame with corresponding metadata detailing cinematic elements present in the frame, wherein the metadata includes information on focal length, camera movement, object distance, and framing style;

segment the raw video clips into shots and frames, wherein a shot comprises a continuous sequence captured without cuts, and frames are extracted at regular intervals from each shot;

apply frame-level labels to each frame based on the corresponding metadata, wherein the frame-level labels include focal length used during the shot, camera movement details, object distance from the camera, and framing style;

aggregate the frame-level labels to generate shot-level labels by calculating average focal length, determining predominant framing style, and smoothing camera movement data across the shot;

train a captioner model using the frame-level labels, the frames and the aggregated shot-level labels to recognize and predict the cinematic elements in unseen video content;

iteratively refine the captioner model based on feedback from validation datasets to improve accuracy of cinematic element prediction;

deploy the trained captioner model to process and label a large video database, wherein the captioner model generates metadata for new video content based on learned cinematic elements; and post-process the generated labels to ensure consistency and accuracy, including performing outlier detection, confidence scoring, and manual quality control.

22. The computer-readable medium of claim 21 having stored thereon further instructions that, when executed, cause a computer to store the video clips in a high-resolution, lossless format to preserve visual information critical for model learning.

23. The computer-readable medium of claim 21 having stored thereon further instructions that, when executed, cause a computer to store the metadata associated with each frame in formats selected from the group consisting of JSON and CSV.

24. The computer-readable medium of claim 21 having stored thereon further instructions that, when executed, cause a computer to segment the raw video clips into shots using shot detection algorithms that identify scene changes.

25. The computer-readable medium of claim 21 having stored thereon further instructions that, when executed, cause a computer to apply labels to each frame using LiDAR and laser locator data to provide highly accurate, frame-by-frame positioning of the camera and objects within a scene.

26. The computer-readable medium of claim 21 having stored thereon further instructions that, when executed, cause a computer to aggregate frame-level labels to generate shot-level labels using majority voting to determine the predominant framing style for the shot.

27. The computer-readable medium of claim 21 having stored thereon further instructions that, when executed, cause a computer to condition the captioner model on both visual features extracted from video frames and the detailed captioned metadata during training.

28. The computer-readable medium of claim 21 having stored thereon further instructions that, when executed, cause a computer to use a multi-task learning approach during training, wherein the captioner model is trained to minimize losses for both visual quality and cinematic accuracy.

29. The computer-readable medium of claim 21 having stored thereon further instructions that, when executed, cause a computer to employ active learning techniques to iteratively fine-tune the captioner model based on difficult cases identified during training.

30. The computer-readable medium of claim 21 having stored thereon further instructions that, when executed, cause a computer to export final labels generated by the captioner model to a structured format for easy integration into downstream tasks, including database storage and video editing software.

* * * * *